United States Patent
Kagami et al.

(10) Patent No.: US 7,675,716 B2
(45) Date of Patent: Mar. 9, 2010

(54) COMPOSITE THIN-FILM MAGNETIC HEAD, MAGNETIC HEAD ASSEMBLY AND MAGNETIC DISK DRIVE APPARATUS

(75) Inventors: Takeo Kagami, Tokyo (JP); Hiroshi Kiyono, Tokyo (JP); Hiraku Hirabayashi, Tokyo (JP); Eiichi Omata, Tokyo (JP); Seiji Yari, Tokyo (JP); Takamitsu Sakamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 964 days.

(21) Appl. No.: 11/393,775

(22) Filed: Mar. 31, 2006

(65) Prior Publication Data
US 2006/0256481 A1 Nov. 16, 2006

(30) Foreign Application Priority Data

| | | |
|---|---|---|
| May 13, 2005 | (JP) | 2005-141096 |
| Oct. 26, 2005 | (JP) | 2005-311063 |
| Mar. 8, 2006 | (JP) | 2006-062468 |

(51) Int. Cl.
G11B 5/39 (2006.01)
G11B 5/31 (2006.01)
(52) U.S. Cl. .................. 360/319; 360/317
(58) Field of Classification Search .......... 360/317, 360/319, 324–324.2
See application file for complete search history.

(56) References Cited

U.S. PATENT DOCUMENTS

| | | | | |
|---|---|---|---|---|
| 5,898,548 A | * | 4/1999 | Dill et al. | 360/324.2 |
| 5,991,113 A | | 11/1999 | Meyer et al. | |
| 6,430,009 B1 | * | 8/2002 | Komaki et al. | 360/319 |
| 6,477,008 B1 | * | 11/2002 | Chang et al. | 360/128 |
| 6,914,756 B2 | * | 7/2005 | Molstad et al. | 360/316 |
| 7,212,382 B2 | * | 5/2007 | Otomo | 360/317 |

(Continued)

FOREIGN PATENT DOCUMENTS

JP 2004-206790 7/2004

(Continued)

OTHER PUBLICATIONS

Machine-English-translation of Otomo (JP 2004-362661 A), published on Dec. 24, 2004.*

(Continued)

*Primary Examiner*—William J Klimowicz
(74) *Attorney, Agent, or Firm*—Oblon, Spivak, McClelland, Maier & Neustadt, L.L.P.

(57) ABSTRACT

A composite thin-film magnetic head includes a substrate, an under layer formed on the substrate, an MR read head element formed on the under layer and provided with a lower shield layer, an upper shield layer and an MR layer in which a sense current flows in a direction perpendicular to a surface of the MR layer through the upper shield layer and the lower shield layer, an inter-shield insulation layer laminated on the MR read head element, an inductive write head element formed on the inter-shield insulation layer and provided with a first magnetic pole layer, a nonmagnetic layer, a second magnetic pole layer whose end portion is opposed to an end portion of the first magnetic pole layer through the nonmagnetic layer, and a write coil, and an additional shield layer formed between the upper shield layer and the first magnetic pole layer.

51 Claims, 24 Drawing Sheets

U.S. PATENT DOCUMENTS

| | | | |
|---|---|---|---|
| 7,274,539 B2 * | 9/2007 | Kiyono et al. | 360/317 |
| 2002/0126423 A1 * | 9/2002 | Terunuma et al. | 360/319 |
| 2002/0191326 A1 | 12/2002 | Xu et al. | |
| 2003/0099054 A1 | 5/2003 | Kamijima | |
| 2003/0174430 A1 | 9/2003 | Takahashi et al. | |
| 2005/0219765 A1 * | 10/2005 | Kiyono et al. | 360/317 |
| 2006/0002018 A1 * | 1/2006 | Fukui et al. | 360/125 |
| 2006/0002020 A1 * | 1/2006 | Pokhil et al. | 360/126 |
| 2006/0082929 A1 * | 4/2006 | Kiyono et al. | 360/317 |
| 2006/0092575 A1 * | 5/2006 | Mochizuki et al. | 360/317 |
| 2006/0098339 A1 * | 5/2006 | Koyama et al. | 360/126 |

FOREIGN PATENT DOCUMENTS

| | | |
|---|---|---|
| JP | 2004-295987 | 10/2004 |
| JP | 2004362661 A * | 12/2004 |

OTHER PUBLICATIONS

Klaas B. Klaassen, et al., "Write-to-Read Coupling", IEEE Transactions on Magnetics, vol. 38, No. 1, Jan. 2002, pp. 61-67.

* cited by examiner

COMPOSITE THIN-FILM MAGNETIC HEAD, MAGNETIC HEAD ASSEMBLY AND MAGNETIC DISK DRIVE APPARATUS

PRIORITY CLAIM

This application claims priority from Japanese patent application Nos. 2005-141096, 2005-311063 and 2006-062468, filed on May 13, 2005, Oct. 26, 2005 and Mar. 8, 2006, which are incorporated herein by reference.

BACKGROUND OF THE INVENTION

1. Field of the Invention

The present invention relates to a composite thin-film magnetic head provided with an inductive write head element and a magnetoresistive effect (MR) read head element that has a current-perpendicular-to-plane (CPP) structure where a sense current flows in a direction perpendicular to surfaces of laminated layers, to a magnetic head assembly provide with the thin-film magnetic head, and to a magnetic disk drive apparatus provided with the magnetic head assembly.

2. Description of the Related Art

In order to satisfy the demand for higher recording density and downsizing in a hard disk drive (HDD) apparatus, higher sensitivity and larger output of a thin-film magnetic head are required. In accordance with the requirement, improvement in characteristics of a general giant magnetoresistive effect (GMR) head with a GMR read head element, which is currently manufactured, is now strenuously proceeding. Also, development of a tunnel magnetoresistive effect (TMR) head with a TMR read head element providing an MR change ratio twice or more as that of the GMR read head element is energetically performed.

Because of the difference in flowing directions of their sense currents, structures of these TMR head and general GMR head differ from each other. One head structure in which a sense current flows in a direction parallel with surfaces of laminated layers as in the general GMR head is called as a current-in-plane (CIP) structure, whereas the other head structure in which a sense current flows in a direction perpendicular to surfaces of laminated layers as in the TMR head is called as the CPP structure. In recent years, CPP-GMR heads not CIP-GMR heads are under development.

The CPP-structure head utilizes its magnetic shield layers themselves as electrodes. Therefore, in the CPP-structure head, a short-circuit between the magnetic shield layer and the MR layer that will be serious problems for the CIP-structure GMR head when narrowing its read gap essentially never occurs. Thus, the CPP-structure head is very effective for higher density recording.

Also, provided are CPP-GMR heads with spin valve magnetic multi-layered films including such as dual-spin valve type magnetic multi-layered films as well as in case of the CIP-GMR heads.

The more downsizing in the HDD apparatus with such magnetic read head element and magnetic write head element, however, causes a problem of crosstalk between a writing side and a reading side. Especially, more miniaturization of a magnetic head element causes an increase in density of a current flowing through the element due to a decrease in a cross section area of the element, as well as a decrease in heat dispersion. Moreover, higher frequency for writing results in a steep change in voltage applied to the write head element. Consequently, a crosstalk occurs from the writing side to the reading side.

A technique to reduce a crosstalk between trace conductors in the writing side and in the reading side is proposed in Klaas B. Klaassen et al., "Write-to-Read Coupling", IEEE Trans. Magn. Vol. 38, pp 61-67, January 2002, which analyzes a coupling mechanism between the trace conductors formed on a suspension. In the description, it is concluded that almost all crosstalk is caused by the coupling between the trace conductors, not by the inner coupling in the magnetic head.

The inventors of this application analyzed and investigated the crosstalk between the writing and reading sides based upon the thought that the inner coupling must have a great influence on the crosstalk, as well as the coupling between the trace conductors.

As a consequence of the analyses and investigations, it has been revealed that there is a relationship between the generation of crosstalk and a parasitic capacitance between layers of a composite thin-film magnetic head provided with an inductive write head element and an MR read head element. Particularly, in the composite thin-film magnetic head provided with a CPP-structure read head element, because the lower and upper shield layers are used as electrodes and therefore a parasitic capacitance between the write coil and the upper shield layer certainly becomes larger than that between the write coil and the lower shield layer, a crosstalk voltage is produced across the read head element.

If the crosstalk voltage is produced in the CPP-GMR read head element, electro-migration will be advanced to invite a short-life of the read head element, and also mutual diffusion between the layers will be increased to deteriorate magnetic characteristics of the read head element. Whereas in the TMR read head element, if the crosstalk voltage is produced, pinholes may be formed in the barrier layer causing in dielectric breakdown and thus a great degradation of the reading characteristics due to a decrease in an electrical resistance of the element may be induced.

Furthermore, in the CPP-GMR read head element, noises broken into the substrate manifest at the lower shield layer side electrode that is near the substrate more than the upper shield layer side electrode, and thus the differences in noises between the lower shield layer side electrode and the upper shield layer side electrode are amplified by the preamplifier and are superimposed on the read out signal. Therefore, the CPP-GMR read head element is sensitive to external noises.

Under these circumstances, the assignee of this application proposed in U.S. patent application Ser. No. 11/205,072 filed on Aug. 17, 2005 a composite thin-film magnetic head provided with a CPP-structure MR read head element, which can reduce crosstalk between the read head element and a write head element and can be little affected by external noises. The proposed thin-film magnetic head is configured such that a parasitic capacitance C4 between a substrate and a lower shield layer of the read head element is substantially equal to a parasitic capacitance C2 between an upper shield layer of the read head element and a lower pole layer of the write head element, and that the lower pole layer has the same potential as the substrate.

In a composite thin-film magnetic head with such MR read head element and an inductive write head element, a distortion may be created at the MR read head element region due to heat produced by the inductive write head element. The interaction of this created distortion and a magnetic distortion of the magnetic material consisting of the read head element such as magnetic materials of a free layer, a pinned layer, a pin layer, a magnetic domain control layer, and upper and lower shield layers may deteriorate the MR read head element region. When the write current frequency increases, because the heating value increases, this problem becomes serious.

In order to prevent such problem from occurring, it is required to reduce transmission of the heat produced at the write head element to the read head element as much as possible. This reduction of the transmitting heat may be attained by increasing the distance between the lower magnetic pole layer of the write head element and the upper shield layer of the read head element or by increasing the thickness of the insulation layer there between, and/or by decreasing the distance between the lower shield layer of the read head element and the substrate or by decreasing the thickness of the insulation layer there between so as to dissipate the produced heat through the substrate.

In recent years, in order to solve problems that MR read head element and inductive write head element regions of a thin-film magnetic head are contracted due to a low environment temperature and thus a magnetic spacing that is an effective magnetic distance between these head elements and a surface of a magnetic disk increases causing reading and/or writing operations being impossible to perform, a heater is provided in each thin-film magnetic head to thermally expand these head element regions. For example, U.S. Pat. No. 5,991,113, US Patent publication No. 2003/0099054A1, US Patent publication No. 2003/0174430A1 and US Patent publication No. 2002/0191326A1 disclose such thin-film magnetic heads.

It is advantageous to form the heater at a position near the air bearing surface (ABS) side end surfaces of the MR read head element and the inductive write head element in order to enhance the thermal expansion efficiency of the heater. However, such arrangement of the heater will harm critical conditions in the manufacturing process of the MR read head element and the inductive write head element.

If the heater is formed between the lower magnetic pole layer of the inductive write head element and the upper shield layer of the MR read head element, it is possible to easily form the heater in the thin-film magnetic head without changing the critical conditions in the manufacturing process of the MR read head element and the inductive write head element.

If the distance between the lower magnetic pole layer of the write head element and the upper shield layer of the read head element is increased and also the distance between the lower shield layer of the read head element and the substrate is decreased as aforementioned to solve the problems due to the heating of the write head element, it becomes quite difficult to make the parasitic capacitances C2 and C4 equal to each other causing resistance performance of the magnetic head against the crosstalk voltage and against the external noises to deteriorate.

Furthermore, in the composite thin-film magnetic head with a CPP-structure MR read head element, if a heater is formed between the upper shield layer of the read head element and the lower magnetic pole layer of the write head element, a crosstalk between the heater and the MR read head element may be produced causing damage to the MR read head element.

SUMMARY OF THE INVENTION

It is therefore an object of the present invention to provide a composite thin-film magnetic head with an MR read head element of the CPP structure, a magnetic head assembly and a magnetic disk drive apparatus, whereby influence of crosstalk and influence of external noises can be suppressed even if a distance between the inductive write head element and the MR read head element to minimize transmitting amount of heat from the write head element to the read head element.

Another object of the present invention is to provide a composite thin-film magnetic head with an MR read head element of the CPP structure, a magnetic head assembly and a magnetic disk drive apparatus, whereby influence of crosstalk and influence of external noises from a heat resistance element can be suppressed even if the heat resistance element is formed between the inductive write head element and the MR read head element.

According to the present invention, a composite thin-film magnetic head includes a substrate, an under layer formed on the substrate, an MR read head element formed on the under layer and provided with a lower shield layer, an upper shield layer and an MR layer in which a sense current flows in a direction perpendicular to a surface of the MR layer through the upper shield layer and the lower shield layer, an intershield insulation layer laminated on the MR read head element, an inductive write head element formed on the intershield insulation layer and provided with a first magnetic pole layer, a nonmagnetic layer, a second magnetic pole layer whose end portion is opposed to an end portion of the first magnetic pole layer through the nonmagnetic layer, and a write coil, and an additional shield layer formed between the upper shield layer and the first magnetic pole layer. The inductive write head element may be a write head element with a horizontal or in-plane magnetic recording structure or a write head element with a write head element with a perpendicular magnetic recording structure. In case that the inductive write head element is a horizontal or in-plane magnetic recording structure head element, the first magnetic pole layer corresponds to a lower magnetic pole layer, the second magnetic pole layer corresponds to an upper magnetic pole layer and the nonmagnetic layer corresponds to a recording gap layer. In case that the inductive write head element is a perpendicular magnetic recording structure head element, the first magnetic pole layer corresponds to a main magnetic pole layer or an auxiliary magnetic pole layer (return layer), located at the MR read head element side with respect to the nonmagnetic layer, and the second magnetic pole layer corresponds to an auxiliary magnetic pole layer (return layer) or a main magnetic pole layer, located opposite to the MR read head element side with respect to the nonmagnetic layer.

According to the present invention, because the additional shield layer is formed between the first magnetic pole layer and the upper shield layer, it is possible to reduce crosstalk voltage applied to the MR read head element from the inductive write head element. Accordingly, damage of the MR read head element due to the crosstalk voltage can be prevented from occurring and influence of external noises can be reduced. More concretely, in case of the TMR read head element, it is possible to certainly prevent formation of pinholes in the barrier layer so as to suppress reduction of the element resistance and deterioration of the reading characteristics. In case of the CPP-structure GMR read head element, it is possible to prevent a decrease in operating life of the read head element due to an enhancement of electromigration and to prevent a degradation of magnetic properties due to an enhancement of an interlayer diffusion of metal atoms.

It is preferred that a parasitic capacitance C4 between the substrate and the lower shield layer is substantially the same as a parasitic capacitance C2 between the upper shield layer and the additional shield layer. In this case, more preferably, an electrical resistance between the substrate and the additional shield layer is 100 Ω or less, for example few ohms resulting that the substrate and the additional shield layer become at substantially the same potential. Therefore, even if a crosstalk voltage is applied from the inductive write head element through the parasitic capacitances C2 and C4, this voltage is canceled between the upper shield layer (SS1) and the lower shield layer (SF) and the potential difference there between becomes substantially zero. As a result, any external noise entered into the thin-film magnetic head is never presented on the reproduced signal to prevent error due to the external noises from occurring, and thus reliability of the head is improved.

It is also preferred that the additional shield layer and the first magnetic pole layer are electrically connected with each other. If the resistance between the substrate and the additional shield layer is low, it is possible to electrically connect or ground the inductive write head element to the substrate so as to prevent ESD breakdown of the MR read head element from occurring.

It is preferred that the additional shield layer is made of a magnetic metal material.

It is also preferred that lengths along a direction perpendicular to the air bearing surface of the lower shield layer, the upper shield layer, the additional shield layer and the first magnetic pole layer are substantially equal to each other. As a result, a linearity of quasi-static test (QST) characteristics of the MR read head element improves. The QST is a test for examining a linearity response of head element output by applying an external magnetic field in order to estimate dynamic performance (DP) characteristics when a plurality of composite thin-film magnetic heads are not separated but in a row bar state.

It is further preferred that the head further includes a heater formed between the additional shield layer and the first magnetic pole layer. Because the additional shield layer is formed between the upper shield layer and the heater, it is possible to reduce crosstalk voltage applied to the MR read head element from the heater. Accordingly, damage of the MR read head element due to the crosstalk voltage can be prevented from occurring and influence of external noises can be reduced. More concretely, in case of the TMR read head element, it is possible to certainly prevent formation of pinholes in the barrier layer so as to suppress reduction of the element resistance and deterioration of the reading characteristics. In case of the CPP-structure GMR read head element, it is possible to prevent a decrease in operating life of the read head element due to an enhancement of electromigration and to prevent a degradation of magnetic properties due to an enhancement of an interlayer diffusion of metal atoms.

It is preferred that the head further includes a nonmagnetic conductive layer electrically conducted with the lower shield layer and opposed to the substrate in order to increase substantially countered area between the lower shield layer and the substrate to realize C2=C4 when the parasitic capacitance C2 between the upper shield layer and the additional shield layer is larger than the parasitic capacitance C4 between the substrate and the lower shield layer. As is known, a capacitance between two electrode plates countered with each other is inversely proportional to the distance between them and proportional to the countered area of them. Therefore, by increasing the countered area of the two electrode plates, it is possible to increase the capacitance. If a conductive plate that is electrically conducted to one of the electrode plates and provided with the same area as this electrode plate is inserted between these two electrode plates, the capacitance will increase depending on the thickness of this inserted plate. However, if the conductive plate is sufficiently thin, the increase in the capacitance due to the decrease in distance can be negligible.

The nonmagnetic conductive layer conducted to the lower shield layer is added to counter with the substrate so as to increase the substantial counter electrode area between the lower shield layer and the substrate and then to increase the parasitic capacitance C4. Therefore, it is possible to easily adjust the parasitic capacitance C4 so as to be equal to the parasitic capacitance C2. Because the added conductive layer is nonmagnetic and also no change in the thickness, shape and size of the of the lower shield layer, the upper shield layer, the additional shield layer and the lower magnetic pole layer is necessary, the external magnetic field resistance, the shield magnetic domain performance due to write stress and the reading/writing characteristics of the thin-film magnetic head are never changed.

In this case, it is preferred that the nonmagnetic conductive layer is laminated on a substrate-side surface of the lower shield layer. If the nonmagnetic conductive layer is laminated on the substrate-side surface of the lower shield layer, the distance between the lower shield layer and the substrate is in general shortened to increase the parasitic capacitance C4. However, if the nonmagnetic conductive layer is sufficiently thin, the increase in the capacitance C4 due to the decrease in distance can be negligible. Rather, increasing of the counter electrode area by the lamination of the nonmagnetic conductive layer effectively increases the parasitic capacitance C4.

The nonmagnetic conductive layer may be laminated on a surface of the lower shield layer, which surface is opposite to a substrate-side surface of the lower shield layer. If the lower shield layer is thin, the distance between the nonmagnetic conductive layer and the substrate does not become so large, so as to effectively increase the parasitic capacitance C4.

It is also preferred that the head further includes a nonmagnetic conductive layer electrically conducted with the upper shield layer and opposed to the additional shield layer in order to increase substantially countered area between the upper shield layer and the additional shield layer to realize C2=C4 when the parasitic capacitance C4 between the substrate and the lower shield layer is larger than the parasitic capacitance C2 between the upper shield layer and the additional shield layer.

The nonmagnetic conductive layer conducted to the upper shield layer is added to counter with the additional shield layer so as to increase the substantial counter electrode area between the upper shield layer and the additional shield layer and then to increase the parasitic capacitance C2. Therefore, it is possible to easily adjust the parasitic capacitance C2 so as to be equal to the parasitic capacitance C4. Because the added conductive layer is nonmagnetic and also no change in the thickness, shape and size of the of the lower shield layer, the upper shield layer, the additional shield layer and the lower magnetic pole layer is necessary, the external magnetic field resistance, the shield magnetic domain performance due to write stress and the reading/writing characteristics of the thin-film magnetic head are never changed.

In this case, it is preferred that the nonmagnetic conductive layer is laminated on an additional shield layer-side surface of the upper shield layer. If the nonmagnetic conductive layer is laminated on the additional shield layer side surface of the upper shield layer, the distance between the upper shield layer and the additional shield layer is in general shortened to increase the parasitic capacitance C2. However, if the nonmagnetic conductive layer is sufficiently thin, the increase in the capacitance C2 due to the decrease in distance can be negligible. Rather, increasing of the counter electrode area by the lamination of the nonmagnetic conductive layer effectively increases the parasitic capacitance C2.

The nonmagnetic conductive layer may be laminated on a surface of the upper shield layer, which surface is opposite to an additional shield layer-side surface of the upper shield layer. If the upper shield layer is thin, the distance between the nonmagnetic conductive layer and the additional shield layer does not become so large, so as to effectively increase the parasitic capacitance C2.

It is further preferred that the head further includes a nonmagnetic conductive layer electrically conducted with the additional shield layer and opposed to the upper shield layer in order to increase substantially countered area between the upper shield layer and the additional shield layer to realize C2=C4 when the parasitic capacitance C4 between the substrate and the lower shield layer is larger than the parasitic capacitance C2 between the upper shield layer and the additional shield layer.

The nonmagnetic conductive layer conducted to the additional shield layer is added to counter with the upper shield layer so as to increase the substantial counter electrode area between the upper shield layer and the additional shield layer and then to increase the parasitic capacitance C2. Therefore, it is possible to easily adjust the parasitic capacitance C2 so as to be equal to the parasitic capacitance C4. Because the added conductive layer is nonmagnetic and also no change in the thickness, shape and size of the of the lower shield layer, the upper shield layer, the additional shield layer and the lower magnetic pole layer is necessary, the external magnetic field resistance, the shield magnetic domain performance due to write stress and the reading/writing characteristics of the thin-film magnetic head are never changed.

In this case, it is preferred that the nonmagnetic conductive layer is laminated on an upper shield layer-side surface of the additional shield layer. If the nonmagnetic conductive layer is laminated on the upper shield layer side surface of the additional shield layer, the distance between the upper shield layer and the additional shield layer is in general shortened to increase the parasitic capacitance C2. However, if the nonmagnetic conductive layer is sufficiently thin, the increase in the capacitance C2 due to the decrease in distance can be negligible. Rather, increasing of the counter electrode area by the lamination of the nonmagnetic conductive layer effectively increases the parasitic capacitance C2.

The nonmagnetic conductive layer may be laminated on a surface of the additional shield layer, which surface is opposite to an upper shield layer-side surface of the additional shield layer. If the additional shield layer is thin, the distance between the nonmagnetic conductive layer and the upper shield layer does not become so large, so as to effectively increase the parasitic capacitance C2.

According to the present invention, further, a composite thin-film magnetic head includes a substrate, an under layer formed on the substrate, an MR read head element formed on the under layer and provided with a lower shield layer, an upper shield layer and an MR layer in which a sense current flows in a direction perpendicular to a surface of the magnetoresistive effect layer through the upper shield layer and the lower shield layer, an inter-shield insulation layer laminated on the MR read head element, an inductive write head element formed on the inter-shield insulation layer and provided with a first magnetic pole layer, a nonmagnetic layer, a second magnetic pole layer whose end portion is opposed to an end portion of the first magnetic pole layer through the nonmagnetic layer, and a write coil, and an additional shield layer formed between the upper shield layer and the first magnetic pole layer. A parasitic capacitance between the substrate and the lower shield layer is substantially the same as a parasitic capacitance between the upper shield layer and the additional shield layer, and an electrical resistance between the substrate and the additional shield layer being 100 Ω or less.

It is preferred that the MR read head element is a GMR read head element or a TMR read head element.

It is also preferred that the inductive write head element is a horizontal magnetic recording structure write head element or a perpendicular magnetic recording structure write head element.

According to the present invention, furthermore, a magnetic head assembly includes the above-mentioned composite thin-film magnetic head and a support member for supporting the composite thin-film magnetic head. Here, the magnetic head assembly means an assembly mechanically and electrically assembling a composite thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

According to the present invention, in addition, a magnetic disk drive apparatus includes at least one magnetic disk, at least one composite thin-film magnetic head mentioned above and at least one support member for supporting at least one composite thin-film magnetic head.

Further objects and advantages of the present invention will be apparent from the following description of the preferred embodiments of the invention as illustrated in the accompanying drawings.

DESCRIPTION OF THE PREFERRED EMBODIMENTS

Figure 1:
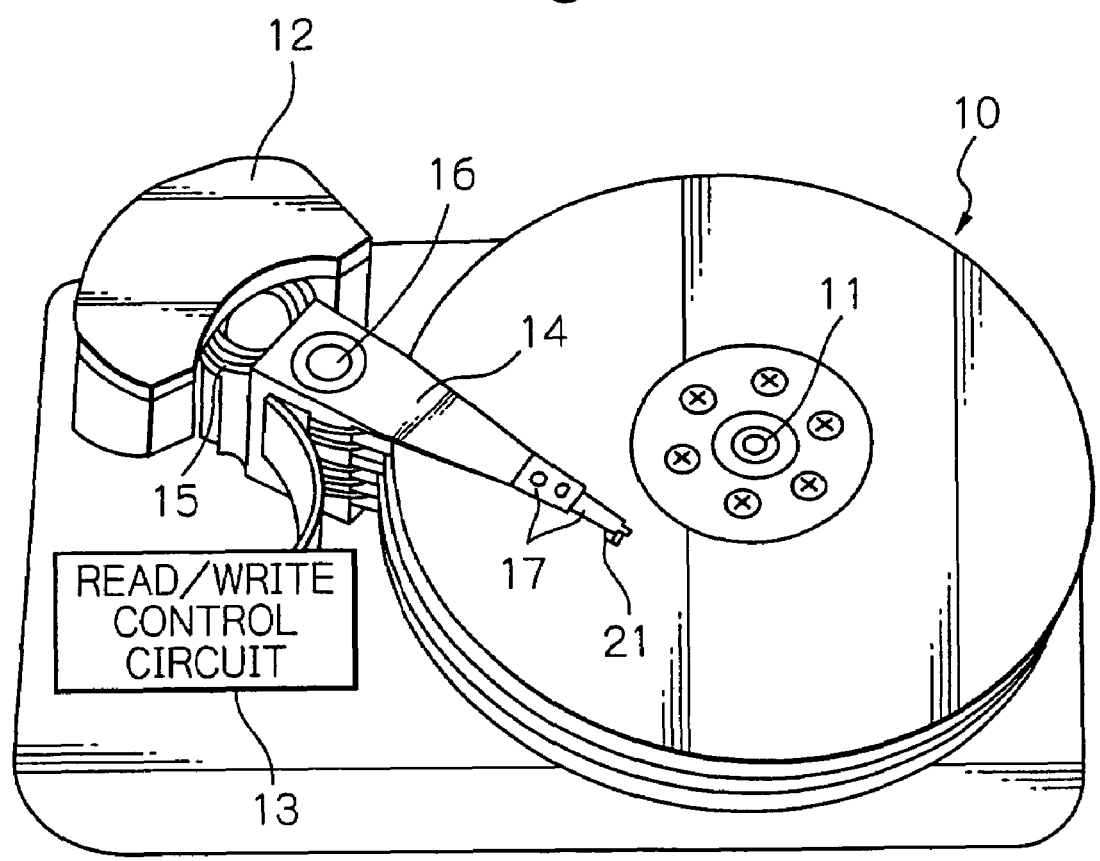
FIG. 1 is an oblique view schematically illustrating main components of a magnetic disk drive apparatus as a preferred embodiment of the present invention.
Figure 2:
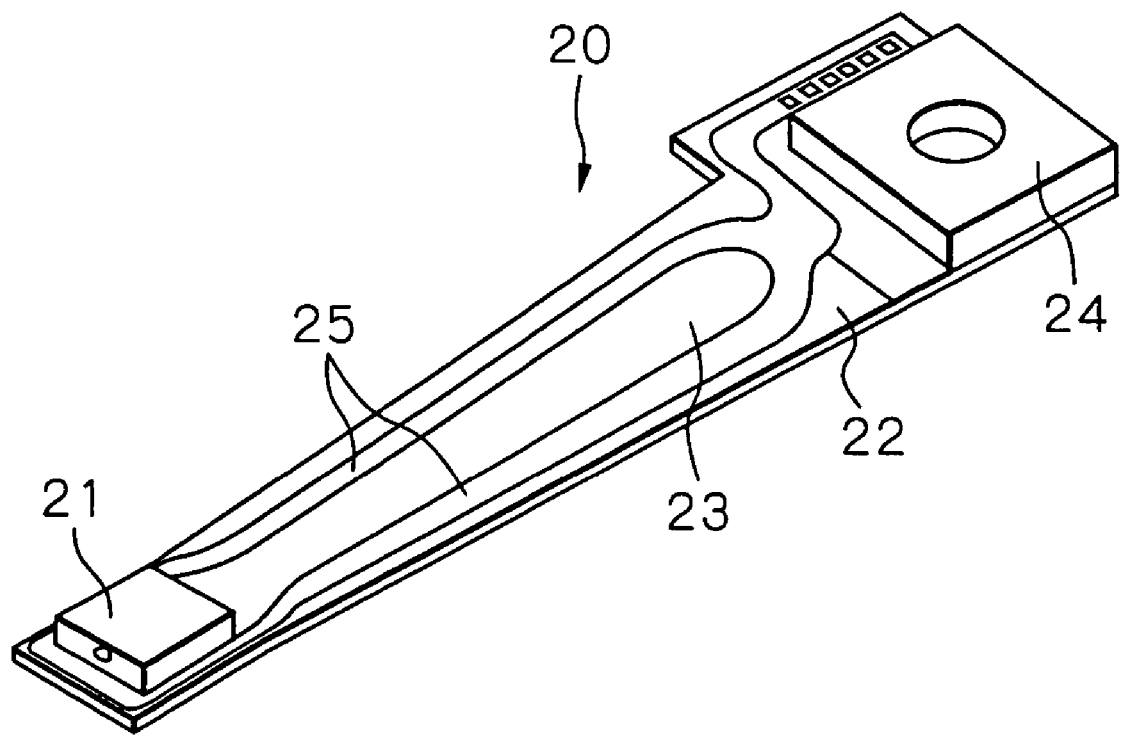
FIG. 2 is an oblique view illustrating a configuration example of an HGA in the embodiment of FIG. 1.
Figure 3:
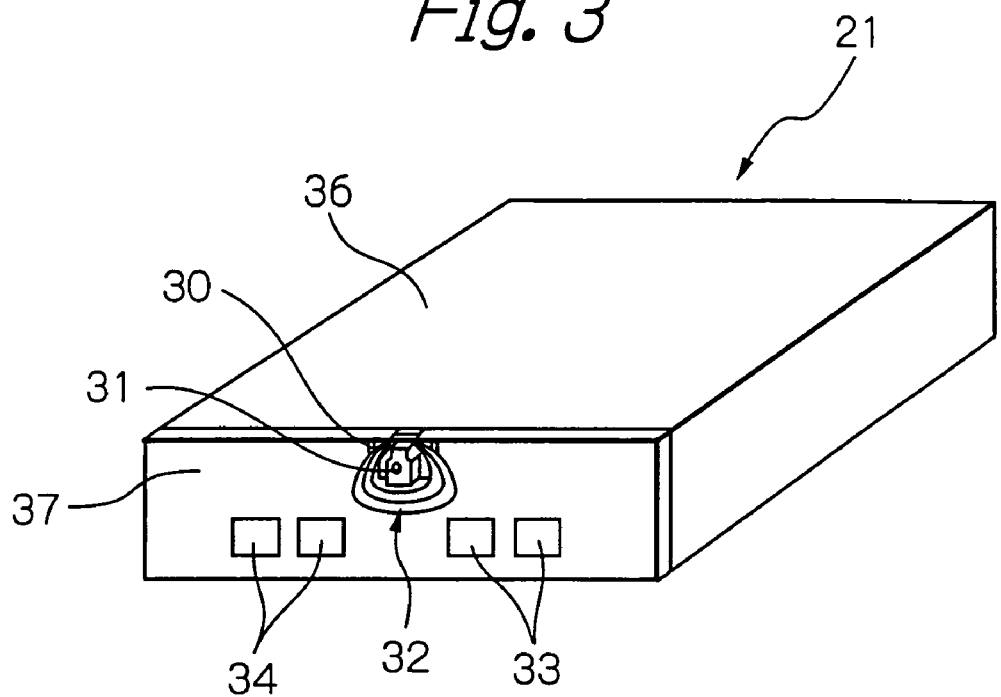
FIG. 3 is an oblique view illustrating a composite thin-film magnetic head mounted at a top end section of the HGA shown in FIG. 2.
Figure 4:
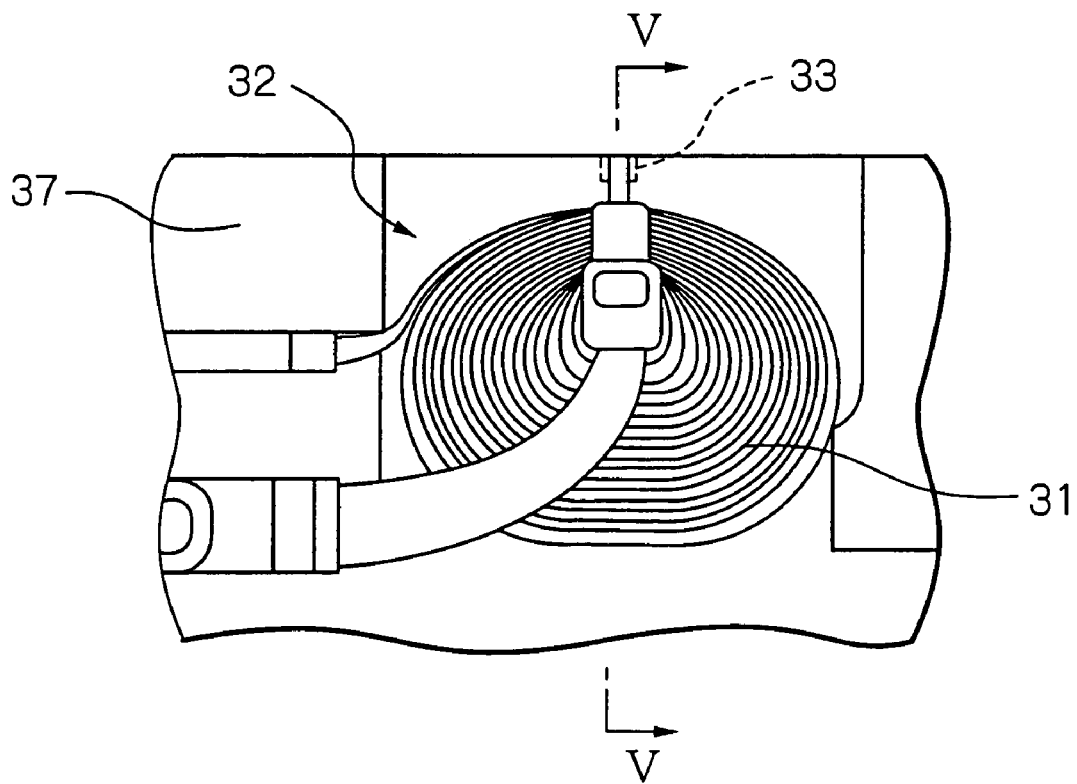
FIG. 4 is a plane view illustrating magnetic head element portion of the composite thin-film magnetic head shown in FIG. 3, seen from an element-formed side of a slider substrate.

FIG. 1 schematically illustrates main components of a magnetic disk drive apparatus as a preferred embodiment of the present invention, FIG. 2 illustrates a configuration example of an HGA in the embodiment of FIG. 1, FIG. 3 illustrates a composite thin-film magnetic head mounted at a top end section of the HGA shown in FIG. 2, and FIG. 4 illustrates magnetic head element portion of the composite thin-film magnetic head shown in FIG. 3, seen from an element-formed side of a slider substrate.

In FIG. 1, reference numeral 10 denotes a plurality of magnetic hard disks rotating around a rotation axis of a spindle motor 11, 12 denotes an assembly carriage device for positioning each composite thin-film magnetic head or magnetic head slider on a track of each disk, and 13 denotes a read/write control circuit for controlling read and write operations, respectively.

The assembly carriage device 12 has a plurality of drive arms 14 stacked along a pivot-bearing axis 16. These drive arms 14 are capable of rotating around the axis 16 and driven by a voice coil motor (VCM) 15. An HGA 17 is mounted on a top section of each arm 14. Each HGA 17 has the composite thin-film magnetic head or the magnetic head slider 21 mounted at its top end section so that the slider opposes to a surface of each magnetic disk 10. In modifications, a single magnetic disk 10, a single drive arm 14 and a single HGA 17 may be provided.

As shown in FIG. 2, the HGA is assembled by fixing the composite thin-film magnetic head 21 having an inductive write head element and a CPP-structure MR read head element to a top end section of a suspension 20, and by electrically connecting one ends of trace conductors to terminal electrodes of the thin-film magnetic head 21.

The suspension 20 is substantially constituted by a load beam 22 for producing a load to be applied to the composite thin-film magnetic head 21, a resilient flexure 23 fixed on and supported by the load beam 22, a base plate 24 attached or formed at a base end section of the load beam 22, and a lead conductor member 25 fixed on the flexure 23 and the load beam 22 and provided with the trace conductors and connection pads electrically connected both ends of the trace conductors.

A structure of the suspension of the HGA that is the magnetic head assembly according to the present invention is not limited to the aforementioned structure. Furthermore, although it is not shown, a head drive IC chip may be mounted on a middle of the suspension 20.

As shown in FIGS. 3 and 4, the thin-film magnetic head or magnetic head slider 21 in this embodiment has, on its element-forming surface 37 that is one side surface of the head with respect to its bottom surface consisting of an air bearing surface (ABS) 36, a composite magnetic head element 32 consisting of an MR read head element 30 and an inductive write head element 31 laminated each other, and four signal electrode terminals 33 and 34 electrically connected to these elements 30 and 31. The positions of these electrode terminals are not limited to these shown in FIG. 3.

Figure 5:
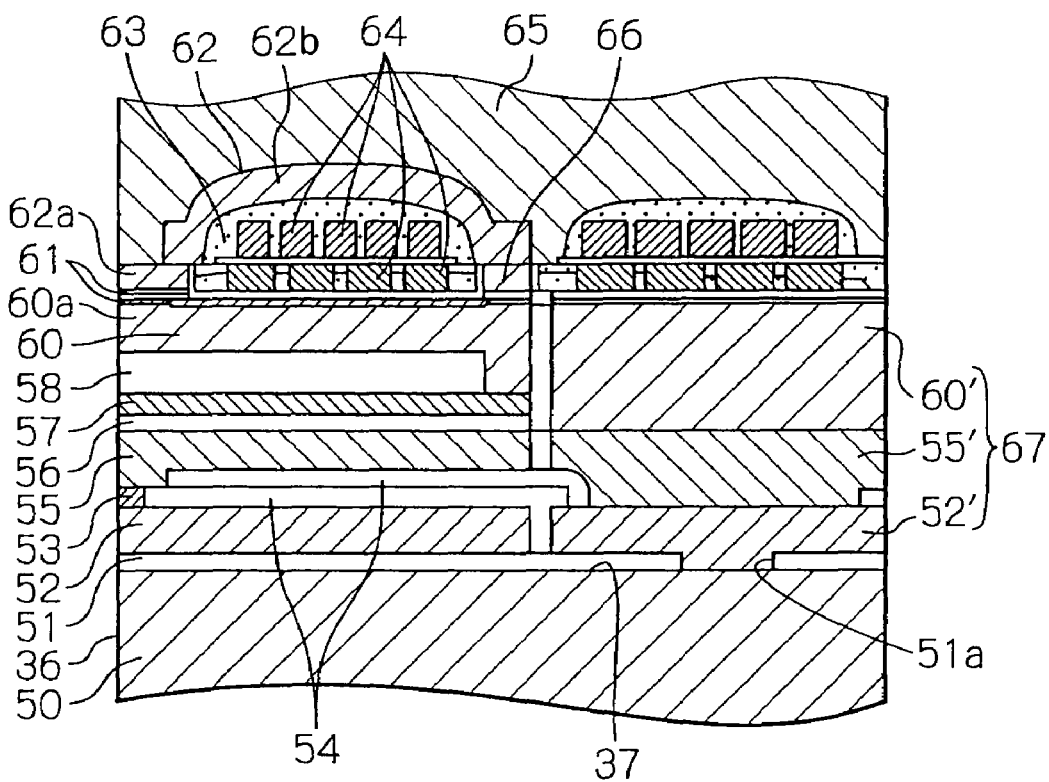
FIG. 5 is a center sectional view schematically illustrating the configuration of the composite thin-film magnetic head shown in FIG. 3.

FIG. 5 shows a V-V line section of FIG. 4 schematically illustrating a configuration of the composite thin-film magnetic head in this embodiment. The inductive write head element in this embodiment is a write head element with a horizontal or in-plane magnetic recording structure.

On a substrate or a slider substrate 50 made of a conductive material such as for example $Al_2O_3$—TiC (AlTiC), the ABS 36 to be opposed to the magnetic disk surface is formed. In operations, the magnetic head slider 21 fluid-dynamically flies above the surface of the rotating magnetic disk with a predetermined height. An under layer 51 made of an insulating material such as for example $Al_2O_3$ or $SiO_2$ with a thickness of 0.05-10 μm is laminated on the element-forming surface 37 of the substrate or a slider substrate 50.

On the under layer 51, laminated is a lower shield layer (SF) 52 that also operates as a lower electrode layer and is made of a magnetic metal material such as for example FeAlSi, NiFe, CoFe, NiFeCo, FeN, FeZrN, FeTaN, CoZrNb or CoZrTa.

The lower shield layer 52 is opposed to the substrate 50 via the under layer 51, and therefore this lower shield layer 52 and the substrate 50 function as counter electrodes to generate a parasitic capacitance C4 there between.

On the lower shield layer 52, an MR layer 53 with the CPP structure and an insulation layer 54 made of an insulating material such as for example $Al_2O_3$ or $SiO_2$ are laminated.

The CPP-structure MR layer 53 will be formed from, in case of a CPP-GMR layer, a multilayered structure including a free layer of a ferromagnetic material such as for example NiFe, CoFe or NiFeCo, a nonmagnetic layer of a nonmagnetic conductive material such as for example Cu, a pinned layer of a ferromagnetic material such as for example NiFe, CoFe or NiFeCo, and a pinning layer of an antiferromagnetic material such as for example PtMn, FeMn, MnIr, NiMn or CrMnPt. In case of a TMR layer, the CPP-structure MR layer 53 will be formed from a multilayered structure including a free layer of a ferromagnetic material such as for example NiFe, CoFe or NiFeCo, a thin barrier layer of an insulation material such as for example oxides of Ti, Ta, Al, Zr, Hf, Si, Mg or Zn, a pinned layer of a ferromagnetic material such as for example NiFe, CoFe or NiFeCo, and a pinning layer of an antiferromagnetic material such as for example PtMn, FeMn, MnIr, NiMn or CrMnPt. The multilayered structure of the CPP-structure MR layer 53 is not limited to the abovementioned structure but various layer configurations will be of course possible. Although not shown in the figures, the MR layer 53 may have a magnetic domain control layer and other necessary layers.

On the CPP-structure MR layer 53 and the insulation layer 54, laminated is an upper shield layer (SS1) 55 that also operates as an upper electrode layer and is made of a magnetic metal material such as for example FeAlSi, NiFe, CoFe, NiFeCo, FeN, FeZrN, FeTaN, CoZrNb or CoZrTa.

The CPP-structure MR read head element is mainly composed of the lower shield layer 52, the MR layer 53, the insulation layer 54, the upper shield layer 55, the magnetic domain control layer and a lead conductor layer not shown.

On the upper shield layer 55, an inter-shield insulation layer 56 made of an insulating material such as for example $Al_2O_3$ or $SiO_2$ is laminated. An additional shield layer 57 made of a metal material or a magnetic metal material such as for example FeAlSi, NiFe, CoFe, NiFeCo, FeN, FeZrN, FeTaN, CoZrNb or CoZrTa with a thickness of preferably about 0.05-2 μm is laminated on the inter-shield insulation layer 56.

An insulation layer 58 made of an insulating material such as for example $Al_2O_3$ or $SiO_2$ is laminated on the additional shield layer 57.

In this embodiment, the insulation layer 58 is formed thicker to minimize heat generated at the inductive write head element and transferred to the MR read head element.

A lower magnetic pole layer (SS2) 60, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58.

On the lower magnetic pole layer 60, a recording gap layer 61 made of a metal material such as for example Ru or an insulation material such as for example $SiO_2$ is laminated. An upper pole portion 62a of an upper magnetic pole layer 62, corresponding to a second magnetic pole layer in the present invention, made of a magnetic metal material such as for example FeAlSi, NiFe, CoFe, NiFeCo, FeN, FeZrN, FeTaN, CoZrNb or CoZrTa and a write coil layer 64 made of a conductive material such as for example Cu, surrounded by a coil insulation layer 63 of an insulating material such as a thermally cured resist are laminated on the recording gap layer 61. A lower pole portion 60a located at a top end section or an ABS-side end section of the lower magnetic pole layer 60 and the upper pole portion 62a located at a top end section or an ABS-side end section of the upper magnetic pole layer 62 are opposed to each other via the recording gap layer 61.

Although the write coil layer 64 in this embodiment is formed in a two-layered structure, it is apparent that this write coil layer 64 may be formed in a single-layered structure or other layered structure.

On the coil insulation layer 63 that covers the write coil layer 64, an upper yoke portion 62b of the upper magnetic pole layer 62 is formed. A protection layer 65 made of an insulating material such as for example $Al_2O_3$ is laminated on the upper pole portion 62a and the upper yoke portion 62b of the upper magnetic pole layer 62.

The inductive write head element horizontal or in-plane magnetic recording structure is mainly composed of the lower magnetic pole layer 60, the recording gap layer 61, the upper magnetic pole layer 62, the coil insulation layer 63 and the write coil layer 64.

An extremely thin coating film made of diamond like carbon (DLC) for example is coated on the magnetic disk side end surface of the MR read head element and the inductive write head element.

Lengths along a direction perpendicular to the ABS of the lower shield layer 52, the upper shield layer 55, the additional shield layer 57 and the lower magnetic pole layer 60 are substantially equal to each other. As a result, a linearity of the QST characteristics of the MR read head element improves.

It is desired, as in this embodiment, that a part of the lower magnetic pole layer 60 is directly laminated on the additional shield layer 57 and therefore the lower magnetic pole layer 60 and the additional shield layer 57 are electrically connected with each other. However, in modifications, the lower magnetic pole layer 60 and the additional shield layer 57 may not be electrically connected with each other. In the former case, they may be electrically connected at a rear end position of the additional shield layer 57 opposite to the ABS as shown in FIG. 5, or at other position. In this embodiment shown in FIG. 5, the additional shield layer 57 is electrically connected with the substrate 50 to have an electrical resistance of 100 Ω or less there between.

The coil insulation layer 63 and the write coil layer 64 are also formed in the rear region or anti ABS-side region of a back gap section 66 that magnetically connects the lower magnetic pole layer 60 and the upper magnetic pole layer 62 with each other.

In this rear region, a heatsink 67 for dissipating heat generated in the head to the substrate is formed. This heatsink 67 is formed as a multilayered structure of layers 52', 55' and 60' separated from the lower shield layer 52, the upper shield layer 55 and the lower magnetic pole layer 60 but kept in contact with one another. The bottom of the heatsink 67 is made contact with the substrate 50 via a through hole 51a formed by partially removing the under layer 51.

The heatsink 67 and the lower magnetic pole layer 60 are electrically connected to each other by a strip-shaped thin lead conductor 68. Because it is not located along the central section line, this conductor 68 is not shown in FIG. 4. However, in FIG. 6 that is an off-center sectional view, structure of this lead conductor 68 is illustrated.

The lead conductor 68 is made of a conductive material such as for example Cu but has a whole electrical resistance of several ohms because its thickness is thin as 0.1 μm for example and its width is considerably narrow. On the other hand, the heatsink 67 has a good electrical conductivity because it is made by a magnetic metal material. As aforementioned, the additional shield layer 57 is electrically connected with the lower magnetic pole layer 60, and therefore it is considered that the substrate 50 and the additional shield layer 57 is electrically connected by a resistance element with an electrical resistance of several ohms. As will be mentioned later, this electrical resistance is desired to be 100 Ω or less. It is desired to provide the heatsink 67, but it is not an absolute requirement. In modifications, the additional shield layer 57 may be grounded in another configuration through the lead conductor 68.

Figure 7:
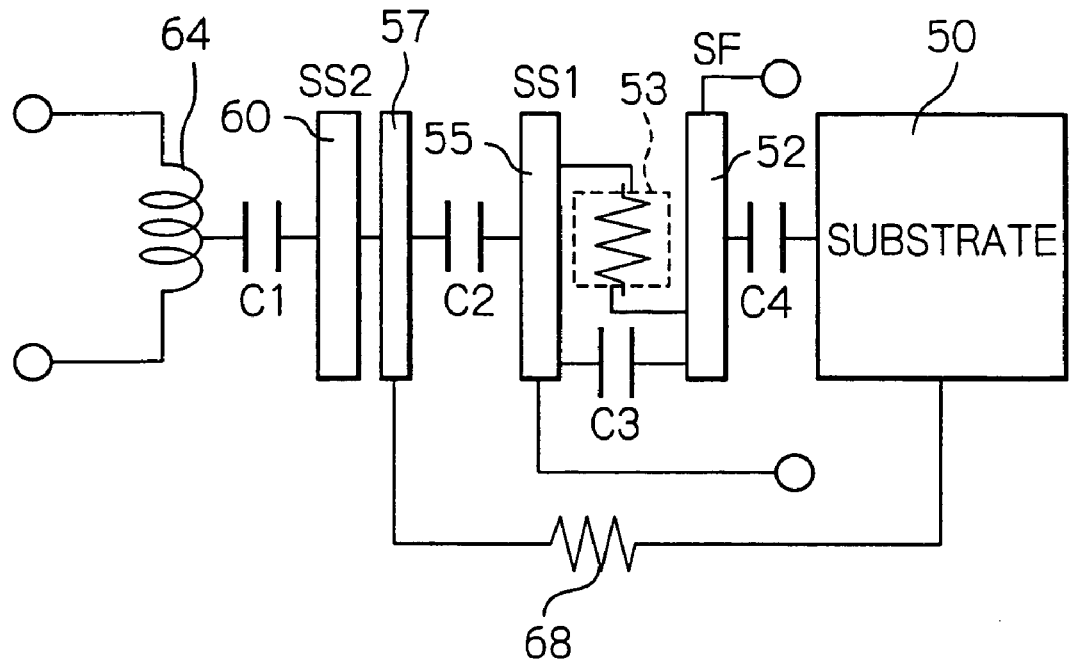
FIG. 7 is a circuit diagram schematically illustrating an equivalent circuit of the composite thin-film magnetic head.
Figure 8:
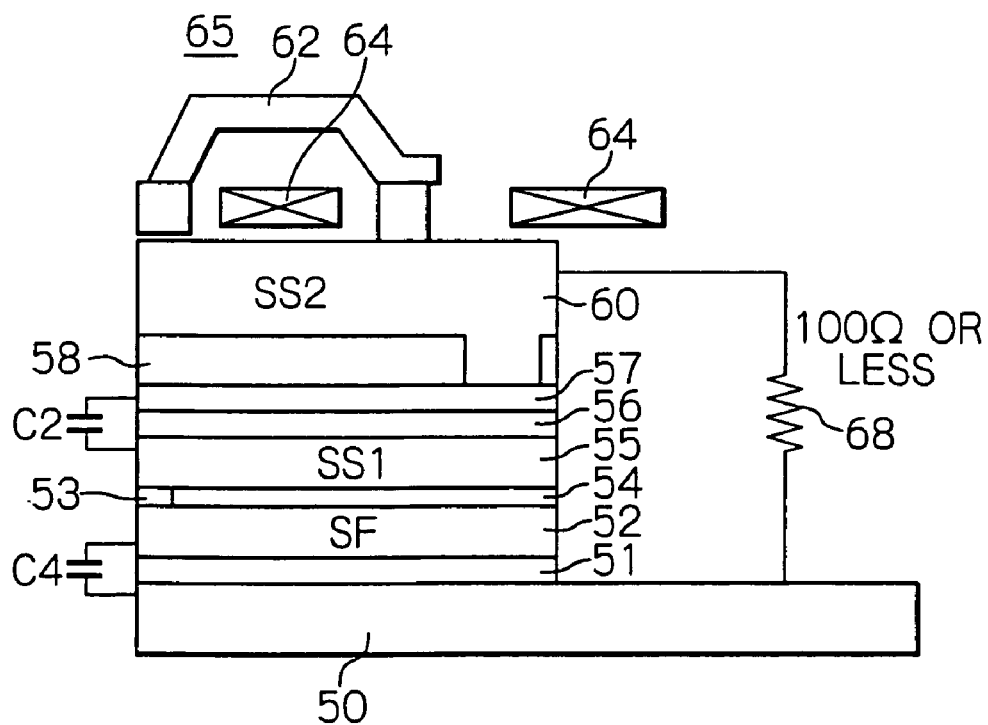
FIG. 8 is a view typically illustrating the sectional configuration along the direction perpendicular to ABS, of the composite thin-film magnetic head shown in FIG. 5.

FIG. 7 schematically illustrates an equivalent circuit of the composite thin-film magnetic head, and FIG. 8 typically illustrates the sectional configuration along the direction perpendicular to ABS, of the composite thin-film magnetic head shown in FIG. 5.

As shown in FIG. 7, in the composite thin-film magnetic head of this embodiment, a parasitic capacitance C1 is generated between the write coil 64 and the lower magnetic pole layer (SS2) 60 of the inductive write head element, a parasitic capacitance C2 is generated between the lower magnetic pole layer 60 or the additional shield layer 57 having the same potential as the lower magnetic pole layer 60 and the upper shield layer (SS1) 55 of the MR read head element, a parasitic capacitance C3 is generated between the upper shield layer 55 and the lower shield layer (SF) 52, and a parasitic capacitance C4 is generated between the lower shield layer 52 and the substrate 50.

As mentioned before, in order to reduce the crosstalk between the read head element and the write head element and influence of the external noises, it is required that (1) the substrate 50 and the lower magnetic pole layer 60 namely in this case the additional shield layer 57 are kept at the same potential, and (2) the parasitic capacitance C4 is kept substantially equal to the parasitic capacitance C2.

Figure 6:
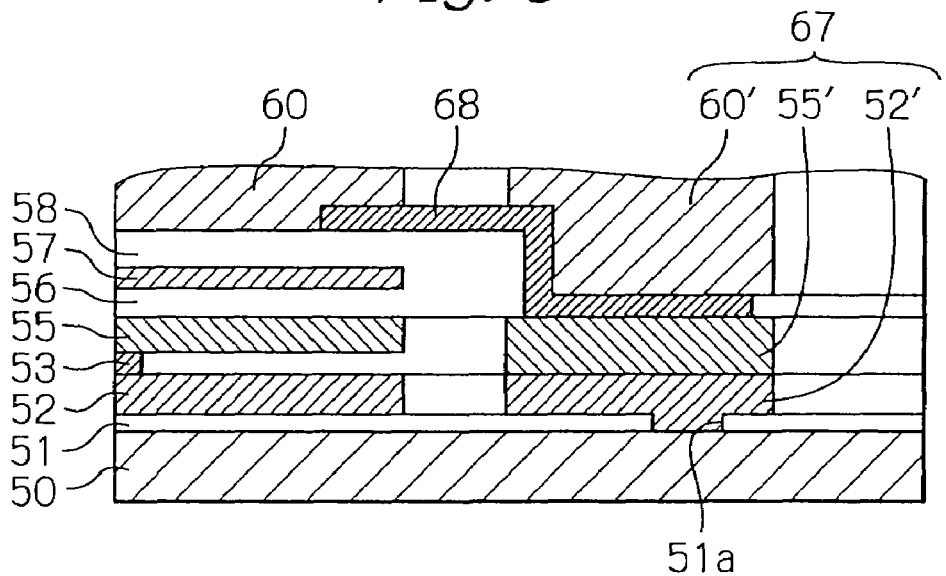
FIG. 6 is a view illustrating a configuration of lead conductors for electrically connecting a heatsink layer and a lower pole layer.

In this embodiment, as shown in FIG. 6, the requirement (1) is achieved by electrically connecting the substrate 50 and the additional shield layer 57 through the lower magnetic pole layer 60 by means of a resistance element with an electrical resistance of 100 Ω or less using the lead conductor 68 and the heatsink 67. Also, the requirement (2) is achieved by varying a dielectric constant or a thickness of the insulating material or an area of the counter electrode to adjust the parasitic capacitances C2 and/or C4 until C2=C4 is realized. That is, as is known, the parasitic capacitances C2 and C4 are obtained from the following formulas:

$$C2 = \in 2 \times S2/t2, \text{ and } C4 = \in 4 \times S4/t4$$

where $\in 2$ is a dielectric constant of the insulating material of the inter-shield insulation layer 56, $\in 4$ is a dielectric constant of the insulating material of the under layer 51, t2 is a thickness of the inter-shield insulation layer 56, t4 is a thickness of the under layer 51, S2 is an area of counter electrodes opposed to each other of the additional shield layer 57 and the upper shield layer 55, and S4 is an area of counter electrodes opposed to each other of the lower shield layer 52 and the substrate 50. Therefore, C2=C4 is attained by adjusting $\in 2$, $\in 4$, t2, t4, S2 and/or S4.

Figure 9:
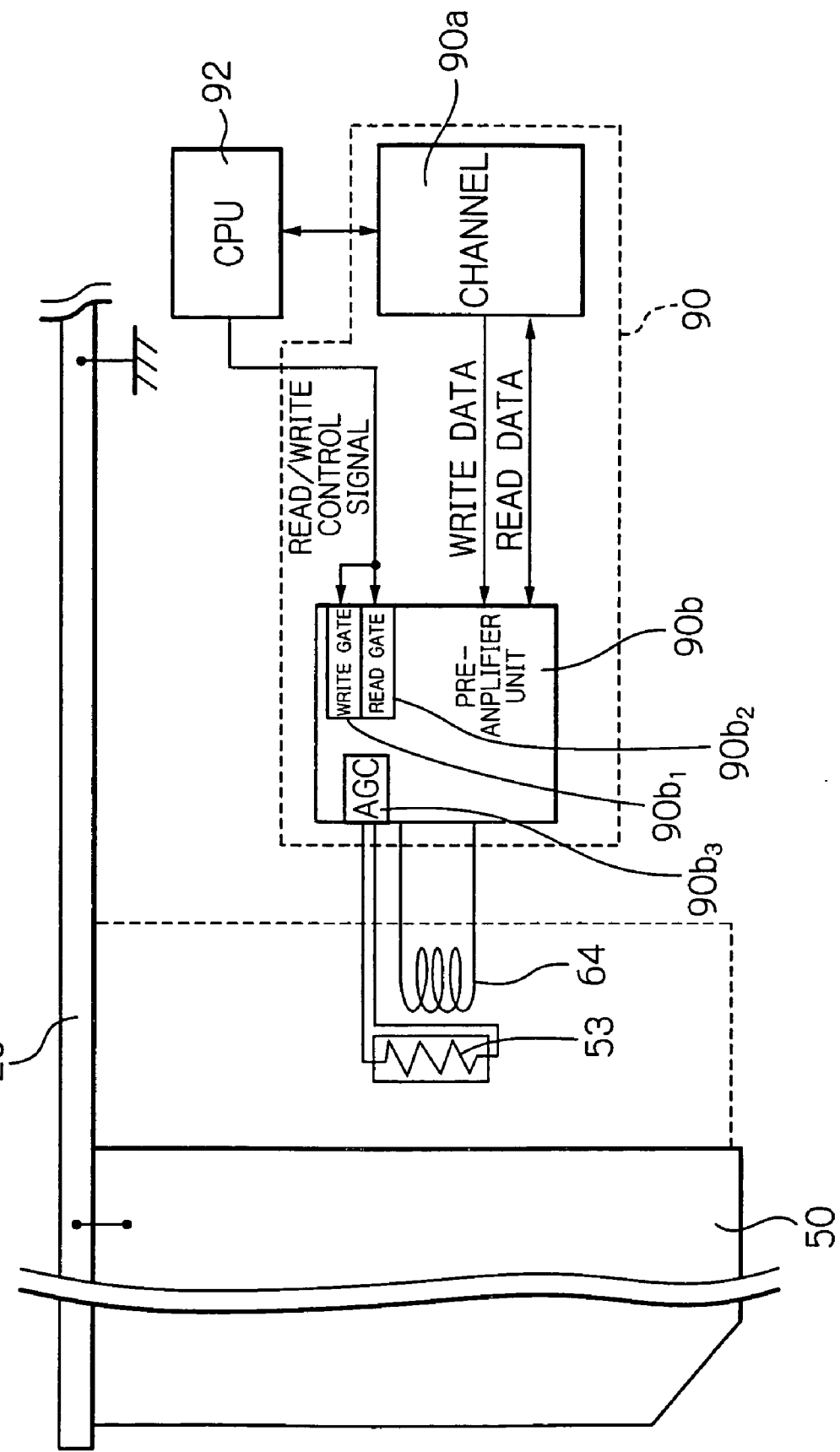
FIG. 9 is a block diagram illustrating a circuit configuration of a read/write control circuit in the magnetic disk drive apparatus shown in FIG. 1.

FIG. 9 illustrates a circuit configuration of the read/write control circuit 13 in the magnetic disk drive apparatus shown in FIG. 1.

In the figure, reference numeral 90 denotes a read/write circuit, and 92 denotes a central processing unit (CPU). The read/write circuit 90 has a read/write channel unit 90a and a preamplifier unit 90b.

Write data from the read/write channel unit 90a is provided to the preamplifier unit 90b. The preamplifier unit 90b receives at a write gate $90b_1$ a write control signal provided from the CPU 92, and supplies write current depending upon the write data to flow through the coil layer 64 of the inductive write head element only when the write control signal instructs to execute write operations. Thus, magnetic recording on the magnetic disk 10 (FIG. 1) is performed.

The preamplifier unit 90b also supplies a sense current to flow through the MR layer 53 of the MR read head element only when the read control signal provided thereto from the CPU 92 via a read gate $90b_2$ instructs to execute read operations. Read signals reproduced by the MR read head element and provided to the preamplifier unit 90b via an auto gain controller (AGC) $90b_3$ for stabilizing them are amplified and demodulated at the preamplifier unit 90b. Then obtained read data are provided to the read/write channel unit 90a.

It is apparent that the circuit configuration of the read/write circuit 13 is not limited to that shown in FIG. 9. The write operations and the read operations may be specified by signals other than the write control signal and the read control signal, respectively.

According to this embodiment, even if the insulation layer 58 is formed thicker to minimize transmitting amount of heat from the inductive write head element to the MR read head element, it is possible to reduce crosstalk voltage applied to the MR read head element from the inductive write head element because the additional shield layer 57 is formed between the lower magnetic pole layer 60 of the inductive write head element and the upper shield layer 55 of the MR read head element. Accordingly, deterioration of the MR read head element due to heat produced at the inductive write head element and also damage of the MR read head element due to the crosstalk voltage can be prevented from occurring.

In case of the TMR read head element, the reduction of the crosstalk voltage directly applied from the inductive write head element to the MR read head element can certainly prevent formation of pinholes in the barrier layer, so as to suppress reduction of the element resistance and deterioration of the reading characteristics. In case of the CPP-structure GMR read head element, the reduction of the crosstalk voltage directly applied from the inductive write head element to the MR read head element can prevent a decrease in operating life of the read head element due to an enhancement of electromigration and can also prevent a degradation of magnetic properties due to an enhancement of an interlayer diffusion of metal atoms.

According to this embodiment, further, the substrate 50 and the additional shield layer 57 become at substantially the same potential by electrically connecting them using the resistance element with an electrical resistance of 100 Ω or less, and $C2=C4$ is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero by adjusting the parasitic capacitance so that $C4=C2$. As a result, any external noise entered into the thin-film magnetic head is never presented on the reproduced signal to prevent error due to the external noises from occurring, and thus reliability of the head is improved.

Figure 10:
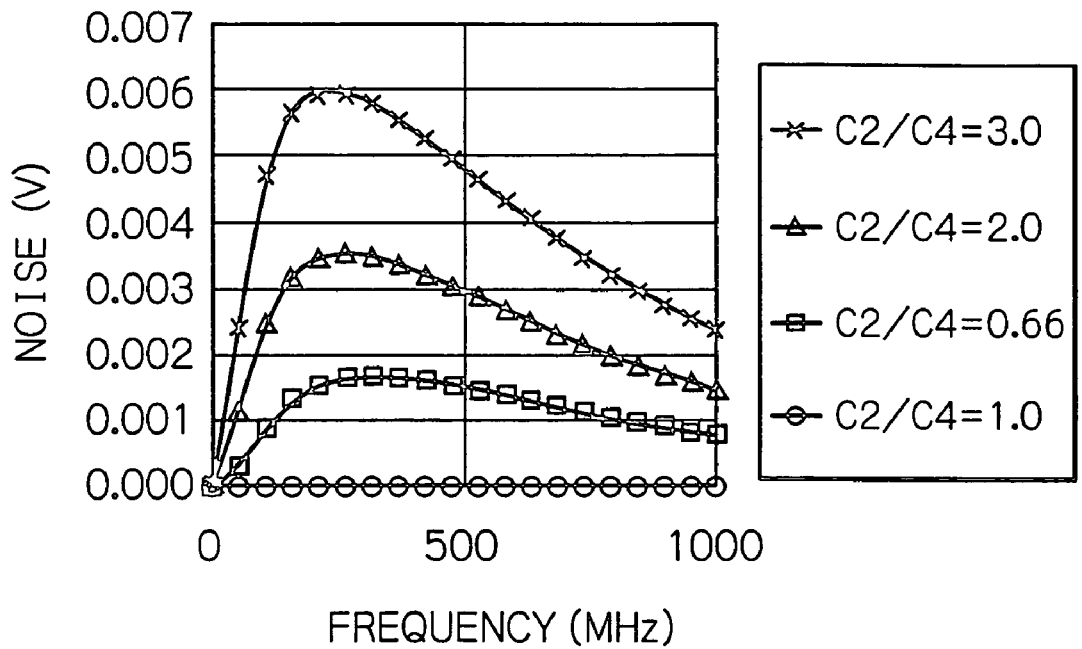
FIG. 10 is a graph illustrating characteristics of external noises (V) contained in reproduced signals with respect to a frequency (MHz) of the reproduced signal when a ratio of parasitic capacitances C2/C4 is considered as a parameter.

FIG. 10 illustrates characteristics of external noises (V) contained in reproduced signals with respect to a frequency (MHz) of the reproduced signal when a ratio of the parasitic capacitances $C2/C4$ is considered as a parameter.

As will be apparent from the figure, noise hardly occurs when $C2/C4=1$.

Figure 11:
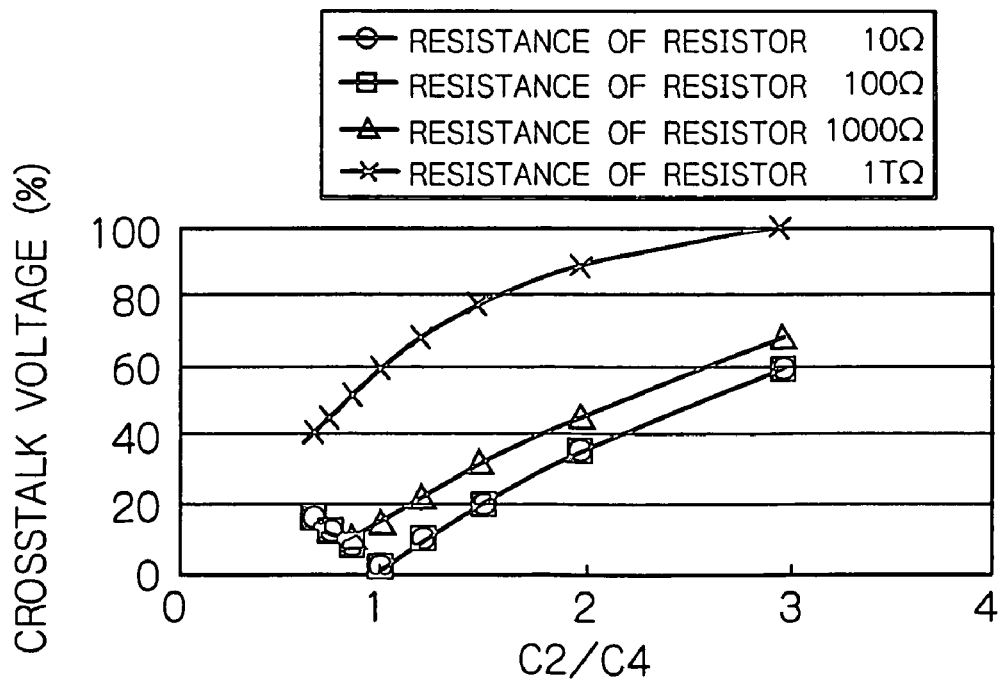
FIG. 11 is a graph illustrating characteristics of crosstalk voltage (%) with respect to a ratio of parasitic capacitances C2/C4 when an electrical resistance of a resistance element connected between a substrate and a lower magnetic pole layer is considered as a parameter.

FIG. 11 illustrates characteristics of crosstalk voltage (%) with respect to a ratio of the parasitic capacitances $C2/C4$ when an electrical resistance of the resistance element connected between the substrate 50 and the additional shield layer 57 is considered as a parameter.

As will be also apparent from this figure, no crosstalk occurs when the resistance of the resistance element is 100 Ω or less and $C2/C4=1$.

Figure 12:
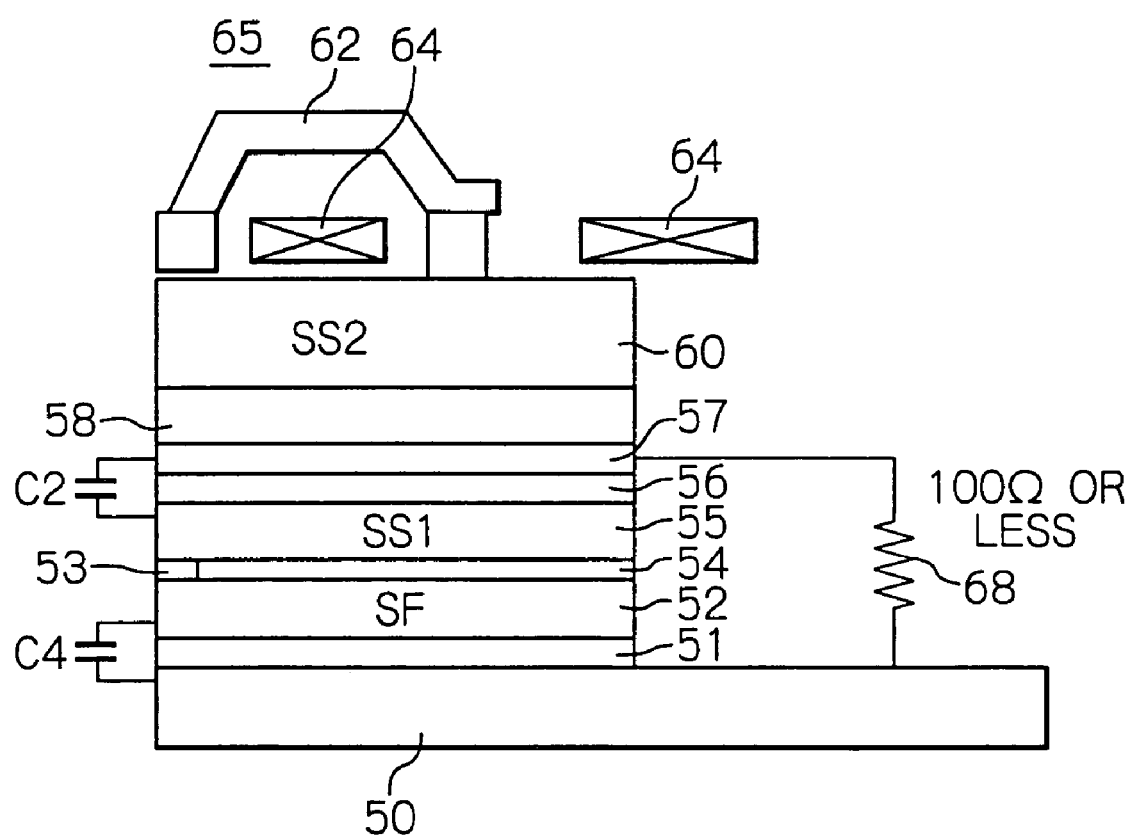
FIG. 12 is a view typically illustrating a sectional configuration along the direction perpendicular to ABS, of a composite thin-film magnetic head in another embodiment according to the present invention.

FIG. 12 typically illustrates a sectional configuration along the direction perpendicular to ABS, of a composite thin-film magnetic head in another embodiment according to the present invention.

In this embodiment, the lower magnetic pole layer 60 and the additional shield layer 57 are not electrically connected. Another configuration in this embodiment is the same as that in the embodiment shown in FIGS. 1-11. Also, in FIG. 12, the same components as those in FIG. 8 use the same reference numerals.

As well as the layer configuration shown in FIG. 8, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57.

In case that the lower magnetic pole layer 60 is not electrically conducted with the additional shield layer 57, a parasitic capacitance C1 may be produced between the write coil 64 of the write head element and the additional shield layer 57. However, in this embodiment, the lead conductor 68 is connected directly to the additional shield layer 57 so that the additional shield layer 57 and the substrate 50 is electrically conducted with an electrical resistance of 100 Ω or less.

Operations and advantages of this embodiment are the same as those in the embodiment of FIGS. 1-11.

Figure 13:
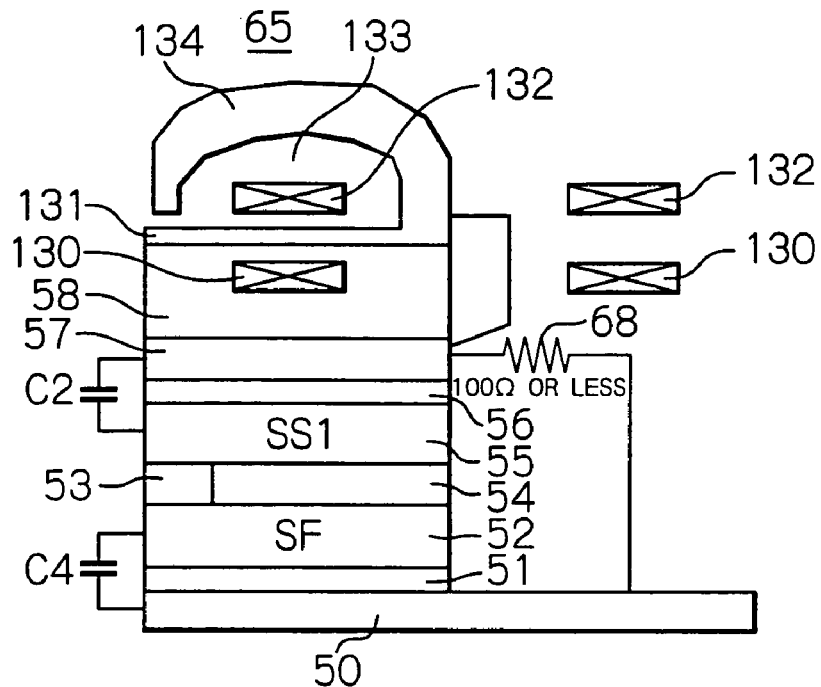
FIG. 13 is a view typically illustrating a sectional configuration along the direction perpendicular to ABS, of a composite thin-film magnetic head in further embodiment according to the present invention.

FIG. 13 typically illustrates a sectional configuration along the direction perpendicular to ABS, of a composite thin-film magnetic head in further embodiment according to the present invention.

In this embodiment, a write head element with a perpendicular magnetic recording structure is used as the inductive write head element. Another configuration in this embodiment is the same as that in the embodiment shown in FIGS. 1-11. Also, in FIG. 13, the same components as those in FIG. 8 use the same reference numerals.

As well as the layer configuration shown in FIG. 8, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57.

A main magnetic pole layer 131, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58. This main magnetic pole layer 131 constitutes a magnetic path for converging and for guiding a magnetic flux induced by a write coil 132 made of a conductive material such as for example Cu to a perpendicular magnetic recording layer of the magnetic disk at which magnetic recording is performed. On the main magnetic pole layer 131, a coil insulation layer 133 made of an insulating material such as a thermally cured resist is formed to surround the write coil 132.

At an upper region in the insulation layer 58, formed is a backing coil layer 130 made of a conductive material such as for example Cu for inducing a magnetic flux to prevent the write magnetic flux from bringing adjacent track erase (ATE).

An auxiliary magnetic pole layer or return yoke layer 134, corresponding to a second magnetic pole layer in the present invention, made of a magnetic metal material such as for example FeAlSi, NiFe, CoFe, NiFeCo, FeN, FeZrN, FeTaN, CoZrNb or CoZrTa is formed on the coil insulation layer 133. A protection layer 65 made of an insulating material such as for example $Al_2O_3$ is laminated on the auxiliary magnetic pole layer 134.

The backing coil layer 130 and the write coil layer 132 may be formed in a single-layered structure, a two or more-layered structure, or a helical coil structure.

The inductive write head element with the perpendicular magnetic recording structure is mainly composed of the main magnetic pole layer 131, the auxiliary magnetic pole layer 134, the coil insulation layer 133, the write coil layer 132 and the backing coil layer 130.

The main magnetic pole layer 131 at the end surface of the head opposed to a magnetic disk surface is formed thin so as to generate a fine write magnetic field that permits high-density magnetic recording. The end portion of the auxiliary magnetic pole layer 134 opposed to the magnetic disk surface constitutes a trailing shield portion with a layer section greater than that of the remaining portion of this auxiliary magnetic pole layer 134 so that a magnetic field gradient between this trailing shield section and the main magnetic pole layer 131 becomes more steeply. As a result, jitter in the reproduced signal is reduced and therefore an error rate at the reading operations becomes lower.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the main magnetic pole layer 131 are substantially equal to each other. As a result, a linearity of the QST characteristics of the MR read head element improves.

It is desired, as in this embodiment, that the main magnetic pole layer 131 be electrically connected with the additional shield layer 57. However, in modifications, the main magnetic pole layer 131 and the additional shield layer 57 may not be electrically connected with each other. In this embodiment, the additional shield layer 57 is electrically connected with the substrate 50 via the lead conductor 68 and the heatsink 57 (not shown in FIG. 13) to have an electrical resistance of few ohms between the additional shield layer 57 and the substrate 50. This resistance is desired to be 100 Ω or less. It is desired to provide the heatsink, but it is not an absolute requirement. In modifications, the additional shield layer 57 may be grounded in another configuration through the lead conductor 68.

Operations and advantages of this embodiment are the same as those in the embodiment of FIGS. 1-11.

Figure 14:
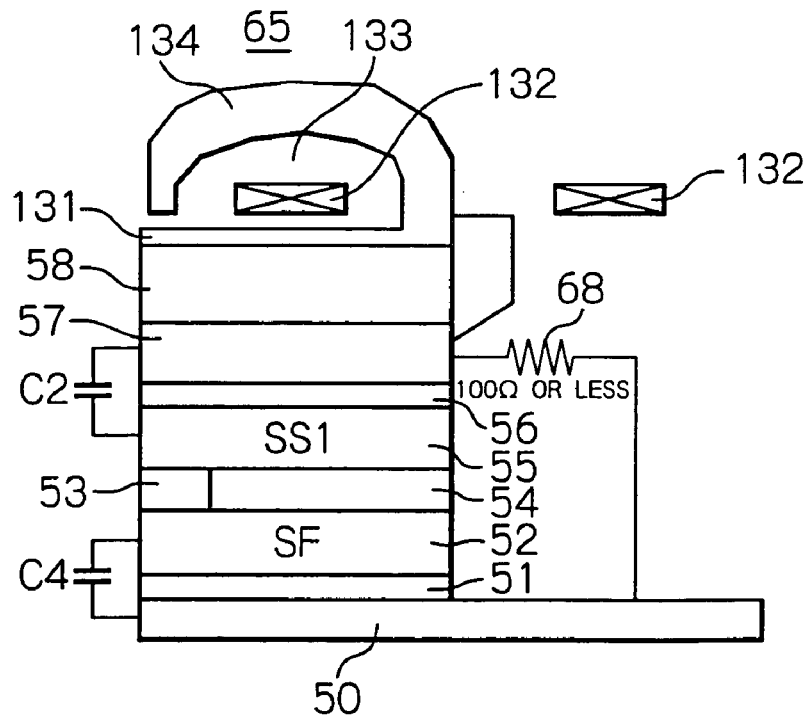
FIG. 14 is a view typically illustrating a sectional configuration along the direction perpendicular to ABS, of a composite thin-film magnetic head in still further embodiment according to the present invention.

FIG. 14 typically illustrates a sectional configuration along the direction perpendicular to ABS, of a composite thin-film magnetic head in still further embodiment according to the present invention.

In this embodiment, a write head element with a perpendicular magnetic recording structure having no backing coil layer is used as the inductive write head element. Another configuration in this embodiment is the same as that in the embodiment shown in FIGS. 1-11, in the embodiment shown in FIG. 12, and in the embodiment shown in FIG. 13. Also, in FIG. 14, the same components as those in FIGS. 8, 12 and 13 use the same reference numerals. Operations and advantages of this embodiment are the same as those in the embodiment of FIGS. 1-11, in the embodiment shown in FIG. 12, and in the embodiment shown in FIG. 13.

Figure 15:
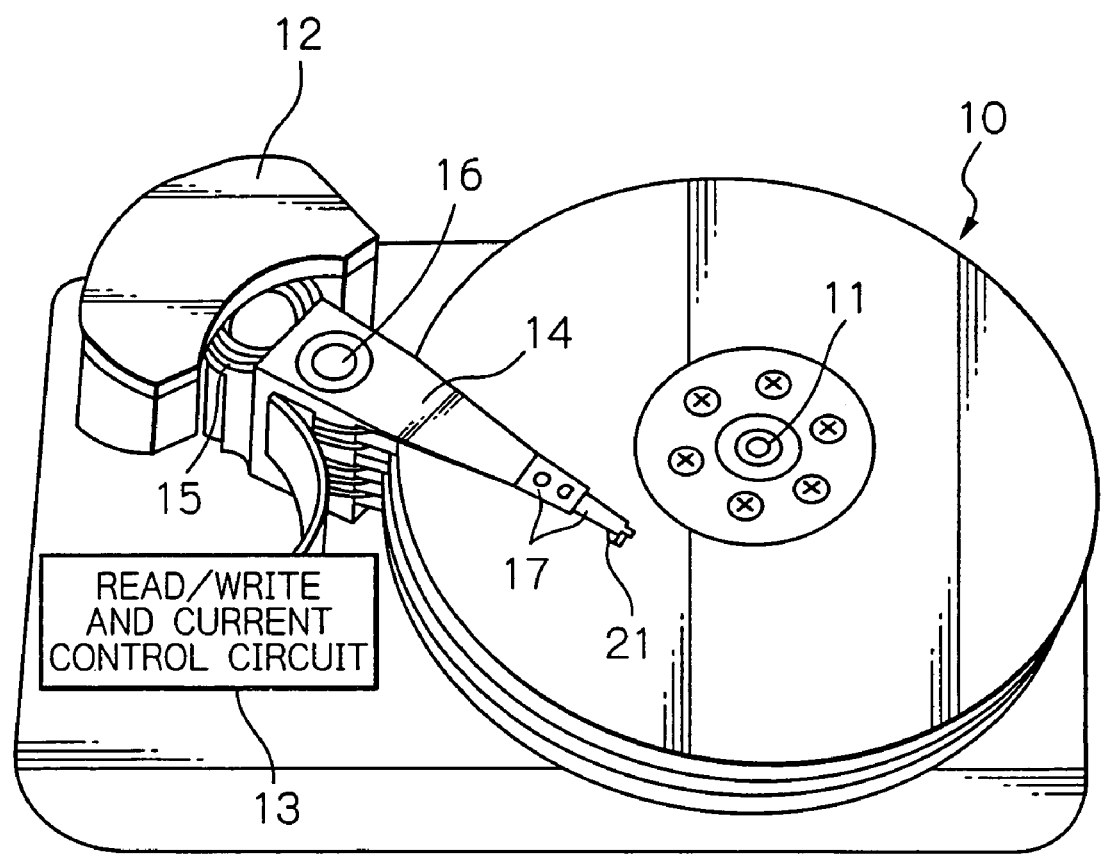
FIG. 15 is an oblique view schematically illustrating main components of a magnetic disk drive apparatus as further embodiment of the present invention.
Figure 16:
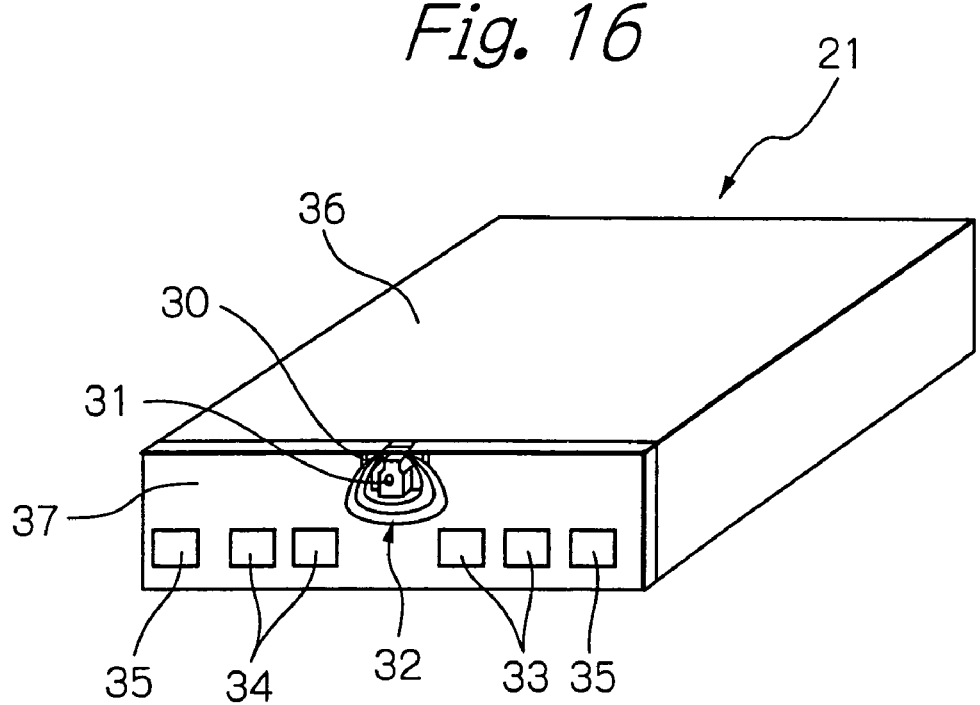
FIG. 16 is an oblique view illustrating a composite thin-film magnetic head mounted at a top end section of the HGA shown in FIG. 15.

FIG. 15 schematically illustrates main components of a magnetic disk drive apparatus as further embodiment of the present invention, and FIG. 16 illustrates a composite thin-film magnetic head mounted at a top end section of the HGA shown in FIG. 15. The configuration example of the HGA in this embodiment is the same as shown in FIG. 2, and the magnetic head element portion of the composite thin-film magnetic head in this embodiment, seen from an element-formed side of a slider substrate is the same as shown in FIG. 4. Thus, in this embodiment, the same components as those in the embodiment of FIGS. 1-11 use the same reference numerals.

In FIG. 15, reference numeral 10 denotes a plurality of magnetic hard disks rotating around a rotation axis of a spindle motor 11, 12 denotes an assembly carriage device for positioning each composite thin-film magnetic head or magnetic head slider on a track of each disk, and 13' denotes a read/write and current control circuit for controlling read and write operations and heating operations of the magnetic head, respectively.

The assembly carriage device 12 has a plurality of drive arms 14 stacked along a pivot-bearing axis 16. These drive arms 14 are capable of rotating around the axis 16 and driven by a VCM 15. An HGA 17 is mounted on a top section of each arm 14. Each HGA 17 has the composite thin-film magnetic head or the magnetic head slider 21 mounted at its top end section so that the slider opposes to a surface of each magnetic disk 10. In modifications, a single magnetic disk 10, a single drive arm 14 and a single HGA 17 may be provided.

As shown in FIG. 2, the HGA is assembled by fixing the composite thin-film magnetic head or magnetic head slider 21 having an inductive write head element and a CPP-structure MR read head element to a top end section of a suspension 20, and by electrically connecting one ends of trace conductors to terminal electrodes of the thin-film magnetic head 21.

The suspension 20 is substantially constituted by a load beam 22 for producing a load to be applied to the composite thin-film magnetic head 21, a resilient flexure 23 fixed on and supported by the load beam 22, a base plate 24 attached or formed at a base end section of the load beam 22, and a lead conductor member 25 fixed on the flexure 23 and the load beam 22 and provided with the trace conductors and connection pads electrically connected both ends of the trace conductors.

A structure of the suspension of the HGA that is the magnetic head assembly according to the present invention is not limited to the aforementioned structure. Furthermore, although it is not shown, a head drive IC chip may be mounted on a middle of the suspension 20.

As shown in FIGS. 16 and 4, the thin-film magnetic head or magnetic head slider 21 in this embodiment has, on its element-forming surface 37 that is one side surface of the head with respect to its bottom surface consisting of an air bearing surface (ABS) 36, a composite magnetic head element 32 consisting of an MR read head element 30 and an inductive write head element 31 laminated each other, four signal electrode terminals 33 and 34 electrically connected to these elements 30 and 31, and two drive electrode terminals 35 electrically connected to a heater (not shown in FIG. 16). The positions of these electrode terminals are not limited to these shown in FIG. 16. The number of the electrode terminals is also not limited to six as shown in FIG. 16, but may be five in case that one end of the heater is connected to one drive electrode terminal and the other end of the heater is grounded to the slider substrate.

Figure 17:
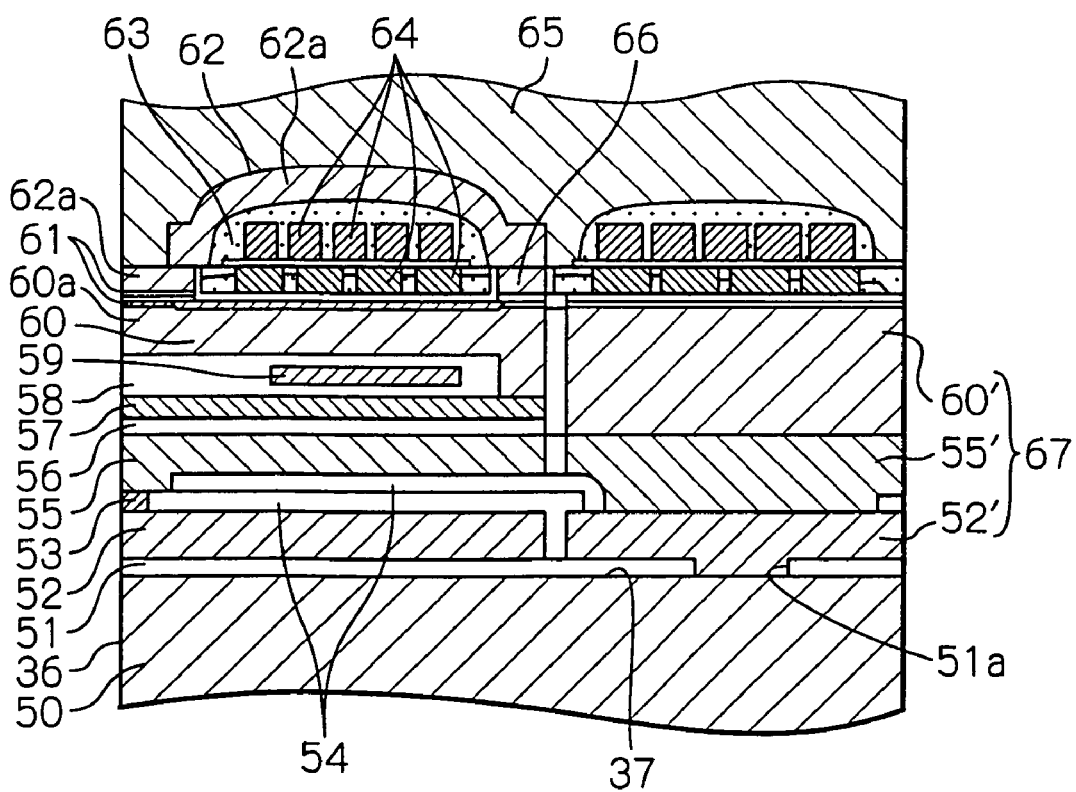
FIG. 17 is a center sectional view schematically illustrating the configuration of the composite thin-film magnetic head shown in FIG. 16.

FIG. 17 shows a V-V line section of FIG. 4 schematically illustrating a configuration of the composite thin-film magnetic head in this embodiment. The inductive write head element in this embodiment is a write head element with a horizontal or in-plane magnetic recording structure.

On a substrate or a slider substrate 50 made of a conductive material such as for example $Al_2O_3$—TiC (AlTiC), the ABS 36 to be opposed to the magnetic disk surface is formed. In operations, the magnetic head slider 21 fluid-dynamically flies above the surface of the rotating magnetic disk with a predetermined height. An under layer 51 made of an insulating material such as for example $Al_2O_3$ or $SiO_2$ with a thickness of 0.05-10 μm is laminated on the element-forming surface 37 of the substrate or a slider substrate 50.

On the under layer 51, laminated is a lower shield layer (SF) 52 that also operates as a lower electrode layer and is made of a magnetic metal material such as for example FeAlSi, NiFe, CoFe, NiFeCo, FeN, FeZrN, FeTaN, CoZrNb or CoZrTa.

The lower shield layer 52 is opposed to the substrate 50 via the under layer 51, and therefore this lower shield layer 52 and the substrate 50 function as counter electrodes to generate a parasitic capacitance C4 there between.

On the lower shield layer 52, an MR layer 53 with the CPP structure and an insulation layer 54 made of an insulating material such as for example $Al_2O_3$ or $SiO_2$ are laminated.

The CPP-structure MR layer 53 will be formed from, in case of a CPP-GMR layer, a multilayered structure including a free layer of a ferromagnetic material such as for example NiFe, CoFe or NiFeCo, a nonmagnetic layer of a nonmagnetic conductive material such as for example Cu, a pinned layer of a ferromagnetic material such as for example NiFe, CoFe or NiFeCo, and a pinning layer of an antiferromagnetic material such as for example PtMn, FeMn, MnIr, NiMn or CrMnPt. In case of a TMR layer, the CPP-structure MR layer 53 will be formed from a multilayered structure including a free layer of a ferromagnetic material such as for example NiFe, CoFe or NiFeCo, a thin barrier layer of an insulation material such as for example oxides of Ti, Ta, Al, Zr, Hf, Si, Mg or Zn, a pinned layer of a ferromagnetic material such as for example NiFe, CoFe or NiFeCo, and a pinning layer of an antiferromagnetic material such as for example PtMn, FeMn, MnIr, NiMn or CrMnPt. The multilayered structure of the CPP-structure MR layer 53 is not limited to the abovementioned structure but various layer configurations will be of course possible. Although not shown in the figures, the MR layer 53 may have a magnetic domain control layer and other necessary layers.

On the CPP-structure MR layer 53 and the insulation layer 54, laminated is an upper shield layer (SS1) 55 that also operates as an upper electrode layer and is made of a magnetic metal material such as for example FeAlSi, NiFe, CoFe, NiFeCo, FeN, FeZrN, FeTaN, CoZrNb or CoZrTa.

The CPP-structure MR read head element is mainly composed of the lower shield layer 52, the MR layer 53, the insulation layer 54, the upper shield layer 55, the magnetic domain control layer and a lead conductor layer not shown.

On the upper shield layer 55, an inter-shield insulation layer 56 made of an insulating material such as for example $Al_2O_3$ or $SiO_2$ is laminated. An additional shield layer 57 made of a metal material or a magnetic metal material such as for example FeAlSi, NiFe, CoFe, NiFeCo, FeN, FeZrN, FeTaN, CoZrNb or CoZrTa with a thickness of preferably about 0.05-2 µm is laminated on the inter-shield insulation layer 56.

An insulation layer 58 made of an insulating material such as for example $Al_2O_3$ or $SiO_2$ is laminated on the additional shield layer 57. In this insulation layer 58, the heater 59 is formed.

The heater 59 may be formed in a strip shape or other shape such as for example one turn or multi turn helical coil shape with a circular or rectangular section. In case that the heater 59 has a strip shape, it may have for example a thickness of about 0.1-5 µm and a width the track width direction of about 0.1-20 µm. The heater 59 is made of for example a material containing NiCu. The content of Ni in NiCu is for example about 15-60 atomic % and preferably about 25-45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

The hater 59 may also be made of for example a material containing NiCr. In this case, the content of Ni in NiCr is about 55-90 atomic % and preferably about 70-85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heater 59 may be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less.

The lead electrodes 46b and 46c may also be made of the same material as that of the heat generating section 46a.

A lower magnetic pole layer (SS2) 60, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58.

On the lower magnetic pole layer 60, a recording gap layer 61 made of a metal material such as for example Ru or an insulation material such as for example $SiO_2$ is laminated. An upper pole portion 62a of an upper magnetic pole layer 62, corresponding to a second magnetic pole layer in the present invention, made of a magnetic metal material such as for example FeAlSi, NiFe, CoFe, NiFeCo, FeN, FeZrN, FeTaN, CoZrNb or CoZrTa and a write coil layer 64 made of a conductive material such as for example Cu, surrounded by a coil insulation layer 63 of an insulating material such as a thermally cured resist are laminated on the recording gap layer 61. A lower pole portion 60a located at a top end section or an ABS-side end section of the lower magnetic pole layer 60 and the upper pole portion 62a located at a top end section or an ABS-side end section of the upper magnetic pole layer 62 are opposed to each other via the recording gap layer 61.

Although the write coil layer 64 in this embodiment is formed in a two-layered structure, it is apparent that this write coil layer 64 may be formed in a single-layered structure or other layered structure.

On the coil insulation layer 63 that covers the write coil layer 64, an upper yoke portion 62b of the upper magnetic pole layer 62 is formed. A protection layer 65 made of an insulating material such as for example $Al_2O_3$ is laminated on the upper pole portion 62a and the upper yoke portion 62b of the upper magnetic pole layer 62.

The inductive write head element horizontal or in-plane magnetic recording structure is mainly composed of the lower magnetic pole layer 60, the recording gap layer 61, the upper magnetic pole layer 62, the coil insulation layer 63 and the write coil layer 64.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the lower magnetic pole layer 60 are substantially equal to each other. As a result, a linearity of the QST characteristics of the MR read head element improves.

It is desired, as in this embodiment, that a part of the lower magnetic pole layer 60 is directly laminated on the additional shield layer 57 and therefore the lower magnetic pole layer 60 and the additional shield layer 57 are electrically connected with each other. However, in modifications, the lower magnetic pole layer 60 and the additional shield layer 57 may not be electrically connected with each other. In the former case, they may be electrically connected at a rear end position of the additional shield layer 57 opposite to the ABS as shown in FIG. 17, or at other position. In this embodiment shown in FIG. 17, the additional shield layer 57 is electrically connected with the substrate 50 to have an electrical resistance of 100 Ω or less there between.

The coil insulation layer 63 and the write coil layer 64 are also formed in the rear region or anti ABS-side region of a back gap section 66 that magnetically connects the lower magnetic pole layer 60 and the upper magnetic pole layer 62 with each other.

In this rear region, a heatsink 67 for dissipating heat generated in the head to the substrate is formed. This heatsink 67 is formed as a multilayered structure of layers 52', 55' and 60' separated from the lower shield layer 52, the upper shield layer 55 and the lower magnetic pole layer 60 but kept in contact with one another. The bottom of the heatsink 67 is made contact with the substrate 50 via a through hole 51a formed by partially removing the under layer 51.

The heatsink 67 and the lower magnetic pole layer 60 are electrically connected to each other by a strip-shaped thin lead conductor 68. Because it is not located along the central section line, this conductor 68 is not shown in FIG. 4. However, in FIG. 6 that is an off-center sectional view, structure of this lead conductor 68 is illustrated.

The lead conductor 68 is made of a conductive material such as for example Cu but has a whole electrical resistance of several ohms because its thickness is thin as 0.1 µm for example and its width is considerably narrow. On the other hand, the heatsink 67 has a good electrical conductivity because it is made by a magnetic metal material. As aforementioned, the additional shield layer 57 is electrically connected with the lower magnetic pole layer 60, and therefore it is considered that the substrate 50 and the additional shield layer 57 is electrically connected by a resistance element with an electrical resistance of several ohms. As will be mentioned later, this electrical resistance is desired to be 100 Ω or less. It is desired to provide the heatsink 67, but it is not an absolute requirement. In modifications, the additional shield layer 57 may be grounded in another configuration through the lead conductor 68. In a modification in which the additional shield layer 57 is not electrically connected with the lower magnetic pole layer 60, the lead conductor 68 may be directly connected to the additional shield layer 57.

Figure 18:
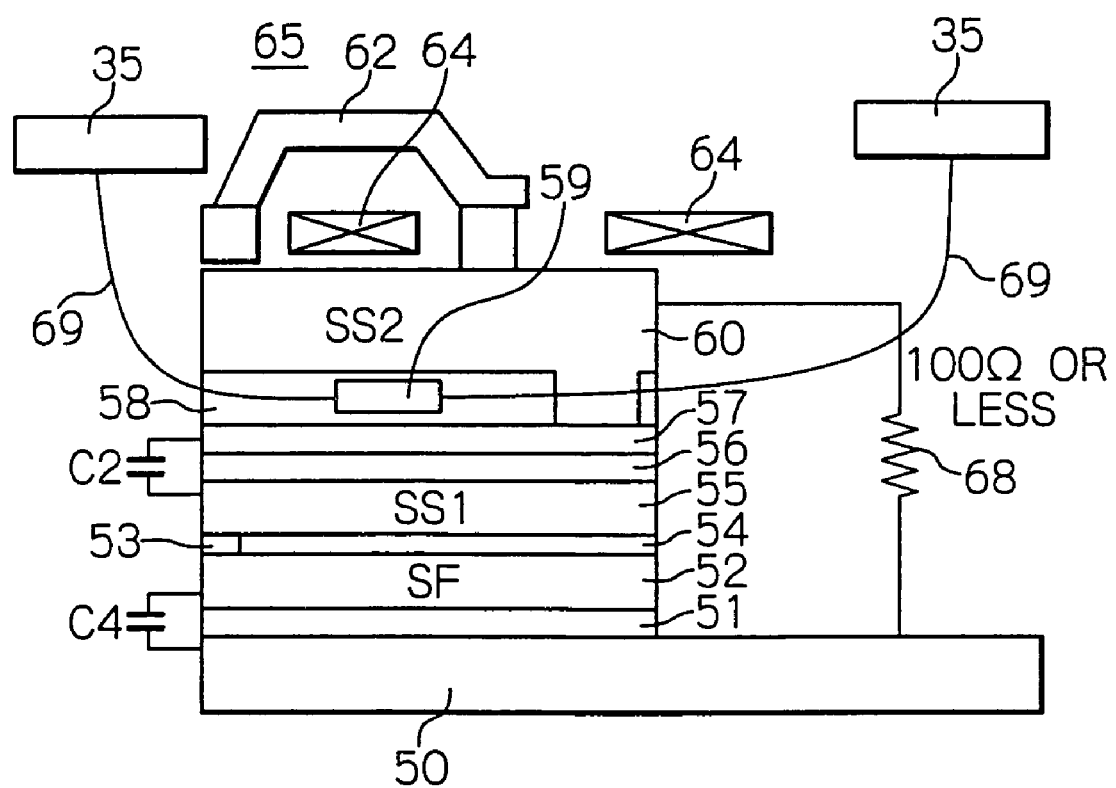
FIG. 18 is a view typically illustrating the sectional configuration along the direction perpendicular to ABS, of the composite thin-film magnetic head shown in FIG. 17.

Schematic equivalent circuit of the composite thin-film magnetic head in this embodiment is the same as that shown in FIG. 7. FIG. 18 typically illustrates the sectional configuration along the direction perpendicular to ABS, of this composite thin-film magnetic head.

As shown in FIGS. 7 and 18, in the composite thin-film magnetic head of this embodiment, a parasitic capacitance C1 is generated between the write coil 64 and the lower magnetic pole layer (SS2) 60 of the inductive write head element, a parasitic capacitance C2 is generated between the lower magnetic pole layer 60 or the additional shield layer 57 having the same potential as the lower magnetic pole layer 60 and the upper shield layer (SS1) 55 of the MR read head element, a parasitic capacitance C3 is generated between the upper shield layer 55 and the lower shield layer (SF) 52, and a parasitic capacitance C4 is generated between the lower shield layer 52 and the substrate 50.

As mentioned before, in order to reduce the crosstalk between the read head element and the write head element and influence of the external noises, it is required that (1) the substrate 50 and the lower magnetic pole layer 60 namely in this case the additional shield layer 57 are kept at the same potential, and (2) the parasitic capacitance C4 is kept substantially equal to the parasitic capacitance C2.

In this embodiment, as shown in FIG. 16, the requirement (1) is achieved by electrically connecting the substrate 50 and the additional shield layer 57 through the lower magnetic pole layer 60 by means of a resistance element with an electrical resistance of 100 Ω or less using the lead conductor 68 and the heatsink 67. Also, the requirement (2) is achieved by varying a dielectric constant or a thickness of the insulating material or an area of the counter electrode to adjust the parasitic capacitances C2 and/or C4 until C2=C4 is realized. That is, as is known, the parasitic capacitances C2 and C4 are obtained from the following formulas:

$$C2 = \epsilon_2 \times S2/t2, \text{ and } C4 = \epsilon_4 \times S4/t4$$

where $\epsilon_2$ is a dielectric constant of the insulating material of the inter-shield insulation layer 56, $\epsilon_4$ is a dielectric constant of the insulating material of the under layer 51, t2 is a thickness of the inter-shield insulation layer 56, t4 is a thickness of the under layer 51, S2 is an area of counter electrodes opposed to each other of the additional shield layer 57 and the upper shield layer 55, and S4 is an area of counter electrodes opposed to each other of the lower shield layer 52 and the substrate 50. Therefore, C2=C4 is attained by adjusting $\epsilon_2$, $\epsilon_4$, t2, t4, S2 and/or S4.

As shown in FIG. 18, the heater 59 is connected between two drive electrode terminals 35 through lead conductors 69. The lead conductors 69 are made of a conductive material with a low resistance such as for example Cu. However, in modifications, the lead conductor 69 may be formed by the same material as that of the heater 59.

Figure 19:
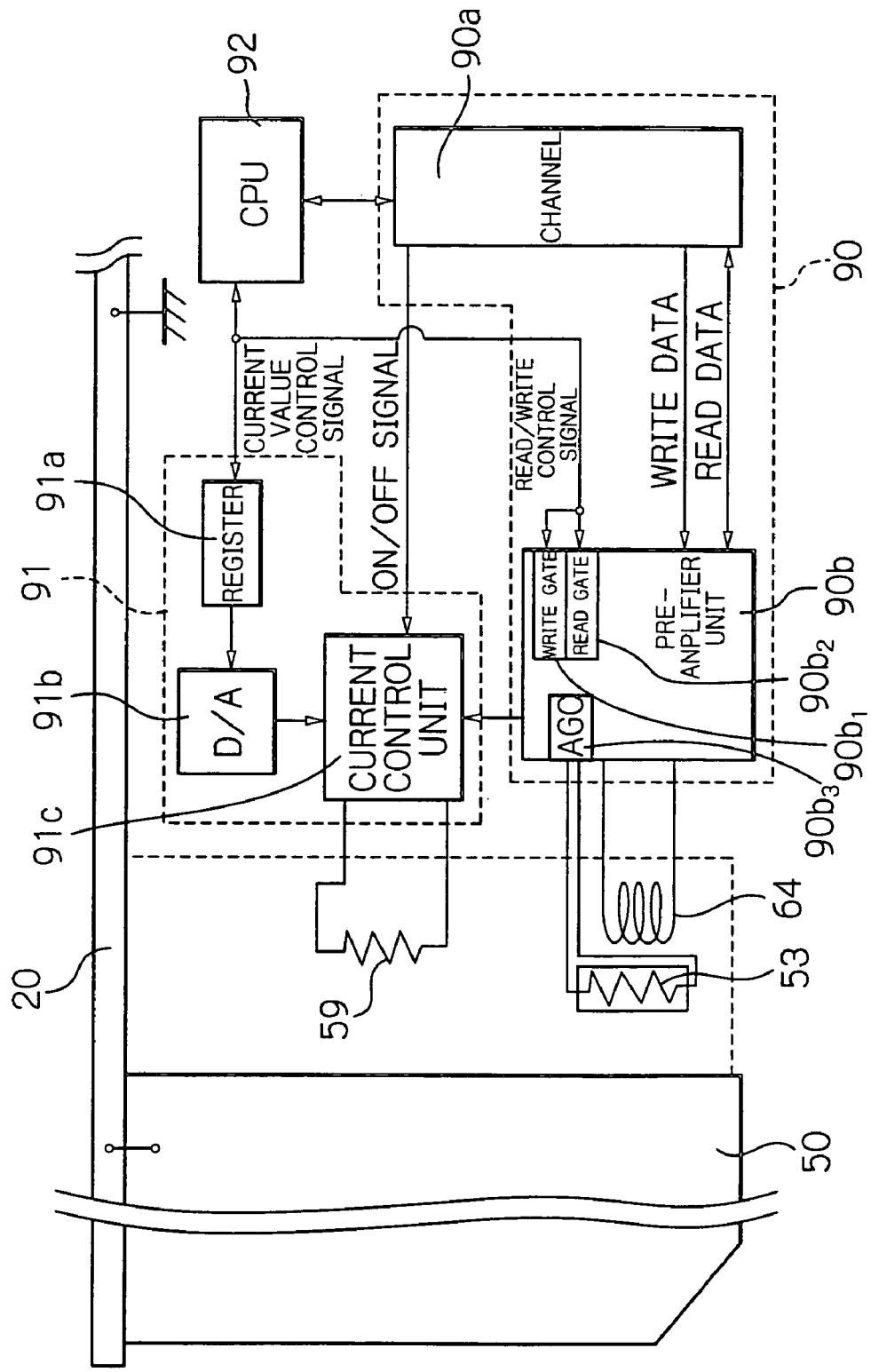
FIG. 19 is a block diagram illustrating a circuit configuration of a read/write and current control circuit in the magnetic disk drive apparatus shown in FIG. 15.

FIG. 19 illustrates a circuit configuration of the read/write and current control circuit 13' in the magnetic disk drive apparatus shown in FIG. 15.

In the figure, reference numeral 90 denotes a read/write circuit, 91 denotes a current control circuit, and 92 denotes a CPU. The read/write circuit 90 has a read/write channel unit 90a and a preamplifier unit 90b. The current control circuit 91 has a register 91a, a digital/analog (D/A) converter 91b and a current control unit 91c.

Write data from the read/write channel unit 90a is provided to the preamplifier unit 90b. The preamplifier unit 90b receives at a write gate $90b_1$ a write control signal provided from the CPU 92, and supplies write current depending upon the write data to flow through the coil layer 64 of the inductive write head element only when the write control signal instructs to execute write operations. Thus, magnetic recording on the magnetic disk 10 (FIG. 15) is performed.

The preamplifier unit 90b also supplies a sense current to flow through the MR layer 53 of the MR read head element only when the read control signal provided thereto from the CPU 92 via a read gate $90b_2$ instructs to execute read operations. Read signals reproduced by the MR read head element and provided to the preamplifier unit 90b via an AGC $90b_3$ for stabilizing them are amplified and demodulated at the preamplifier unit 90b. Then obtained read data are provided to the read/write channel unit 90a.

The current control unit 91c of the current control circuit 91 receives a heater on/off signal provided from the read/write channel 90a and a current-value control signal provided from the CPU 92 via the register 91a and the D/A converter 91b. When the heater on/off signal instructs to execute on-operation, the current control unit 91c provide a drive current with a current value corresponding to the current-value control signal through the heater 59.

Because the read/write and current control circuit 13' has the current control circuit 91 independent of the read/write circuit 90, various current supply modes can be easily attained. Also, because the CPU 92 controls both the current control circuit 91 and the read/write circuit 90, it is possible to provide the drive current to the heater 59 in synchronization with the read and/or write operations.

It is apparent that the circuit configuration of the read/write circuit 13' is not limited to that shown in FIG. 19. The write operations and the read operations may be specified by signals other than the write control signal and the read control signal, respectively.

Joule heat is produced due to the drive current flowing through the heater 59 to expand the insulation layer 58 that surrounds the heater 59, and thus a part of the MR read head element and/or the inductive write head element protrudes toward the magnetic disk.

According to this embodiment, even if the heater 59 is formed between the upper shield layer 55 of the MR read head element and the lower magnetic pole layer 60 of the inductive write head element, it is possible to reduce crosstalk voltage applied to the MR read head element from the heater 59 because the additional shield layer 57 is formed between the heater 59 and the upper shield layer 55 of the MR read head element. Accordingly, damage of the MR read head element due to the crosstalk voltage can be prevented from occurring.

In case of the TMR read head element, the reduction of the crosstalk voltage directly applied from the heater 59 to the MR read head element can certainly prevent formation of pinholes in the barrier layer, so as to suppress reduction of the element resistance and deterioration of the reading characteristics. In case of the CPP-structure GMR read head element, the reduction of the crosstalk voltage directly applied from the heater 59 to the MR read head element can prevent a decrease in operating life of the read head element due to an enhancement of electromigration and can also prevent a degradation of magnetic properties due to an enhancement of an interlayer diffusion of metal atoms.

According to this embodiment, further, the substrate 50 and the additional shield layer 57 become at substantially the same potential by electrically connecting them using the resistance element 68 with an electrical resistance of 100 Ω or less, and $C2=C4$ is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

Figure 20:
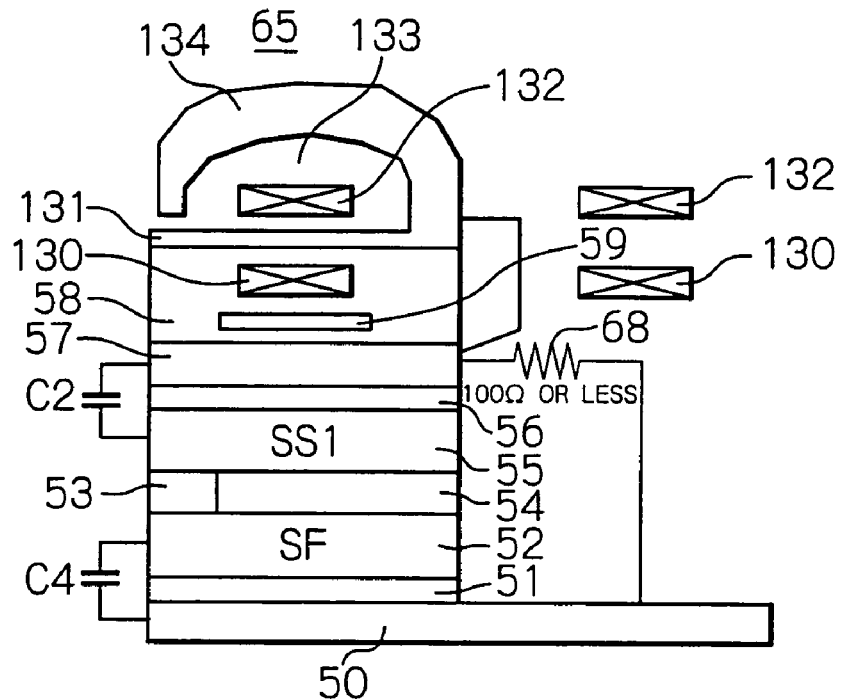
FIG. 20 is a view typically illustrating a sectional configuration along the direction perpendicular to ABS, of a composite thin-film magnetic head in still further embodiment according to the present invention.

FIG. 20 typically illustrates a sectional configuration along the direction perpendicular to ABS, of a composite thin-film magnetic head in still further embodiment according to the present invention.

In this embodiment, a write head element with a perpendicular magnetic recording structure is used as the inductive write head element. Another configuration in this embodiment is the same as that in the embodiment shown in FIGS. 15-19. Also, in FIG. 20, the same components as those in FIG. 18 use the same reference numerals.

As well as the layer configuration shown in FIG. 18, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57, and the heater 59 is formed in this insulation layer 58.

A main magnetic pole layer 131, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58. This main magnetic pole layer 131 constitutes a magnetic path for converging and for guiding a magnetic flux induced by a write coil 132 made of a conductive material such as for example Cu to a perpendicular magnetic recording layer of the magnetic disk at which magnetic recording is performed. On the main magnetic pole layer 131, a coil insulation layer 133 made of an insulating material such as a thermally cured resist is formed to surround the write coil 132.

Above the heater 59, in the insulation layer 58, formed is a backing coil layer 130 made of a conductive material such as for example Cu for inducing a magnetic flux to prevent the write magnetic flux from bringing ATE.

An auxiliary magnetic pole layer or return yoke layer 134, corresponding to a second magnetic pole layer in the present invention, made of a magnetic metal material such as for example FeAlSi, NiFe, CoFe, NiFeCo, FeN, FeZrN, FeTaN, CoZrNb or CoZrTa is formed on the coil insulation layer 133. A protection layer 65 made of an insulating material such as for example $Al_2O_3$ is laminated on the auxiliary magnetic pole layer 134.

The backing coil layer 130 and the write coil layer 132 may be formed in a single-layered structure, a two or more-layered structure, or a helical coil structure.

The inductive write head element with the perpendicular magnetic recording structure is mainly composed of the main magnetic pole layer 131, the auxiliary magnetic pole layer 134, the coil insulation layer 133, the write coil layer 132 and the backing coil layer 130.

The main magnetic pole layer 131 at the end surface of the head opposed to a magnetic disk surface is formed thin so as to generate a fine write magnetic field that permits high-density magnetic recording. The end portion of the auxiliary magnetic pole layer 134 opposed to the magnetic disk surface constitutes a trailing shield portion with a layer section greater than that of the remaining portion of this auxiliary magnetic pole layer 134 so that a magnetic field gradient between this trailing shield section and the main magnetic pole layer 131 becomes more steeply. As a result, jitter in the reproduced signal is reduced and therefore an error rate at the reading operations becomes lower.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the main magnetic pole layer 131 are substantially equal to each other. As a result, a linearity of the QST characteristics of the MR read head element improves.

Both ends of the heater 59 are electrically connected to the two drive electrode terminals 35 (not shown in FIG. 20) by means of the lead conductors 69 (also not shown in FIG. 20).

It is desired, as in this embodiment, that the main magnetic pole layer 131 be electrically connected with the additional shield layer 57. However, in modifications, the main magnetic pole layer 131 and the additional shield layer 57 may not be electrically connected with each other. In this embodiment, the additional shield layer 57 is electrically connected with the substrate 50 via the lead conductor 68 and the heat-sink 57 (not shown in FIG. 20) to have an electrical resistance of few ohms between the additional shield layer 57 and the substrate 50. This resistance is desired to be 100 Ω or less. It is desired to provide the heatsink, but it is not an absolute requirement. In modifications, the additional shield layer 57 may be grounded in another configuration through the lead conductor 68.

Operations and advantages of this embodiment are the same as those in the embodiment of FIGS. 15-19.

Figure 21:
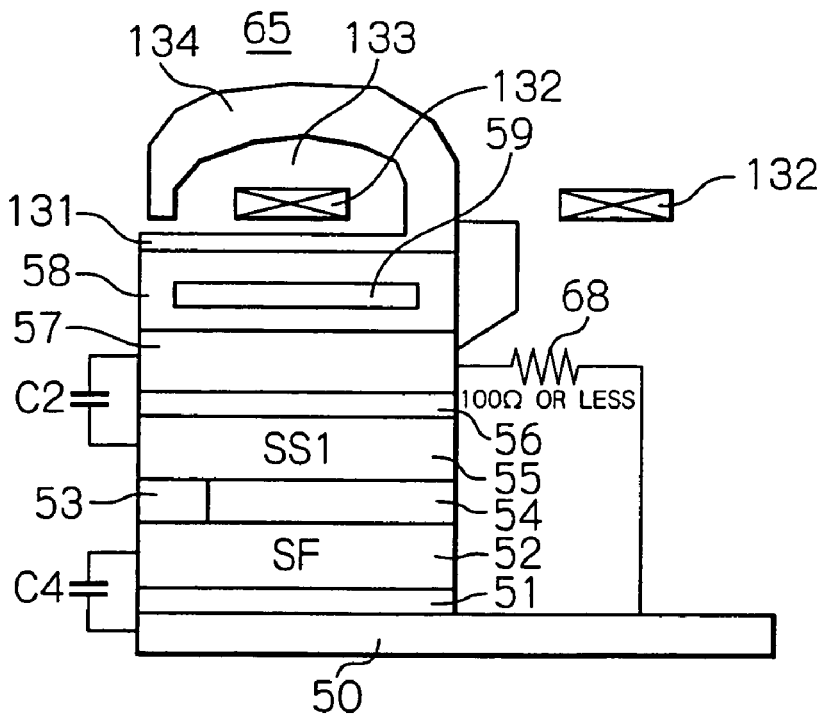
FIG. 21 is a view typically illustrating a sectional configuration along the direction perpendicular to ABS, of a composite thin-film magnetic head in further embodiment according to the present invention.

FIG. 21 typically illustrates a sectional configuration along the direction perpendicular to ABS, of a composite thin-film magnetic head in further embodiment according to the present invention.

In this embodiment, a write head element with a perpendicular magnetic recording structure having no backing coil layer is used as the inductive write head element. Another configuration in this embodiment is the same as that in the embodiment shown in FIGS. 15-19, and in the embodiment shown in FIG. 20. Also, in FIG. 21, the same components as those in FIGS. 18 and 20 use the same reference numerals. Operations and advantages of this embodiment are the same as those in the embodiment of FIGS. 15-19, and in the embodiment shown in FIG. 20.

Figure 22:
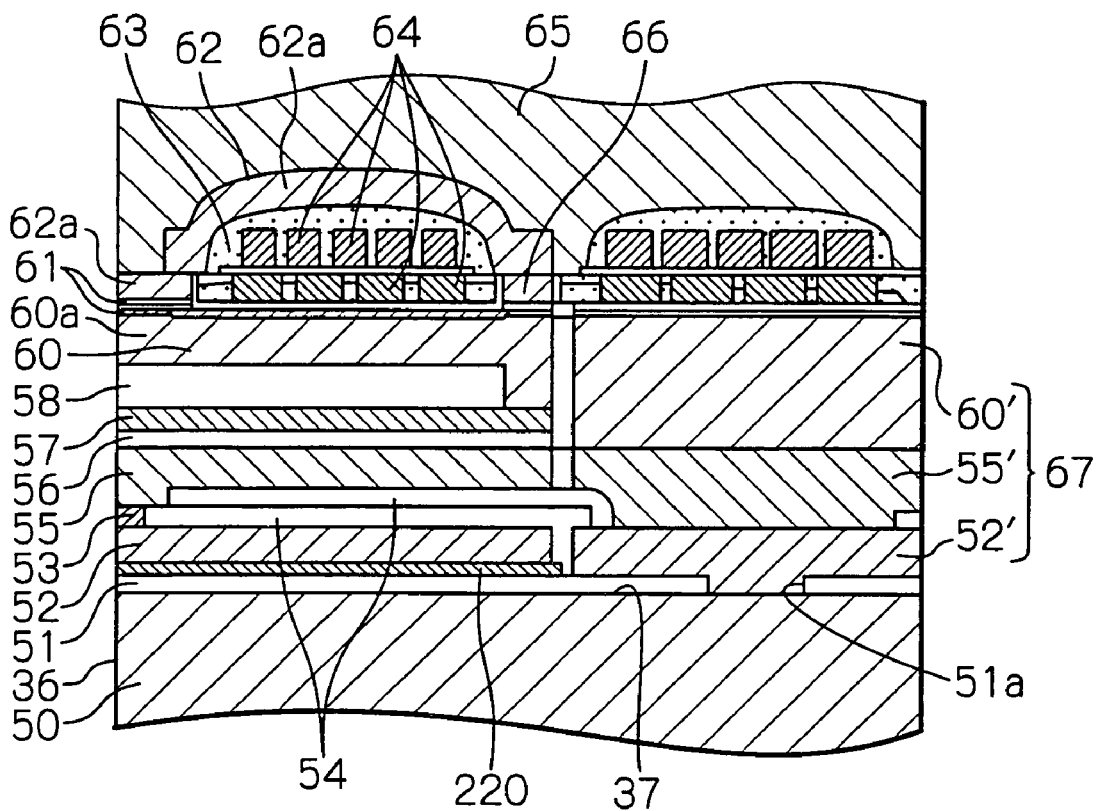
FIG. 22 is a center sectional view schematically illustrating a configuration of a composite thin-film magnetic head in still further embodiment according to the present invention.

FIG. 22 shows a V-V line section of FIG. 4 schematically illustrating a configuration of the composite thin-film magnetic head in still further embodiment. The configuration example of the magnetic disk drive apparatus in this embodiment is the same as shown in FIG. 1, the configuration example of the HGA in this embodiment is the same as shown in FIG. 2, and the magnetic head element portion of the composite thin-film magnetic head in this embodiment, seen from an element-formed side of a slider substrate is the same as shown in FIG. 4. Thus, in this embodiment, the same components as those in the embodiment of FIGS. 1-11 use the same reference numerals. The inductive write head element in this embodiment is a write head element with a horizontal or in-plane magnetic recording structure.

On a substrate or a slider substrate 50 made of a conductive material such as for example $Al_2O_3$—TiC (AlTiC), the ABS 36 to be opposed to the magnetic disk surface is formed. In operations, the magnetic head slider 21 fluid-dynamically flies above the surface of the rotating magnetic disk with a predetermined height. An under layer 51 made of an insulating material such as for example $Al_2O_3$ or $SiO_2$ with a thickness of 0.05-10 μm is laminated on the element-forming surface 37 of the substrate or a slider substrate 50.

A nonmagnetic conductive layer 220 made of a nonmagnetic conductive material such as for example Ti, Ta, Au, Ru or Cu is additionally laminated on the under layer 51. On the nonmagnetic conductive layer 220, laminated is a lower shield layer (SF) 52 that also operates as a lower electrode layer and is made of a magnetic metal material such as for example FeAlSi, NiFe, CoFe, NiFeCo, FeN, FeZrN, FeTaN, CoZrNb or CoZrTa. The nonmagnetic conductive layer 220 and the lower shield layer 52 are electrically conducted to each other.

In general, the lower shield layer 52 is opposed to the substrate 50 via the under layer 51, and therefore this lower shield layer 52 and the substrate 50 function as counter electrodes to generate a parasitic capacitance C4 there between. However, The lower shield layer 52 is in general opposed to the substrate 50 via the under layer 51, and therefore this lower shield layer 52 and the substrate 50 function as counter electrodes to generate a parasitic capacitance C4 there between. In this embodiment, because the nonmagnetic conductive layer 220 has a larger area than that of the lower shield layer 52 and the nonmagnetic conductive layer 220 is laminated on the substrate-side surface of the lower shield layer 51, the nonmagnetic conductive layer 220 and the substrate 50 function as counter electrodes to generate the parasitic capacitance C4.

In this embodiment, the nonmagnetic conductive layer 220 has larger outer sizes than these of the lower shield layer 52, a substantial counter area of the lower shield layer 52 against the substrate 50, that is, an area of the counter electrodes to generate the parasitic capacitance C4 increases by additionally forming this nonmagnetic conductive layer 220. A thickness of the nonmagnetic conductive layer 220 is for example about 0.1 μm, whereas a thickness of the lower shield layer 52 is for example about 2 μm.

On the lower shield layer 52, an MR layer 53 with the CPP structure and an insulation layer 54 made of an insulating material such as for example $Al_2O_3$ or $SiO_2$ are laminated.

The CPP-structure MR layer 53 will be formed from, in case of a CPP-GMR layer, a multilayered structure including a free layer of a ferromagnetic material such as for example NiFe, CoFe or NiFeCo, a nonmagnetic layer of a nonmagnetic conductive material such as for example Cu, a pinned layer of a ferromagnetic material such as for example NiFe, CoFe or NiFeCo, and a pinning layer of an antiferromagnetic material such as for example PtMn, FeMn, MnIr, NiMn or CrMnPt. In case of a TMR layer, the CPP-structure MR layer 53 will be formed from a multilayered structure including a free layer of a ferromagnetic material such as for example NiFe, CoFe or NiFeCo, a thin barrier layer of an insulation material such as for example oxides of Ti, Ta, Al, Zr, Hf, Si, Mg or Zn, a pinned layer of a ferromagnetic material such as for example NiFe, CoFe or NiFeCo, and a pinning layer of an antiferromagnetic material such as for example PtMn, FeMn, MnIr, NiMn or CrMnPt. The multilayered structure of the CPP-structure MR layer 53 is not limited to the abovementioned structure but various layer configurations will be of course possible. Although not shown in the figures, the MR layer 53 may have a magnetic domain control layer and other necessary layers.

On the CPP-structure MR layer 53 and the insulation layer 54, laminated is an upper shield layer (SS1) 55 that also operates as an upper electrode layer and is made of a magnetic metal material such as for example FeAlSi, NiFe, CoFe, NiFeCo, FeN, FeZrN, FeTaN, CoZrNb or CoZrTa.

The CPP-structure MR read head element is mainly composed of the nonmagnetic conductive layer 220, the lower shield layer 52, the MR layer 53, the insulation layer 54, the upper shield layer 55, the magnetic domain control layer and a lead conductor layer not shown.

On the upper shield layer 55, an inter-shield insulation layer 56 made of an insulating material such as for example $Al_2O_3$ or $SiO_2$ is laminated. An additional shield layer 57 made of a metal material or a magnetic metal material such as for example FeAlSi, NiFe, CoFe, NiFeCo, FeN, FeZrN, FeTaN, CoZrNb or CoZrTa with a thickness of preferably about 0.05-2 μm is laminated on the inter-shield insulation layer 56.

An insulation layer 58 made of an insulating material such as for example $Al_2O_3$ or $SiO_2$ is laminated on the additional shield layer 57.

In this embodiment, the insulation layer 58 is formed thick so as to prevent transmission of heat generated at the inductive write head element to the MR read head element as much as possible.

A lower magnetic pole layer (SS2) 60, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58.

On the lower magnetic pole layer 60, a recording gap layer 61 made of a metal material such as for example Ru or an insulation material such as for example $SiO_2$ is laminated. An upper pole portion 62a of an upper magnetic pole layer 62, corresponding to a second magnetic pole layer in the present invention, made of a magnetic metal material such as for example FeAlSi, NiFe, CoFe, NiFeCo, FeN, FeZrN, FeTaN, CoZrNb or CoZrTa and a write coil layer 64 made of a conductive material such as for example Cu, surrounded by a coil insulation layer 63 of an insulating material such as a thermally cured resist are laminated on the recording gap layer 61. A lower pole portion 60a located at a top end section or an ABS-side end section of the lower magnetic pole layer 60 and the upper pole portion 62a located at a top end section or an ABS-side end section of the upper magnetic pole layer 62 are opposed to each other via the recording gap layer 61.

Although the write coil layer 64 in this embodiment is formed in a two-layered structure, it is apparent that this write coil layer 64 may be formed in a single-layered structure or other layered structure.

On the coil insulation layer 63 that covers the write coil layer 64, an upper yoke portion 62b of the upper magnetic pole layer 62 is formed. A protection layer 65 made of an insulating material such as for example $Al_2O_3$ is laminated on the upper pole portion 62a and the upper yoke portion 62b of the upper magnetic pole layer 62.

The inductive write head element horizontal or in-plane magnetic recording structure is mainly composed of the lower magnetic pole layer 60, the recording gap layer 61, the upper magnetic pole layer 62, the coil insulation layer 63 and the write coil layer 64.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the lower magnetic pole layer 60 are substantially equal to each other. As a result, a linearity of the QST characteristics of the MR read head element improves.

It is desired, as in this embodiment, that a part of the lower magnetic pole layer 60 is directly laminated on the additional shield layer 57 and therefore the lower magnetic pole layer 60 and the additional shield layer 57 are electrically connected with each other. However, in modifications, the lower magnetic pole layer 60 and the additional shield layer 57 may not be electrically connected with each other. In the former case, they may be electrically connected at a rear end position of the additional shield layer 57 opposite to the ABS as shown in FIG. 22, or at other position. In this embodiment shown in FIG. 22, the additional shield layer 57 is electrically connected with the substrate 50 to have an electrical resistance of 100 Ω or less there between.

The coil insulation layer 63 and the write coil layer 64 are also formed in the rear region or anti ABS-side region of a back gap section 66 that magnetically connects the lower magnetic pole layer 60 and the upper magnetic pole layer 62 with each other.

In this rear region, a heatsink 67 for dissipating heat generated in the head to the substrate is formed. This heatsink 67 is formed as a multilayered structure of layers 52', 55' and 60' separated from the lower shield layer 52, the upper shield layer 55 and the lower magnetic pole layer 60 but kept in contact with one another. The bottom of the heatsink 67 is made contact with the substrate 50 via a through hole 51a formed by partially removing the under layer 51.

Figure 23:
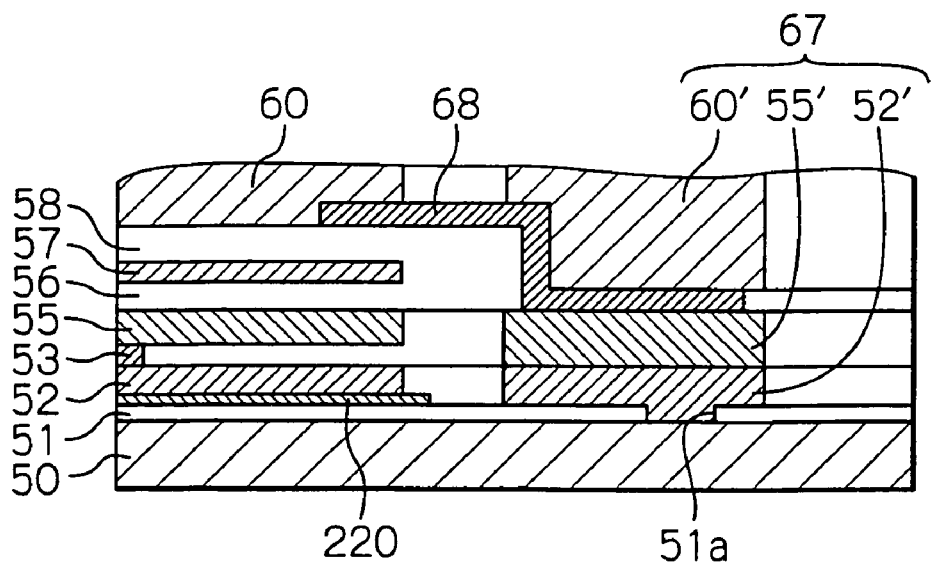
FIG. 23 is a view illustrating a configuration of lead conductors for electrically connecting a heatsink layer and a lower pole layer in the embodiment shown in FIG. 22.

The heatsink 67 and the lower magnetic pole layer 60 are electrically connected to each other by a strip-shaped thin lead conductor 68. Because it is not located along the central section line, this conductor 68 is not shown in FIG. 22. However, in FIG. 23 that is an off-center sectional view, structure of this lead conductor 68 is illustrated.

The lead conductor 68 is made of a conductive material such as for example Cu but has a whole electrical resistance of several ohms because its thickness is thin as 0.1 μm for example and its width is considerably narrow. On the other hand, the heatsink 67 has a good electrical conductivity because it is made by a magnetic metal material. As aforementioned, the additional shield layer 57 is electrically connected with the lower magnetic pole layer 60, and therefore it is considered that the substrate 50 and the additional shield layer 57 is electrically connected by a resistance element with an electrical resistance of several ohms. As will be mentioned later, this electrical resistance is desired to be 100 Ω or less. It is desired to provide the heatsink 67, but it is not an absolute requirement. In modifications, the additional shield layer 57 may be grounded in another configuration through the lead conductor 68.

Figure 24:
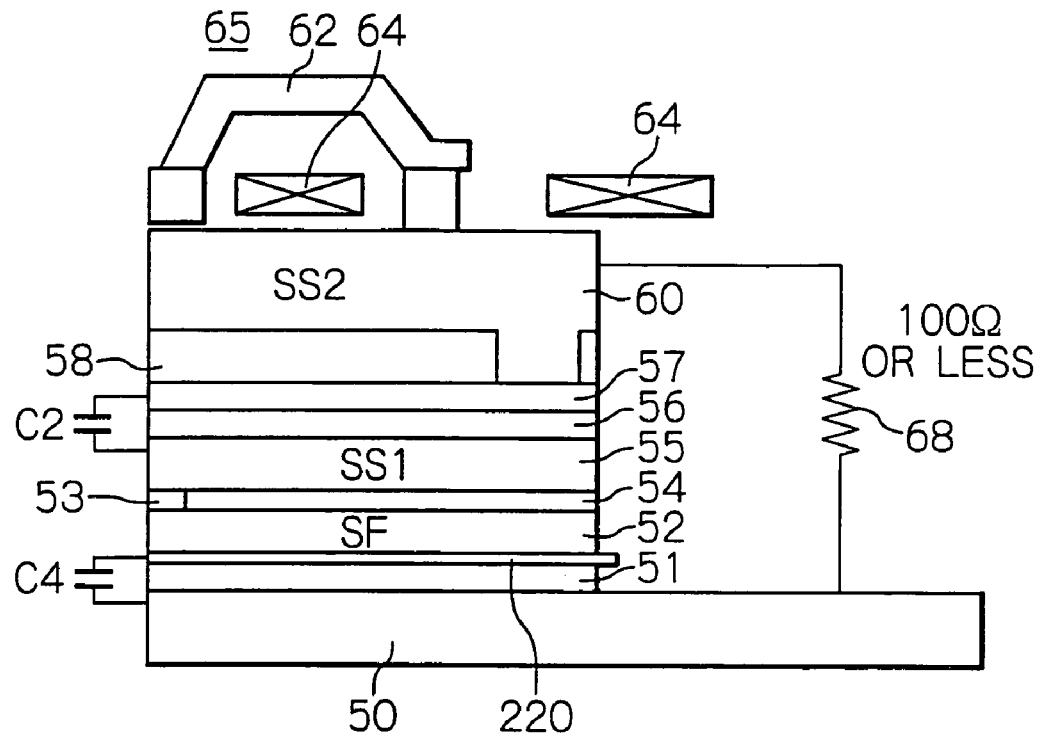
FIG. 24 is a view typically illustrating the sectional configuration along the direction perpendicular to ABS, of the composite thin-film magnetic head shown in FIG. 22.
Figure 25:
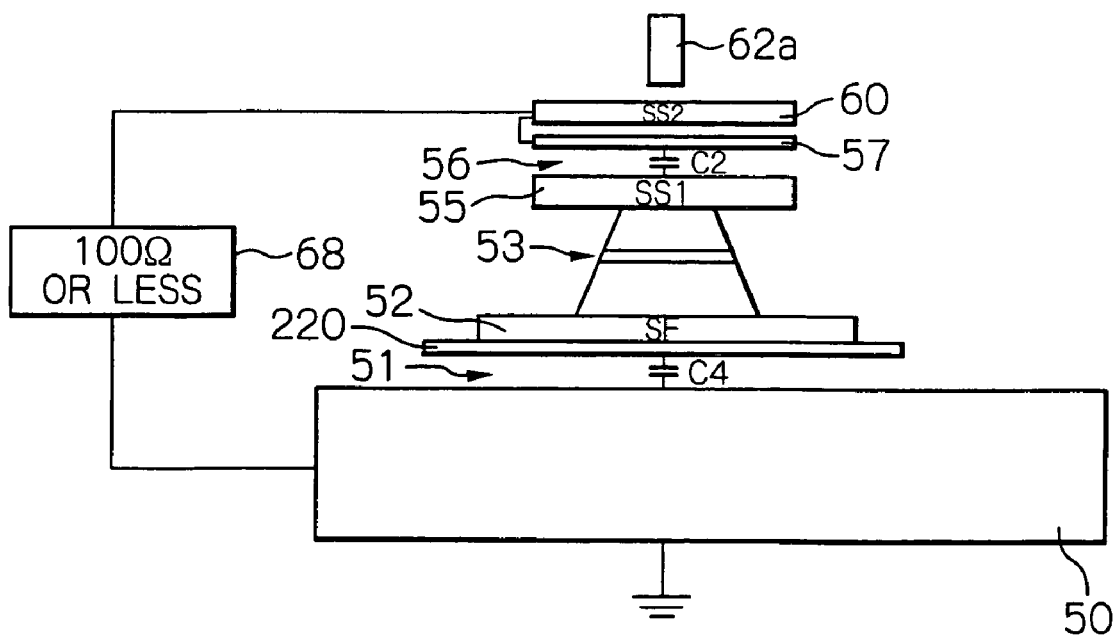
FIG. 25 is a view typically illustrating the configuration of the composite thin-film magnetic head shown in FIG. 22, seen from ABS side.

Schematic equivalent circuit of the composite thin-film magnetic head in this embodiment is the same as that shown in FIG. 7. FIGS. 24 and 25 typically illustrate the configurations of the composite thin-film magnetic head shown in FIG. 22. Particularly, FIG. 24 is a view of the sectional configuration along the direction perpendicular to ABS, and FIG. 25 is a view of the configuration seen from ABS side.

As shown in FIGS. 7, 24 and 25, in the composite thin-film magnetic head of this embodiment, a parasitic capacitance C1 is generated between the write coil 64 and the lower magnetic pole layer (SS2) 60 of the inductive write head element, a parasitic capacitance C2 is generated between the lower magnetic pole layer 60 or the additional shield layer 57 having the same potential as the lower magnetic pole layer 60 and the upper shield layer (SS1) 55 of the MR read head element, a parasitic capacitance C3 is generated between the upper shield layer 55 and the lower shield layer (SF) 52, and a parasitic capacitance C4 is generated between the lower shield layer 52 and the substrate 50.

As mentioned before, in order to reduce the crosstalk between the read head element and the write head element and influence of the external noises, it is required that (1) the substrate 50 and the lower magnetic pole layer 60 namely in this case the additional shield layer 57 are kept at the same potential, and (2) the parasitic capacitance C4 is kept substantially equal to the parasitic capacitance C2.

In this embodiment, the requirement (1) is achieved by electrically connecting the substrate 50 and the additional shield layer 57 through the lower magnetic pole layer 60 by means of a resistance element with an electrical resistance of 100 Ω or less using the lead conductor 68 and the heatsink 67. Also, the requirement (2) is achieved by varying the area of the counter electrodes of the lower shield layer 52 opposed to the substrate 50, more concretely by laminating the nonmagnetic conductive layer 220 on the substrate-side surface of the lower shield layer 52 to increase the area S4 of the counter electrodes and to increase the parasitic capacitances C4 so that C2=C4 is realized. That is, as is known, the parasitic capacitances C2 and C4 are obtained from the following formulas:

$$C2 = \in 2 \times S2/t2, \text{ and } C4 = \in 4 \times S4/t4$$

where $\in 2$ is a dielectric constant of the insulating material of the inter-shield insulation layer 56, $\in 4$ is a dielectric constant of the insulating material of the under layer 51, t2 is a thickness of the inter-shield insulation layer 56, t4 is a thickness of the under layer 51, S2 is an area of counter electrodes opposed to each other of the additional shield layer 57 and the upper shield layer 55, and S4 is an area of counter electrodes opposed to each other of the lower shield layer 52 and the substrate 50. Therefore, C2=C4 is attained by adjusting in this case S4.

In order to keep good thermal dissipation efficiency for suppressing the thermal expansion of the magnetic pole layers due to produced heat during the write operations, it is impossible to increase the thicknesses of the under layer 51 and the inter-shield insulation layer 56 from predetermined necessary values. Rather, in order to decrease the manufacturing time so as to achieve the economics of mass production, it is desired to form these layers thinner as much as possible. Contrary to this, in order to prevent electrical breakdown due to charging up, these layers should not be formed too thin. Since the under layer 51 is laminated on the substrate 50 with a poor surface flatness, if formed by $Al_2O_3$ to satisfy a good insulating performance, a thickness of 0.3 μm or more should be required at least for the under layer 51. Therefore, it is quite difficult to adjust the parasitic capacitances C4 and/or C2 by controlling the thickness of the under layer 51. With respect to the inter-shield insulation layer 56, since it is formed on a layer with an improved good surface flatness due to the CMP, its thickness can be reduced less than 0.3 μm. However, if the thickness is reduced, the parasitic capacitance C2 will be increased. Although insulation materials with different dielectric constants ∈4 and ∈2 can be used as for the under layer 51 and the inter-shield insulation layer 56, respectively, it is desired to use the same insulation material for these layers to obtain the economics of mass production. The counter electrode area can be adjusted by changing the shape and size of the lower shield layer (SF) 52, the upper shield layer (SS1) 55 and/or the additional shield layer 57 themselves. However, because they exert a large influence upon the resistance against external magnetic field, upon the shield magnetic domain performance due to write stress, and upon the reading/writing characteristics, it is quite difficult to freely change these shape and size so as to adjust the parasitic capacitances C4 and/or C2.

On the contrary, according to this embodiment, the nonmagnetic conductive layer 220 conducted to the lower shield layer 52 is added to counter with the substrate 50 so as to increase the substantial counter electrode area between the lower shield layer 52 and the substrate 50 and then to increase the parasitic capacitance C4. Therefore, it is possible to easily adjust the parasitic capacitance C4 so as to be equal to the parasitic capacitance C2. Because the added conductive layer 220 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

In this embodiment, also, because the nonmagnetic conductive layer 220 is laminated on the substrate-side surface of the lower shield layer 52, a distance between the nonmagnetic conductive layer 220 and the substrate 50 is not increased to effectively increase the parasitic capacitance C4. As in this embodiment, in case that the nonmagnetic conductive layer 220 is laminated on the substrate-side surface, the distance between the nonmagnetic conductive layer 220 and the substrate 50 is in general shortened to increase the parasitic capacitance C4. However, if the nonmagnetic conductive layer 220 is sufficiently thin, the increase in the capacitance C4 due to the decrease in distance can be negligible. Rather, increasing of the counter electrode area by the lamination of the nonmagnetic conductive layer 220 effectively increases the parasitic capacitance C4.

If the parasitic capacitance C4 is increased, it is possible to increase the parasitic capacitance C2 and therefore to make the inter-shield insulation layer 56 thinner.

According to this embodiment, further, the substrate 50 and the lower magnetic pole layer 60 or the additional shield layer 57 become at substantially the same potential by electrically connecting them using the resistance element with an electrical resistance of 100 Ω or less, and the potential difference between the lower shield layer 52 and the upper shield layer 55 that operate the lower electrode and the upper electrode of the CPP-structure MR read head element becomes substantially zero by adjusting the parasitic capacitance so that C4=C2. As a result, any external noise entered into the thin-film magnetic head is never presented on the reproduced signal to prevent error due to the external noises from occurring, and thus reliability of the head is improved.

Operations and advantages of this embodiment are the same as those in the embodiment of FIGS. 1-11.

Figure 26:
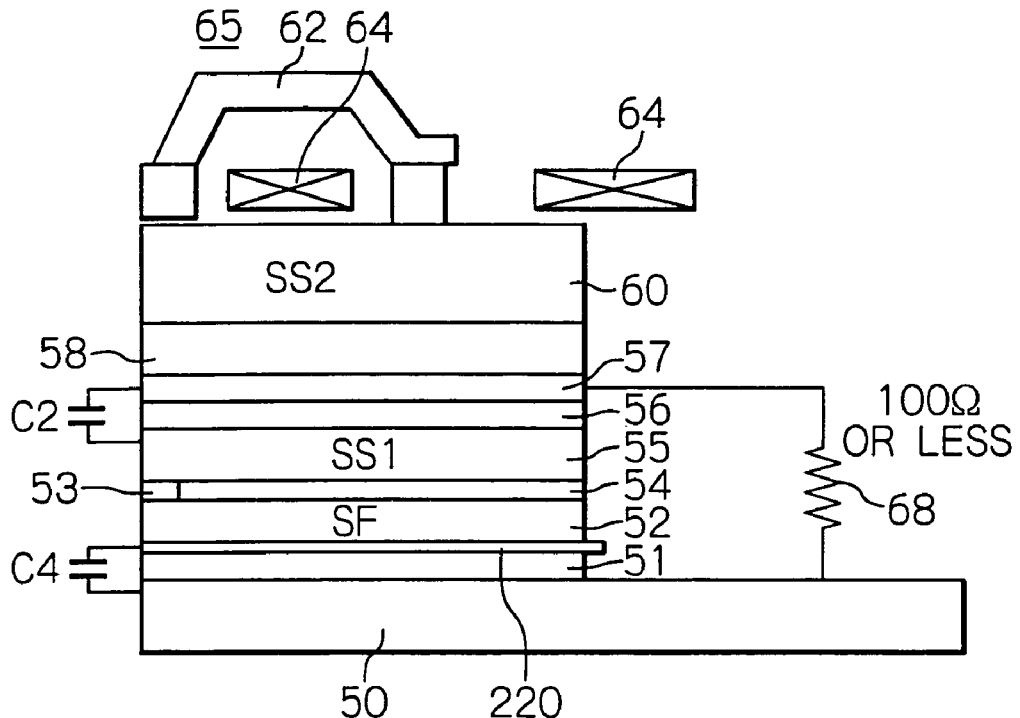
FIG. 26 is a view typically illustrating a sectional configuration along the direction perpendicular to ABS, of a composite thin-film magnetic head in further embodiment according to the present invention.

FIG. 26 typically illustrates a sectional configuration along the direction perpendicular to ABS, of a composite thin-film magnetic head in further embodiment according to the present invention.

In this embodiment, the lower magnetic pole layer 60 and the additional shield layer 57 are not electrically connected. Another configuration in this embodiment is the same as that in the embodiment shown in FIGS. 22-25. Also, in FIG. 26, the same components as those in FIGS. 24 and 25 use the same reference numerals.

As well as the layer configuration shown in FIGS. 24 and 25, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57.

In case that the lower magnetic pole layer 60 is not electrically conducted with the additional shield layer 57, a parasitic capacitance C1 may be produced between the write coil 64 of the write head element and the additional shield layer 57. However, in this embodiment, the lead conductor 68 is connected directly to the additional shield layer 57 so that the additional shield layer 57 and the substrate 50 is electrically conducted with an electrical resistance of 100 Ω or less.

Operations and advantages of this embodiment are the same as those in the embodiment of FIGS. 1-11 and the embodiment of FIGS. 22-25.

Figure 27:
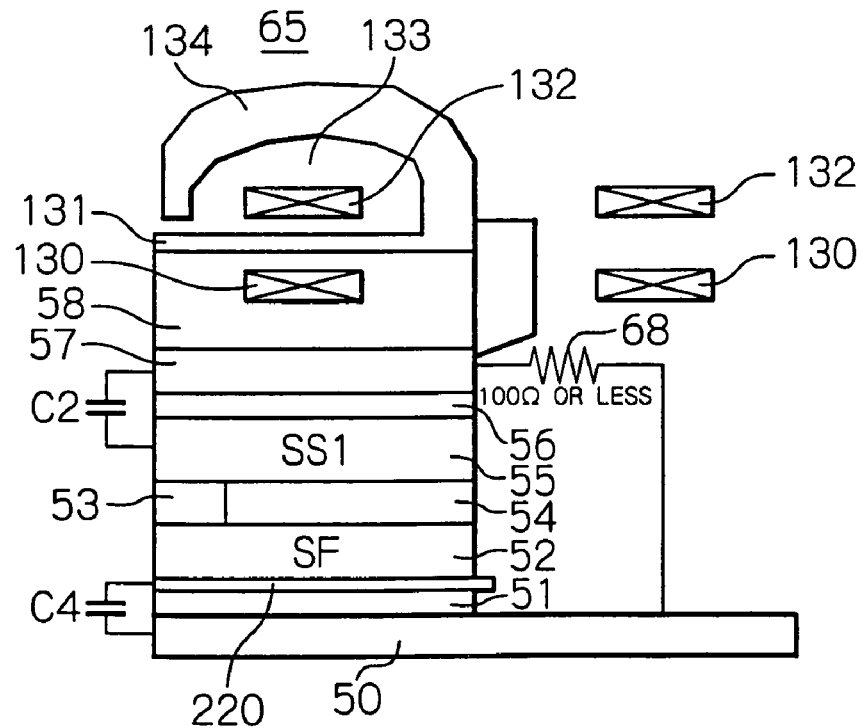
FIG. 27 is a view typically illustrating a sectional configuration along the direction perpendicular to ABS, of a composite thin-film magnetic head in still further embodiment according to the present invention.

FIG. 27 typically illustrates a sectional configuration along the direction perpendicular to ABS, of a composite thin-film magnetic head in further embodiment according to the present invention.

In this embodiment, a write head element with a perpendicular magnetic recording structure is used as the inductive write head element. Another configuration in this embodiment is the same as that in the embodiment shown in FIGS. 22-25. Also, in FIG. 27, the same components as those in FIGS. 24 and 25 use the same reference numerals.

As well as the layer configuration shown in FIGS. 24 and 25, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57.

A main magnetic pole layer 131, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58. This main magnetic pole layer 131 constitutes a magnetic path for converging and for guiding a magnetic flux induced by a write coil 132 made of a conductive material such as for example Cu to a perpendicular magnetic recording layer of the magnetic disk at which magnetic recording is performed. On the main magnetic pole layer 131, a coil insulation layer 133 made of an insulating material such as a thermally cured resist is formed to surround the write coil 132.

At an upper region in the insulation layer 58, formed is a backing coil layer 130 made of a conductive material such as for example Cu for inducing a magnetic flux to prevent the write magnetic flux from bringing ATE.

An auxiliary magnetic pole layer or return yoke layer 134, corresponding to a second magnetic pole layer in the present invention, made of a magnetic metal material such as for example FeAlSi, NiFe, CoFe, NiFeCo, FeN, FeZrN, FeTaN, CoZrNb or CoZrTa is formed on the coil insulation layer 133. A protection layer 65 made of an insulating material such as for example $Al_2O_3$ is laminated on the auxiliary magnetic pole layer 134.

The backing coil layer 130 and the write coil layer 132 may be formed in a single-layered structure, a two or more-layered structure, or a helical coil structure.

The inductive write head element with the perpendicular magnetic recording structure is mainly composed of the main magnetic pole layer 131, the auxiliary magnetic pole layer 134, the coil insulation layer 133, the write coil layer 132 and the backing coil layer 130.

The main magnetic pole layer 131 at the end surface of the head opposed to a magnetic disk surface is formed thin so as to generate a fine write magnetic field that permits high-density magnetic recording. The end portion of the auxiliary magnetic pole layer 134 opposed to the magnetic disk surface constitutes a trailing shield portion with a layer section greater than that of the remaining portion of this auxiliary magnetic pole layer 134 so that a magnetic field gradient between this trailing shield section and the main magnetic pole layer 131 becomes more steeply. As a result, jitter in the reproduced signal is reduced and therefore an error rate at the reading operations becomes lower.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the main magnetic pole layer 131 are substantially equal to each other. As a result, a linearity of the QST characteristics of the MR read head element improves.

It is desired, as in this embodiment, that the main magnetic pole layer 131 be electrically connected with the additional shield layer 57. However, in modifications, the main magnetic pole layer 131 and the additional shield layer 57 may not be electrically connected with each other. In this embodiment, the additional shield layer 57 is electrically connected with the substrate 50 via the lead conductor 68 and the heat-sink 57 (not shown in FIG. 27) to have an electrical resistance of few ohms between the additional shield layer 57 and the substrate 50. This resistance is desired to be 100 Ω or less. It is desired to provide the heatsink, but it is not an absolute requirement. In modifications, the additional shield layer 57 may be grounded in another configuration through the lead conductor 68.

Operations and advantages of this embodiment are the same as those in the embodiment of FIGS. 1-11 and the embodiment of FIGS. 22-25.

Figure 28:
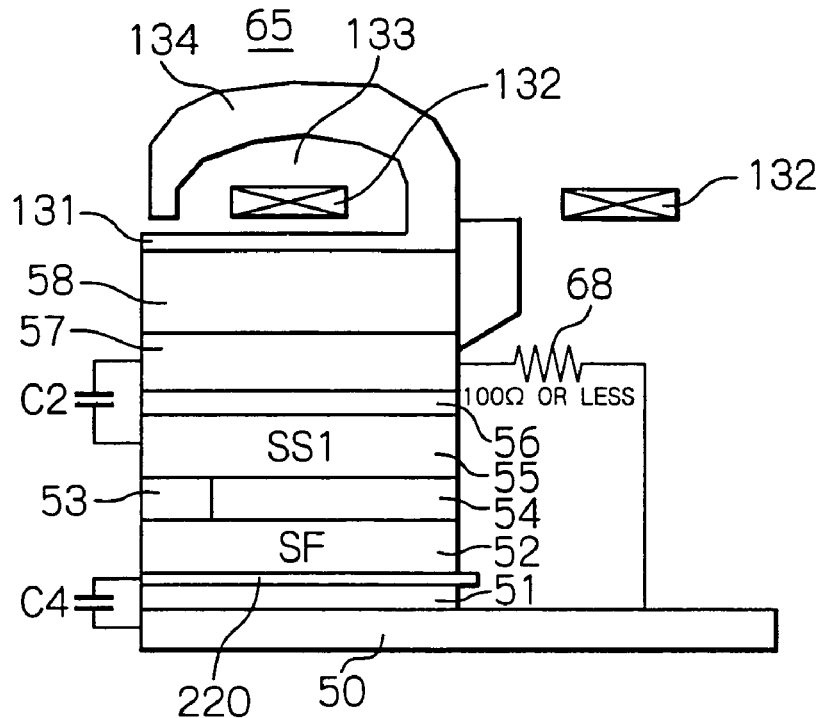
FIG. 28 is a view typically illustrating a sectional configuration along the direction perpendicular to ABS, of a composite thin-film magnetic head in further embodiment according to the present invention.

FIG. 28 typically illustrates a sectional configuration along the direction perpendicular to ABS, of a composite thin-film magnetic head in still further embodiment according to the present invention.

In this embodiment, a write head element with a perpendicular magnetic recording structure having no backing coil layer is used as the inductive write head element. Another configuration in this embodiment is the same as that in the embodiment shown in FIGS. 1-11, in the embodiment shown in FIGS. 22-25, and in the embodiment shown in FIG. 27. Also, in FIG. 28, the same components as those in FIGS. 24 and 27 use the same reference numerals. Operations and advantages of this embodiment are the same as those in the embodiment of FIGS. 1-11, in the embodiment shown in FIGS. 22-25, and in the embodiment shown in FIG. 27.

Figure 29:
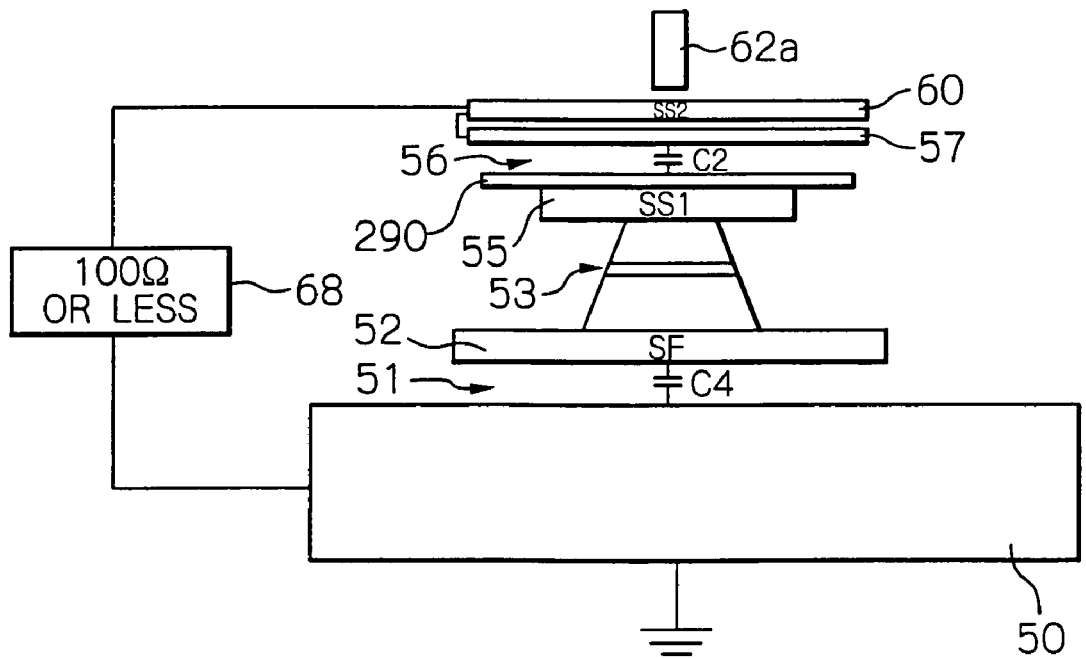
FIG. 29 is a view typically illustrating a configuration of a composite thin-film magnetic head in still further embodiment according to the present invention, seen from ABS side.

FIG. 29 typically illustrates a configuration of a composite thin-film magnetic head in still further embodiment according to the present invention, seen from ABS side.

In this embodiment, a nonmagnetic conductive layer 290 is additionally laminated on an additional shield layer side surface of the upper shield layer (SS1) 55. This nonmagnetic conductive layer 290 and the upper shield layer 55 are electrically conducted to each other. Another configuration in this embodiment is the same as these in the embodiment shown in FIGS. 1-10 and the embodiment shown in FIGS. 22-25, and therefore description of the layer configuration is omitted. Also, in FIG. 29, the same components as those in FIGS. 1-11 and FIGS. 22-25 use the same reference numerals.

By varying in this embodiment the area of the counter electrode of the upper shield layer (SS1) 55 opposed to the additional shield layer 57 to adjust the parasitic capacitance C2 until C2=C4 is realized. More concretely, in this embodiment, in case that the upper shield layer 55 has a smaller counter area than the additional shield layer 57, the counter electrode area S2 is increased by laminating the nonmagnetic conductive layer 290 on the lower pole layer side surface of the upper shield layer 55 to increase the parasitic capacitance C2 so that C2=C4 is attained. Therefore, it is possible to easily adjust the parasitic capacitance C2 so as to be equal to the parasitic capacitance C4. Because the added conductive layer 290 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

In this embodiment, also, because the nonmagnetic conductive layer 290 is laminated on the additional shield layer side surface of the upper shield layer 55, a distance between the nonmagnetic conductive layer 290 and the additional shield layer 57 is not increased to effectively increase the parasitic capacitance C2. As in this embodiment, in case that the nonmagnetic conductive layer 290 is laminated on the additional shield layer side surface, the distance between the nonmagnetic conductive layer 290 and the additional shield layer 57 is in general shortened to increase the parasitic capacitance C2. However, if the nonmagnetic conductive layer 290 is sufficiently thin, the increase in the capacitance C2 due to the decrease in distance can be negligible. Rather, increasing of the counter electrode area by the lamination of the nonmagnetic conductive layer 290 effectively increases the parasitic capacitance C2.

According to this embodiment, further, the substrate 50 and the additional shield layer 57 become at substantially the same potential by electrically connecting the substrate 50 and the lower magnetic pole layer 60 using the resistance element 68 with an electrical resistance of 100 Ω or less, and C2=C4 is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

Operations and advantages of this embodiment are the same as those in the embodiment of FIGS. 1-11 and the embodiment of FIGS. 22-25.

As for one modification of this embodiment, the nonmagnetic conductive layer 290 may be laminated on a surface of the upper shield layer 55, opposite to the additional shield layer side surface. When the parasitic capacitances C2 and C4 are C2<C4 and it is impossible to thin the inter-shield insulation layer 56, it is necessary to more increase the parasitic capacitance C2 so as to attain C2=C4. In such case, this modification can easily increase the parasitic capacitance C2 to adjust as C2=C4.

As for another modification of this embodiment, the nonmagnetic conductive layer 290 may be formed to counter the additional shield layer 57 and to electrically connect to the upper shield layer 55 without laminating on this upper shield layer 55.

As for further modification of this embodiment, the lower magnetic pole layer 60 and the additional shield layer 57 may not be electrically connected with each other as in the embodiment of FIG. 26.

As for still further modification of this embodiment, a write head element with a perpendicular magnetic recording structure may be used as the inductive write head element as in the embodiment of FIG. 27.

As for further modification of this embodiment, a write head element with a perpendicular magnetic recording structure having no backing coil layer may be used as the inductive write head element as in the embodiment of FIG. 28.

Figure 30:
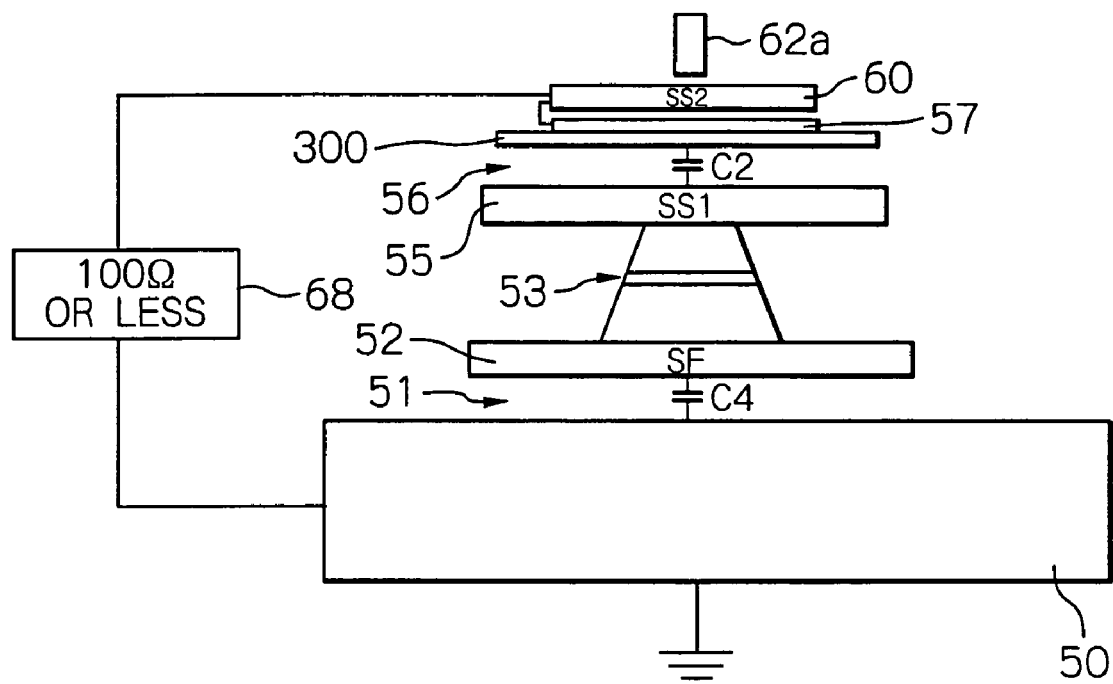
FIG. 30 is a view typically illustrating a configuration of a composite thin-film magnetic head in still further embodiment according to the present invention, seen from ABS side.

FIG. 30 typically illustrates a configuration of a composite thin-film magnetic head in still further embodiment according to the present invention, seen from ABS side.

In this embodiment, a nonmagnetic conductive layer 300 is additionally laminated on an upper shield layer side surface of the additional shield layer 57. This nonmagnetic conductive layer 300 and the lower magnetic pole layer 60 are electrically conducted to each other. Another configuration in this embodiment is the same as these in the embodiment shown in FIGS. 1-10, the embodiment shown in FIGS. 22-25 and the embodiment shown in FIG. 29, and therefore description of the layer configuration is omitted. Also, in FIG. 30, the same components as those in FIGS. 1-11, FIGS. 22-25 and FIG. 29 use the same reference numerals.

By varying in this embodiment the area of the counter electrode of the additional shield layer 57 opposed to the upper shield layer 55 to adjust the parasitic capacitance C2 until C2=C4 is realized. More concretely, in this embodiment, in case that the additional shield layer 57 has a smaller counter area than the upper shield layer 55, the counter electrode area S2 is increased by laminating the nonmagnetic conductive layer 300 on the upper shield layer side surface of the additional shield layer 57 to increase the parasitic capacitance C2 so that C2=C4 is attained. Therefore, it is possible to easily adjust the parasitic capacitance C2 so as to be equal to the parasitic capacitance C4. Because the added conductive layer 300 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

In this embodiment, also, because the nonmagnetic conductive layer 300 is laminated on the upper shield layer side surface of the additional shield layer 57, a distance between the nonmagnetic conductive layer 300 and the upper shield layer 55 is not increased to effectively increase the parasitic capacitance C2. As in this embodiment, in case that the nonmagnetic conductive layer 300 is laminated on the upper shield layer side surface, the distance between the nonmagnetic conductive layer 300 and the upper shield layer 55 is in general shortened to increase the parasitic capacitance C2. However, if the nonmagnetic conductive layer 300 is sufficiently thin, the increase in the capacitance C2 due to the decrease in distance can be negligible. Rather, increasing of the counter electrode area by the lamination of the nonmagnetic conductive layer 300 effectively increases the parasitic capacitance C2.

According to this embodiment, further, the substrate 50 and the additional shield layer 57 become at substantially the same potential by electrically connecting the substrate 50 and the lower magnetic pole layer 60 using the resistance element 68 with an electrical resistance of 100 Ω or less, and C2=C4 is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

Operations and advantages of this embodiment are the same as those in the embodiment of FIGS. 1-11, the embodiment of FIGS. 22-25 and the embodiment of FIG. 29.

As for one modification of this embodiment, the nonmagnetic conductive layer 300 may be laminated on a surface of the additional shield layer 57, opposite to the upper shield layer side surface. When the parasitic capacitances C2 and C4 are C2<C4 and it is impossible to thin the inter-shield insulation layer 56, it is necessary to more increase the parasitic capacitance C2 so as to attain C2=C4. In such case, this modification can easily increase the parasitic capacitance C2 to adjust as C2=C4.

As for another modification of this embodiment, the nonmagnetic conductive layer 300 may be formed to counter the upper shield layer 55 and to electrically connect to the additional shield layer 57 without laminating on this additional shield layer 57.

As for further modification of this embodiment, the lower magnetic pole layer 60 and the additional shield layer 57 may not be electrically connected with each other as in the embodiment of FIG. 26.

As for still further modification of this embodiment, a write head element with a perpendicular magnetic recording structure may be used as the inductive write head element as in the embodiment of FIG. 27.

As for further modification of this embodiment, a write head element with a perpendicular magnetic recording structure having no backing coil layer may be used as the inductive write head element as in the embodiment of FIG. 28.

Figure 31:
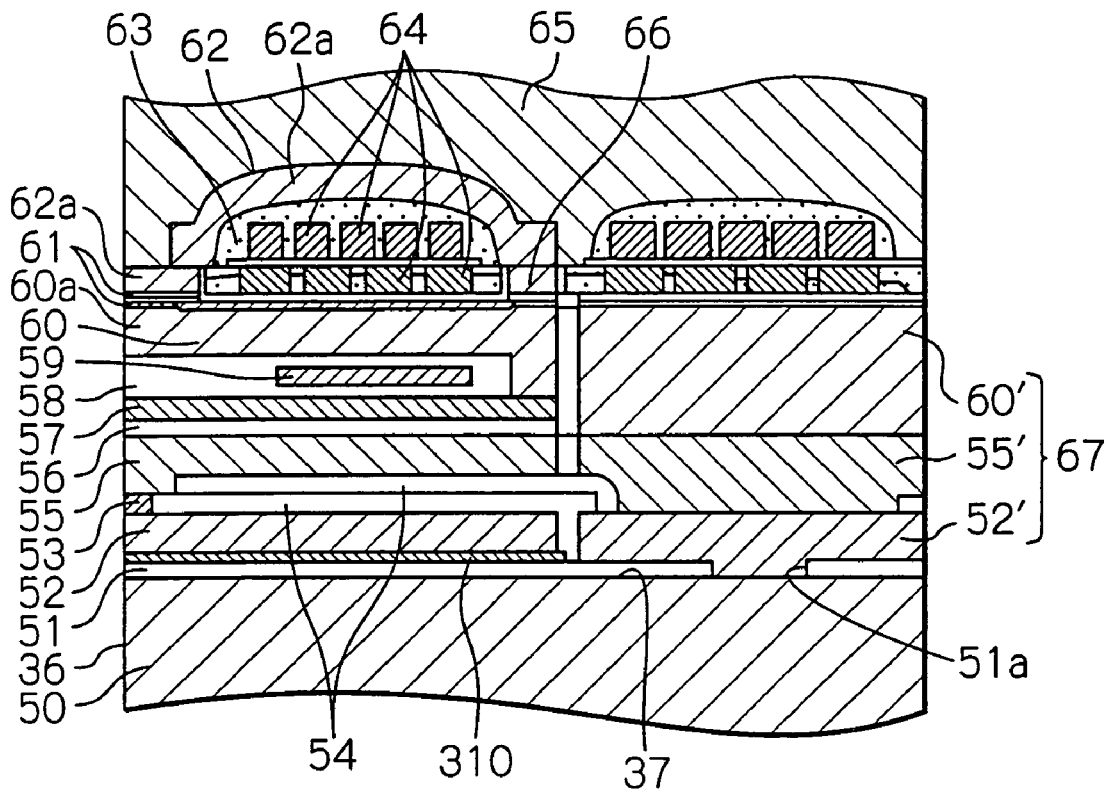
FIG. 31 is a center sectional view schematically illustrating a configuration of a composite thin-film magnetic head in further embodiment according to the present invention.

FIG. 31 shows a V-V line section of FIG. 4 schematically illustrating a configuration of the composite thin-film magnetic head in still further embodiment. The configuration example of the magnetic disk drive apparatus in this embodiment is the same as shown in FIG. 1, the configuration example of the HGA in this embodiment is the same as shown in FIG. 2, and the magnetic head element portion of the composite thin-film magnetic head in this embodiment, seen from an element-formed side of a slider substrate is the same as shown in FIG. 4. Thus, in this embodiment, the same components as those in the embodiment of FIGS. 1-11 use the same reference numerals. The inductive write head element in this embodiment is a write head element with a horizontal or in-plane magnetic recording structure.

On a substrate or a slider substrate 50 made of a conductive material such as for example $Al_2O_3$—TiC (AlTiC), the ABS 36 to be opposed to the magnetic disk surface is formed. In operations, the magnetic head slider fluid-dynamically flies above the surface of the rotating magnetic disk with a predetermined height. An under layer 51 made of an insulating material such as for example $Al_2O_3$ or $SiO_2$ with a thickness of 0.05-10 μm is laminated on the element-forming surface 37 of the substrate or a slider substrate 50.

A nonmagnetic conductive layer 310 made of a nonmagnetic conductive material such as for example Ti, Ta, Au, Ru or Cu is additionally laminated on the under layer 51. On the nonmagnetic conductive layer 310, On the nonmagnetic conductive layer 310, laminated is a lower shield layer (SF) 52 that also operates as a lower electrode layer and is made of a magnetic metal material such as for example FeAlSi, NiFe, CoFe, NiFeCo, FeN, FeZrN, FeTaN, CoZrNb or CoZrTa.

The nonmagnetic conductive layer 310 is opposed to the substrate 50 via the under layer 51, and therefore this nonmagnetic conductive layer 310 and the substrate 50 function as counter electrodes to generate a parasitic capacitance C4 there between.

On the lower shield layer 52, an MR layer 53 with the CPP structure and an insulation layer 54 made of an insulating material such as for example $Al_2O_3$ or $SiO_2$ are laminated.

The CPP-structure MR layer 53 will be formed from, in case of a CPP-GMR layer, a multilayered structure including a free layer of a ferromagnetic material such as for example NiFe, CoFe or NiFeCo, a nonmagnetic layer of a nonmagnetic conductive material such as for example Cu, a pinned layer of a ferromagnetic material such as for example NiFe, CoFe or NiFeCo, and a pinning layer of an antiferromagnetic material such as for example PtMn, FeMn, MnIr, NiMn or CrMnPt. In case of a TMR layer, the CPP-structure MR layer 53 will be formed from a multilayered structure including a free layer of a ferromagnetic material such as for example NiFe, CoFe or NiFeCo, a thin barrier layer of an insulation material such as for example oxides of Ti, Ta, Al, Zr, Hf, Si, Mg or Zn, a pinned layer of a ferromagnetic material such as for example NiFe, CoFe or NiFeCo, and a pinning layer of an antiferromagnetic material such as for example PtMn, FeMn, MnIr, NiMn or CrMnPt. The multilayered structure of the CPP-structure MR layer 53 is not limited to the abovementioned structure but various layer configurations will be of course possible. Although not shown in the figures, the MR layer 53 may have a magnetic domain control layer and other necessary layers.

On the CPP-structure MR layer 53 and the insulation layer 54, laminated is an upper shield layer (SS1) 55 that also operates as an upper electrode layer and is made of a magnetic metal material such as for example FeAlSi, NiFe, CoFe, NiFeCo, FeN, FeZrN, FeTaN, CoZrNb or CoZrTa.

The CPP-structure MR read head element is mainly composed of the nonmagnetic conductive layer 310, the lower shield layer 52, the MR layer 53, the insulation layer 54, the upper shield layer 55, the magnetic domain control layer and a lead conductor layer not shown.

On the upper shield layer 55, an inter-shield insulation layer 56 made of an insulating material such as for example $Al_2O_3$ or $SiO_2$ is laminated. An additional shield layer 57 made of a metal material or a magnetic metal material such as for example FeAlSi, NiFe, CoFe, NiFeCo, FeN, FeZrN, FeTaN, CoZrNb or CoZrTa with a thickness of preferably about 0.05-2 μm is laminated on the inter-shield insulation layer 56.

An insulation layer 58 made of an insulating material such as for example $Al_2O_3$ or $SiO_2$ is laminated on the additional shield layer 57. In this insulation layer 58, the heater 59 is formed.

The heater 59 may be formed in a strip shape or other shape such as for example one turn or multi turn helical coil shape with a circular or rectangular section. In case that the heater 59 has a strip shape, it may have for example a thickness of about 0.1-5 μm and a width in the track width direction of about 0.1-20 μm. The heater 59 is made of for example a material containing NiCu. The content of Ni in NiCu is for example about 15-60 atomic % and preferably about 25-45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

The hater 59 may also be made of for example a material containing NiCr. In this case, the content of Ni in NiCr is about 55-90 atomic % and preferably about 70-85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heater 59 may be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less.

The lead electrodes 46b and 46c may also be made of the same material as that of the heat generating section 46a.

A lower magnetic pole layer (SS2) 60, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58.

On the lower magnetic pole layer 60, a recording gap layer 61 made of a metal material such as for example Ru or an insulation material such as for example $SiO_2$ is laminated. An upper pole portion 62a of an upper magnetic pole layer 62, corresponding to a second magnetic pole layer in the present invention, made of a magnetic metal material such as for example FeAlSi, NiFe, CoFe, NiFeCo, FeN, FeZrN, FeTaN, CoZrNb or CoZrTa and a write coil layer 64 made of a conductive material such as for example Cu, surrounded by a coil insulation layer 63 of an insulating material such as a thermally cured resist are laminated on the recording gap layer 61. A lower pole portion 60a located at a top end section or an ABS-side end section of the lower magnetic pole layer 60 and the upper pole portion 62a located at a top end section or an ABS-side end section of the upper magnetic pole layer 62 are opposed to each other via the recording gap layer 61.

Although the write coil layer 64 in this embodiment is formed in a two-layered structure, it is apparent that this write coil layer 64 may be formed in a single-layered structure or other layered structure.

On the coil insulation layer 63 that covers the write coil layer 64, an upper yoke portion 62b of the upper magnetic pole layer 62 is formed. A protection layer 65 made of an insulating material such as for example $Al_2O_3$ is laminated on the upper pole portion 62a and the upper yoke portion 62b of the upper magnetic pole layer 62.

The inductive write head element horizontal or in-plane magnetic recording structure is mainly composed of the lower magnetic pole layer 60, the recording gap layer 61, the upper magnetic pole layer 62, the coil insulation layer 63 and the write coil layer 64.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the lower magnetic pole layer 60 are substantially equal to each other. As a result, a linearity of the QST characteristics of the MR read head element improves.

It is desired, as in this embodiment, that a part of the lower magnetic pole layer 60 is directly laminated on the additional shield layer 57 and therefore the lower magnetic pole layer 60 and the additional shield layer 57 are electrically connected with each other. However, in modifications, the lower magnetic pole layer 60 and the additional shield layer 57 may not be electrically connected with each other. In the former case, they may be electrically connected at a rear end position of the additional shield layer 57 opposite to the ABS as shown in FIG. 31, or at other position. In this embodiment shown in FIG. 31, the additional shield layer 57 is electrically connected with the substrate 50 to have an electrical resistance of 100 Ω or less there between.

The coil insulation layer 63 and the write coil layer 64 are also formed in the rear region or anti ABS-side region of a back gap section 66 that magnetically connects the lower magnetic pole layer 60 and the upper magnetic pole layer 62 with each other.

In this rear region, a heatsink 67 for dissipating heat generated in the head to the substrate is formed. This heatsink 67 is formed as a multilayered structure of layers 52', 55' and 60' separated from the lower shield layer 52, the upper shield layer 55 and the lower magnetic pole layer 60 but kept in contact with one another. The bottom of the heatsink 67 is made contact with the substrate 50 via a through hole 51a formed by partially removing the under layer 51.

Figure 32:
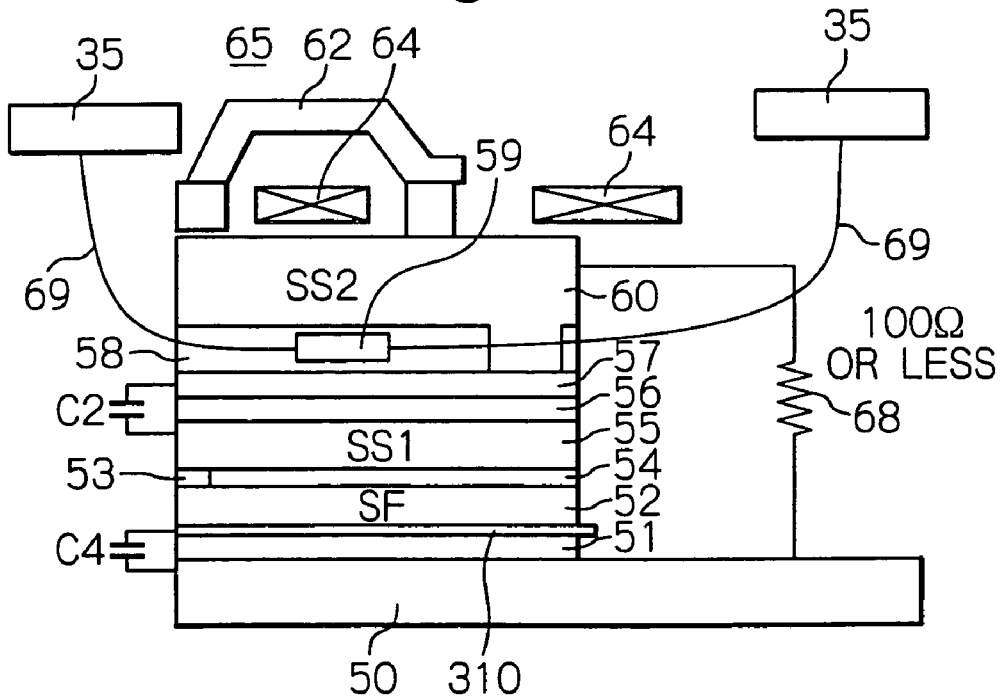
FIG. 32 is a view typically illustrating the sectional configuration along the direction perpendicular to ABS, of the composite thin-film magnetic head shown in FIG. 31.

The heatsink 67 and the lower magnetic pole layer 60 are electrically connected to each other by a strip-shaped thin lead conductor 68 (FIG. 32). Because it is not located along the central section line, this conductor 68 is not shown in FIG. 31.

The lead conductor 68 is made of a conductive material such as for example Cu but has a whole electrical resistance of several ohms because its thickness is thin as 0.1 μm for example and its width is considerably narrow. On the other hand, the heatsink 67 has a good electrical conductivity because it is made by a magnetic metal material. As aforementioned, the additional shield layer 57 is electrically connected with the lower magnetic pole layer 60, and therefore it is considered that the substrate 50 and the additional shield layer 57 is electrically connected by a resistance element with an electrical resistance of several ohms. As will be mentioned later, this electrical resistance is desired to be 100 Ω or less. It is desired to provide the heatsink 67, but it is not an absolute requirement. In modifications, the additional shield layer 57 may be grounded in another configuration through the lead conductor 68. In a modification in which the additional shield layer 57 is not electrically connected with the lower magnetic pole layer 60, the lead conductor 68 may be directly connected to the additional shield layer 57.

Figure 33:
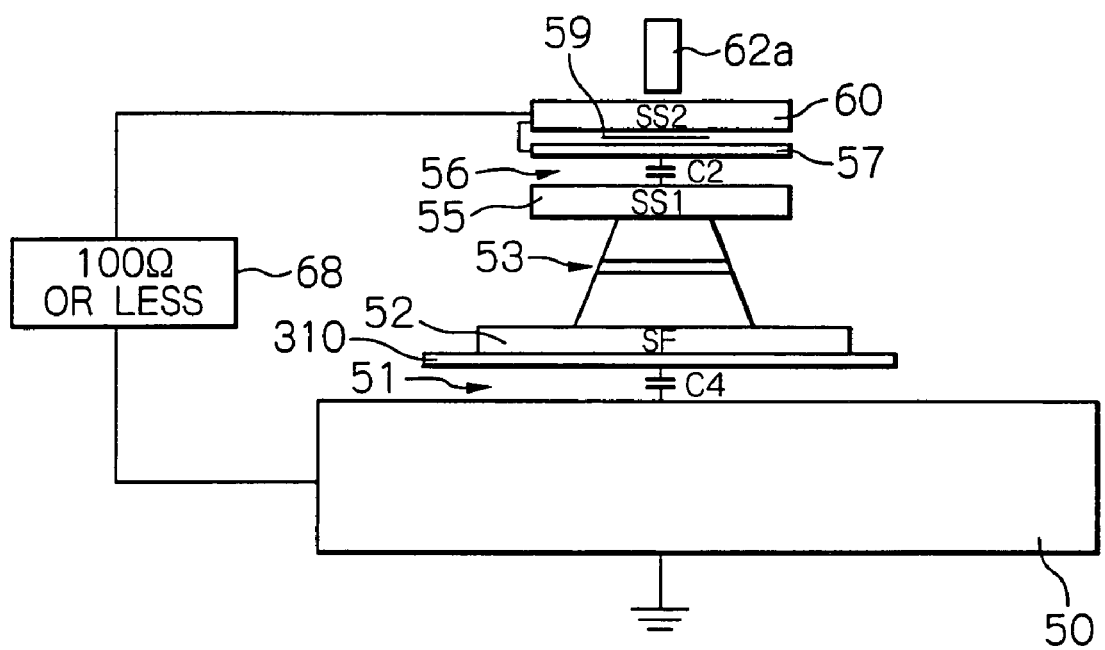
FIG. 33 is a view typically illustrating the configuration of the composite thin-film magnetic head shown in FIG. 31, seen from ABS side.

Schematic equivalent circuit of the composite thin-film magnetic head in this embodiment is the same as that shown in FIG. 7. FIGS. 32 and 33 typically illustrate the configurations of the composite thin-film magnetic head shown in FIG. 31. Particularly, FIG. 32 is a view of the sectional configuration along the direction perpendicular to ABS, and FIG. 33 is a view of the configuration seen from ABS side.

As shown in FIGS. 7, 32 and 33, in the composite thin-film magnetic head of this embodiment, a parasitic capacitance C1 is generated between the write coil 64 and the lower magnetic pole layer (SS2) 60 of the inductive write head element, a parasitic capacitance C2 is generated between the lower magnetic pole layer 60 or the additional shield layer 57 having the same potential as the lower magnetic pole layer 60 and the upper shield layer (SS1) 55 of the MR read head element, a parasitic capacitance C3 is generated between the upper shield layer 55 and the lower shield layer (SF) 52, and a parasitic capacitance C4 is generated between the lower shield layer 52 and the substrate 50.

As mentioned before, in order to reduce the crosstalk between the read head element and the write head element and influence of the external noises, it is required that (1) the substrate 50 and the lower magnetic pole layer 60 namely in this case the additional shield layer 57 are kept at the same potential, and (2) the parasitic capacitance C4 is kept substantially equal to the parasitic capacitance C2.

In this embodiment, as shown in FIGS. 32 and 33, the requirement (1) is achieved by electrically connecting the substrate 50 and the additional shield layer 57 through the lower magnetic pole layer 60 by means of a resistance element with an electrical resistance of 100 Ω or less using the lead conductor 68 and the heatsink 67. Also, the requirement (2) is achieved by varying the area of the counter electrodes of the lower shield layer 52 opposed to the substrate 50, more concretely by laminating the nonmagnetic conductive layer 310 on the substrate-side surface of the lower shield layer 52 to increase the area S4 of the counter electrodes and to increase the parasitic capacitances C4 so that C2=C4 is realized. That is, as is known, the parasitic capacitances C2 and C4 are obtained from the following formulas:

$$C2 = \in_2 \times S2/t2, \text{ and } C4 = \in_4 \times S4/t4$$

where $\in_2$ is a dielectric constant of the insulating material of the inter-shield insulation layer 56, $\in_4$ is a dielectric constant of the insulating material of the under layer 51, t2 is a thickness of the inter-shield insulation layer 56, t4 is a thickness of the under layer 51, S2 is an area of counter electrodes opposed to each other of the additional shield layer 57 and the upper shield layer 55, and S4 is an area of counter electrodes opposed to each other of the lower shield layer 52 and the substrate 50. Therefore, C2=C4 is attained by adjusting in this case S4. Since the nonmagnetic conductive layer 310 is sufficiently thin, the increase in the capacitance C4 due to the decrease in distance between the nonmagnetic conductive layer 310 and the substrate 50 can be negligible.

According to this embodiment, it is possible to easily adjust the parasitic capacitance C4 so as to be equal to the parasitic capacitance C2. Because the added conductive layer 310 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

Also, according to this embodiment, the substrate 50 and the additional shield layer 57 become at substantially the same potential by electrically connecting the substrate 50 and the lower magnetic pole layer 60 using the resistance element 68 with an electrical resistance of 100 Ω or less, and C2=C4 is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

As shown in FIG. 32, the heater 59 is connected between two drive electrode terminals 35 through lead conductors 69. The lead conductors 69 are made of a conductive material with a low resistance such as for example Cu. However, in modifications, the lead conductor 69 may be formed by the same material as that of the heater 59.

Operations and advantages of this embodiment are the same as those in the embodiment of FIGS. 1-11, the embodiment of FIGS. 15-19 and the embodiment of FIGS. 22-25.

Figure 34:
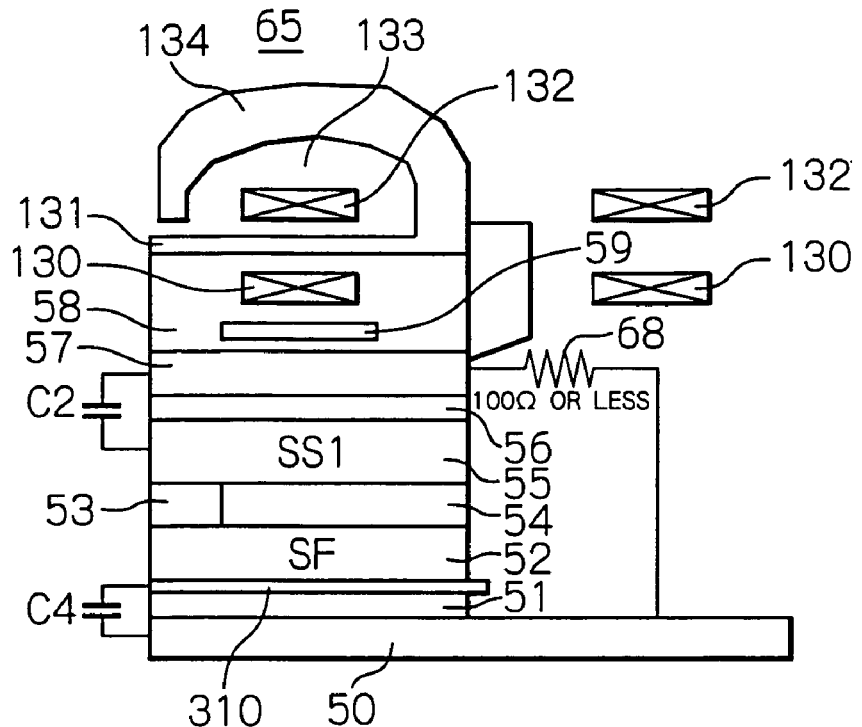
FIG. 34 is a view typically illustrating a sectional configuration along the direction perpendicular to ABS, of a composite thin-film magnetic head in still further embodiment according to the present invention.

FIG. 34 typically illustrates a sectional configuration along the direction perpendicular to ABS, of a composite thin-film magnetic head in further embodiment according to the present invention.

In this embodiment, a write head element with a perpendicular magnetic recording structure is used as the inductive write head element. Another configuration in this embodiment is the same as that in the embodiment shown in FIGS. 31-33. Also, in FIG. 34, the same components as those in FIGS. 32 and 33 use the same reference numerals.

As well as the layer configuration shown in FIG. 32, in this embodiment, the inter-shield insulation layer 56 is laminated on the upper shield layer 55 of the MR read head element, and the additional shield layer 57 is laminated on this inter-shield insulation layer 56. Furthermore, the insulation layer 58 is laminated on the additional shield layer 57. In this insulation layer 58, the heater 59 is formed.

A main magnetic pole layer 131, corresponding to a first magnetic pole layer in the present invention, made of a magnetic metal material such as for example FeAlSi, NiFe, CoFe, NiFeCo, FeN, FeZrN, FeTaN, CoZrNb or CoZrTa is laminated on the insulation layer 58. This main magnetic pole layer 131 constitutes a magnetic path for converging and for guiding a magnetic flux induced by a write coil 132 made of a conductive material such as for example Cu to a perpendicular magnetic recording layer of the magnetic disk at which magnetic recording is performed. On the main magnetic pole layer 131, a coil insulation layer 133 made of an insulating material such as a thermally cured resist is formed to surround the write coil 132.

At an upper region in the insulation layer 58, formed is a backing coil layer 130 made of a conductive material such as for example Cu for inducing a magnetic flux to prevent the write magnetic flux from bringing ATE.

An auxiliary magnetic pole layer or return yoke layer 134, corresponding to a second magnetic pole layer in the present invention, made of a magnetic metal material such as for example FeAlSi, NiFe, CoFe, NiFeCo, FeN, FeZrN, FeTaN, CoZrNb or CoZrTa is formed on the coil insulation layer 133. A protection layer 65 made of an insulating material such as for example $Al_2O_3$ is laminated on the auxiliary magnetic pole layer 134.

The backing coil layer 130 and the write coil layer 132 may be formed in a single-layered structure, a two or more-layered structure, or a helical coil structure.

The inductive write head element with the perpendicular magnetic recording structure is mainly composed of the main magnetic pole layer 131, the auxiliary magnetic pole layer 134, the coil insulation layer 133, the write coil layer 132 and the backing coil layer 130.

The main magnetic pole layer 131 at the end surface of the head opposed to a magnetic disk surface is formed thin so as to generate a fine write magnetic field that permits high-density magnetic recording. The end portion of the auxiliary magnetic pole layer 134 opposed to the magnetic disk surface constitutes a trailing shield portion with a layer section greater than that of the remaining portion of this auxiliary magnetic pole layer 134 so that a magnetic field gradient between this trailing shield section and the main magnetic pole layer 131 becomes more steeply. As a result, jitter in the reproduced signal is reduced and therefore an error rate at the reading operations becomes lower.

An extremely thin coating film made of DLC for example is coated on the magnetic disk side end surface of the MR read head element and the inductive write head element.

It is desired that lengths along a direction perpendicular to the ABS of the lower shield layer 52, the upper shield layer 55, the additional shield layer 57 and the main magnetic pole layer 131 are substantially equal to each other. As a result, a linearity of the QST characteristics of the MR read head element improves.

The heater 59 is connected between two drive electrode terminals 35 (not shown in FIG. 34) through lead conductors 69 (also not shown in FIG. 34).

It is desired, as in this embodiment, that the main magnetic pole layer 131 be electrically connected with the additional shield layer 57. However, in modifications, the main magnetic pole layer 131 and the additional shield layer 57 may not be electrically connected with each other. In this embodiment, the additional shield layer 57 is electrically connected with the substrate 50 via the lead conductor 68 and the heatsink 57 (not shown in FIG. 34) to have an electrical resistance of few ohms between the additional shield layer 57 and the substrate 50. This resistance is desired to be 100 Ω or less. It is desired to provide the heatsink, but it is not an absolute requirement. In modifications, the additional shield layer 57 may be grounded in another configuration through the lead conductor 68.

Operations and advantages of this embodiment are the same as those in the embodiment of FIGS. 1-11, the embodiment of FIGS. 15-19 and the embodiment of FIGS. 31-33.

Figure 35:
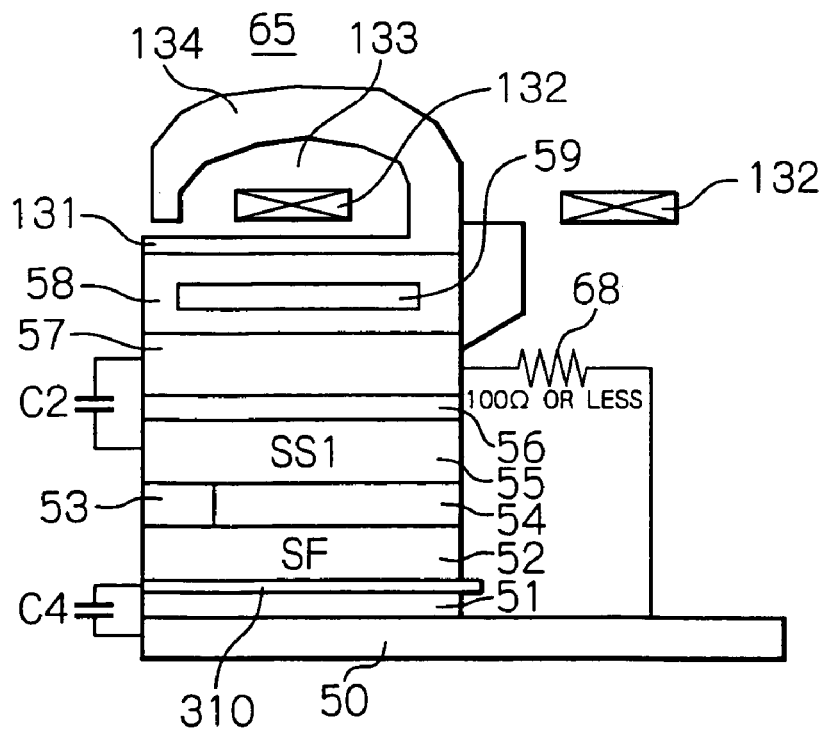
FIG. 35 is a view typically illustrating a sectional configuration along the direction perpendicular to ABS, of a composite thin-film magnetic head in further embodiment according to the present invention.

FIG. 35 typically illustrates a sectional configuration along the direction perpendicular to ABS, of a composite thin-film magnetic head in still further embodiment according to the present invention.

In this embodiment, a write head element with a perpendicular magnetic recording structure having no backing coil layer is used as the inductive write head element. Another configuration in this embodiment is the same as that in the embodiment shown in FIGS. 31-33 and in the embodiment shown in FIG. 34. Also, in FIG. 35, the same components as those in FIGS. 32 and 34 use the same reference numerals. Operations and advantages of this embodiment are the same as those in the embodiment of FIGS. 15-19, in the embodiment shown in FIGS. 31-33, and in the embodiment shown in FIG. 34.

Figure 36:
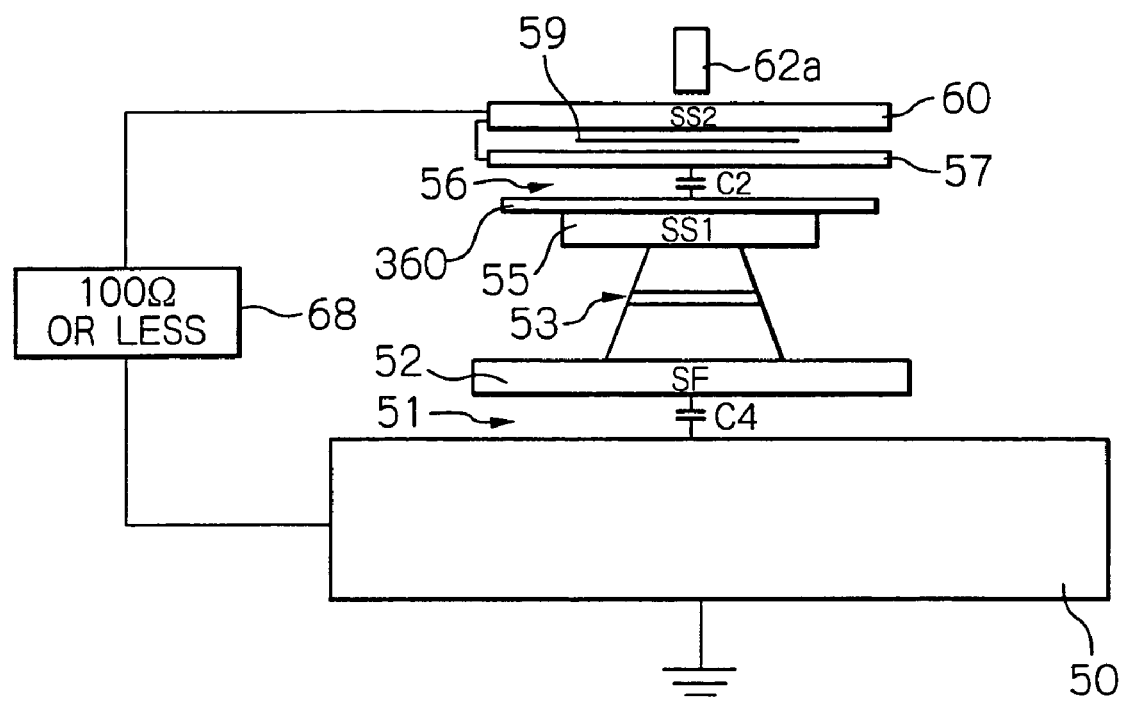
FIG. 36 is a view typically illustrating a configuration of a composite thin-film magnetic head in still further embodiment according to the present invention, seen from ABS side.

FIG. 36 typically illustrates a configuration of a composite thin-film magnetic head in still further embodiment according to the present invention, seen from ABS side.

In this embodiment, a nonmagnetic conductive layer 360 is additionally laminated on an additional shield layer side surface of the upper shield layer (SS1) 55. This nonmagnetic conductive layer 360 and the upper shield layer 55 are electrically conducted to each other. Another configuration in this embodiment is the same as these in the embodiment shown in FIG. 30 and the embodiment shown in FIGS. 31-33, and therefore description of the layer configuration is omitted. Also, in FIG. 36, the same components as those in FIG. 30 and FIGS. 31-33 use the same reference numerals.

By varying in this embodiment the area of the counter electrode of the upper shield layer (SS1) 55 opposed to the additional shield layer 57 to adjust the parasitic capacitance C2 until C2=C4 is realized. More concretely, in this embodiment, in case that the upper shield layer 55 has a smaller counter area than the additional shield layer 57, the counter electrode area S2 is increased by laminating the nonmagnetic conductive layer 360 on the additional shield layer side surface of the upper shield layer 55 to increase the parasitic capacitance C2 so that C2=C4 is attained. Therefore, it is possible to easily adjust the parasitic capacitance C2 so as to be equal to the parasitic capacitance C4. Because the added conductive layer 360 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

In this embodiment, also, because the nonmagnetic conductive layer 360 is laminated on the additional shield layer side surface of the upper shield layer 55, a distance between the nonmagnetic conductive layer 360 and the additional shield layer 57 is not increased to effectively increase the parasitic capacitance C2. As in this embodiment, in case that the nonmagnetic conductive layer 360 is laminated on the additional shield layer side surface, the distance between the nonmagnetic conductive layer 360 and the additional shield layer 57 is in general shortened to increase the parasitic capacitance C2. However, if the nonmagnetic conductive layer 360 is sufficiently thin, the increase in the capacitance C2 due to the decrease in distance can be negligible. Rather, increasing of the counter electrode area by the lamination of the nonmagnetic conductive layer 360 effectively increases the parasitic capacitance C2.

According to this embodiment, further, the substrate 50 and the additional shield layer 57 become at substantially the same potential by electrically connecting the substrate 50 and the lower magnetic pole layer 60 using the resistance element 68 with an electrical resistance of 100 Ω or less, and C2=C4 is attained by adjusting the parasitic capacitance. Therefore, the potential difference between the upper shield layer (SS1) and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

Operations and advantages of this embodiment are the same as those in the embodiment of FIGS. 1-11, the embodiment of FIGS. 15-19 and the embodiment of FIGS. 22-25.

As for one modification of this embodiment, the nonmagnetic conductive layer 360 may be laminated on a surface of the upper shield layer 55, opposite to the additional shield layer side surface. When the parasitic capacitances C2 and C4 are C2<C4 and it is impossible to thin the inter-shield insulation layer 56, it is necessary to more increase the parasitic capacitance C2 so as to attain C2=C4. In such case, this modification can easily increase the parasitic capacitance C2 to adjust as C2=C4.

As for another modification of this embodiment, the nonmagnetic conductive layer 360 may be formed to counter the additional shield layer 57 and to electrically connect to the upper shield layer 55 without laminating on this upper shield layer 55.

As for further modification of this embodiment, the lower magnetic pole layer 60 and the additional shield layer 57 may not be electrically connected with each other as in the embodiment of FIG. 26.

As for still further modification of this embodiment, a write head element with a perpendicular magnetic recording structure may be used as the inductive write head element as in the embodiment of FIG. 34.

As for further modification of this embodiment, a write head element with a perpendicular magnetic recording structure having no backing coil layer may be used as the inductive write head element as in the embodiment of FIG. 35.

Figure 37:
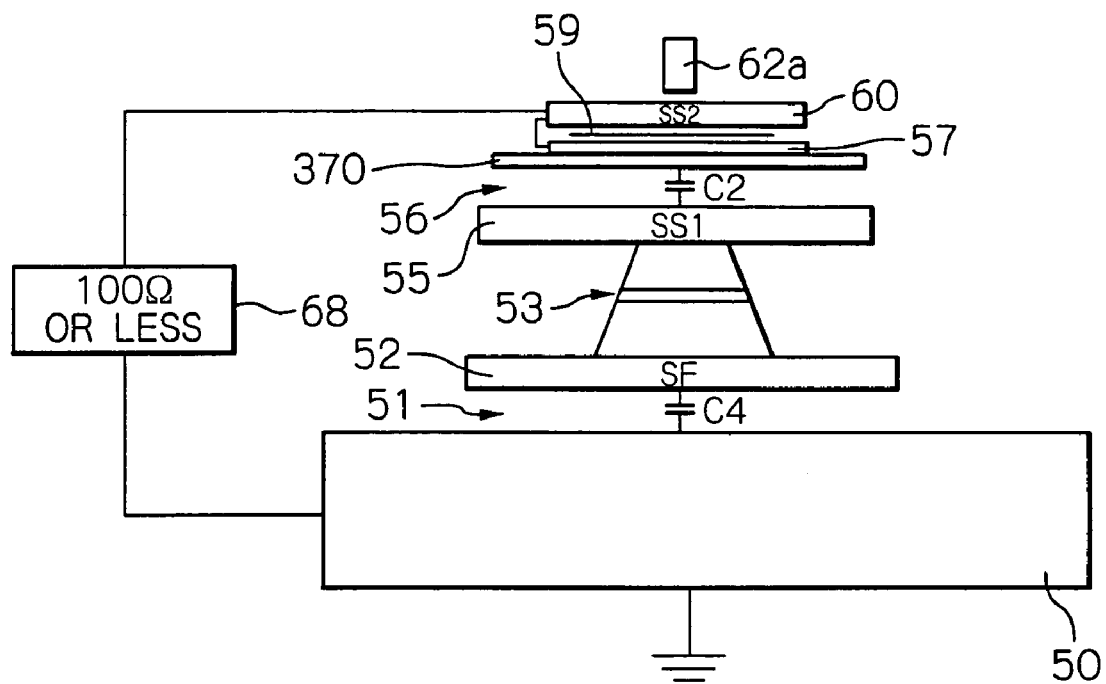
FIG. 37 is a view typically illustrating a configuration of a composite thin-film magnetic head in still further embodiment according to the present invention, seen from ABS side.

FIG. 37 typically illustrates a configuration of a composite thin-film magnetic head in still further embodiment according to the present invention, seen from ABS side.

In this embodiment, a nonmagnetic conductive layer 370 is additionally laminated on an upper shield layer side surface of the additional shield layer 57. This nonmagnetic conductive layer 370 and the lower magnetic pole layer 60 are electrically conducted to each other. Another configuration in this embodiment is the same as these in the embodiment shown in FIGS. 31-33 and the embodiment shown in FIG. 36, and therefore description of the layer configuration is omitted. Also, in FIG. 37, the same components as those in FIGS. 31-33 and FIG. 36 use the same reference numerals.

By varying in this embodiment the area of the counter electrode of the additional shield layer 57 opposed to the upper shield layer 55 to adjust the parasitic capacitance C2 until C2=C4 is realized. More concretely, in this embodiment, in case that the additional shield layer 57 has a smaller counter area than the upper shield layer 55, the counter electrode area S2 is increased by laminating the nonmagnetic conductive layer 370 on the upper shield layer side surface of the additional shield layer 57 to increase the parasitic capacitance C2 so that C2=C4 is attained. Therefore, it is possible to easily adjust the parasitic capacitance C2 so as to be equal to the parasitic capacitance C4. Because the added conductive layer 370 is nonmagnetic and also no change in the thickness, shape and size of the of the lower shield layer (SF) 52, the upper shield layer (SS1) 55, the additional shield layer 57 and the lower magnetic pole layer (SS2) 60 is necessary, the external magnetic field resistance, the shield magnetic domain performance due to write stress and the reading/writing characteristics of the thin-film magnetic head are never changed.

In this embodiment, also, because the nonmagnetic conductive layer 370 is laminated on the upper shield layer side surface of the additional shield layer 57, a distance between the nonmagnetic conductive layer 370 and the upper shield layer 55 is not increased to effectively increase the parasitic capacitance C2. As in this embodiment, in case that the nonmagnetic conductive layer 370 is laminated on the upper shield layer side surface, the distance between the nonmagnetic conductive layer 370 and the upper shield layer 55 is in general shortened to increase the parasitic capacitance C2. However, if the nonmagnetic conductive layer 370 is sufficiently thin, the increase in the capacitance C2 due to the decrease in distance can be negligible. Rather, increasing of the counter electrode area by the lamination of the nonmagnetic conductive layer 370 effectively increases the parasitic capacitance C2.

According to this embodiment, further, the substrate 50 and the additional shield layer 57 become at substantially the same potential by electrically connecting the substrate 50 and the lower magnetic pole layer 60 using the resistance element 68 with an electrical resistance of 100 Ω or less, and C2=C4 is attained by adjusting the parasitic capacitance. Therefore, the potential difference between the upper shield layer (SS1)

and the lower shield layer (SF) that operate the lower electrode and the upper electrode of the CPP-structure MR read head element, due to the external noise, becomes substantially zero. As a result, any external noise entered into the thin-film magnetic head is never presented on the reproduced signal to prevent error due to the external noises from occurring, and thus reliability of the head is improved.

Operations and advantages of this embodiment are the same as those in the embodiment of FIGS. 1-11, the embodiment of FIGS. 15-19, the embodiment of FIGS. 22-25, the embodiment of FIG. 30, the embodiment of FIGS. 31-33, the embodiment of FIG. 35.

As for one modification of this embodiment, the nonmagnetic conductive layer 370 may be laminated on a surface of the additional shield layer 57, opposite to the upper shield layer side surface. When the parasitic capacitances C2 and C4 are C2<C4 and it is impossible to thin the inter-shield insulation layer 56, it is necessary to more increase the parasitic capacitance C2 so as to attain C2=C4. In such case, this modification can easily increase the parasitic capacitance C2 to adjust as C2=C4.

As for another modification of this embodiment, the nonmagnetic conductive layer 370 may be formed to counter the upper shield layer 55 and to electrically connect to the additional shield layer 57 without laminating on this additional shield layer 57.

As for further modification of this embodiment, the lower magnetic pole layer 60 and the additional shield layer 57 may not be electrically connected with each other as in the embodiment of FIG. 26.

As for still further modification of this embodiment, a write head element with a perpendicular magnetic recording structure may be used as the inductive write head element as in the embodiment of FIG. 34.

As for further modification of this embodiment, a write head element with a perpendicular magnetic recording structure having no backing coil layer may be used as the inductive write head element as in the embodiment of FIG. 35.

As aforementioned, the inductive write head element according to the present invention may be achieved by a write head element with a horizontal or in-plane magnetic recording structure or a write head element with a perpendicular magnetic recording structure. Also, according to the present invention, the substrate and the additional shield layer become at substantially the same potential by electrically connecting them using the resistance element with an electrical resistance of 100 Ω or less, and C2=C4 is attained by adjusting the parasitic capacitance. Therefore, the potential difference between the upper shield layer (SS1) and the lower shield layer (SF) that operate the lower electrode and the upper electrode, due to the external noise, becomes substantially zero. As a result, any external noise entered into the thin-film magnetic head is never presented on the reproduced signal to prevent error due to the external noises from occurring, and thus reliability of the head is improved.

It is desire that the additional shield layer is electrically connected with the lower magnetic pole layer or the main magnetic pole layer that is a magnetic pole layer located at the side of the MR read head element with respect to the recording gap layer or the nonmagnetic layer. However, the present invention is established even if they are not electrically connected with each other. Furthermore, it is desired to provide the heatsink formed at the rear side of the coil insulation layer and the write coil, but the present invention is established even if there is no heatsink. Also, the resistance element with an electrical resistance of 100 Ω or less that electrically connects the additional shield layer and the substrate with each other is not limited to the above-mentioned embodiments and modifications, but various structures can be adopted thereto.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A composite thin-film magnetic head comprising:
   a substrate;
   an under layer formed on said substrate;
   a magnetoresistive effect read head element formed on said under layer and provided with a lower shield layer, an upper shield layer and a magnetoresistive effect layer in which a sense current flows in a direction perpendicular to a surface of said magnetoresistive effect layer through said upper shield layer and said lower shield layer, said lower shield layer being electrically insulated from said substrate to induce a first parasitic capacitance between said substrate and said lower shield layer;
   an inter-shield insulation layer laminated on said magnetoresistive effect read head element;
   an inductive write head element formed on said inter-shield insulation layer and provided with a first magnetic pole layer, a nonmagnetic layer, a second magnetic pole layer whose end portion is opposed to an end portion of said first magnetic pole layer through said nonmagnetic layer, and a write coil; and
   an additional shield layer formed between said upper shield layer and said first magnetic pole layer so that said additional shield layer is electrically connected with said first magnetic pole layer but electrically insulated from said upper shield layer to induce a second parasitic capacitance between said additional shield layer and said upper shield layer, the first parasitic capacitance being substantially the same as the second parasitic capacitance, and an electrical resistance between said substrate and said additional shield layer being 100 Ω or less.

2. The composite thin-film magnetic head as claimed in claim 1, wherein said additional shield layer is made of a magnetic metal material.

3. The composite thin-film magnetic head as claimed in claim 1, wherein lengths along a direction perpendicular to the air bearing surface of said lower shield layer, said upper shield layer, said additional shield layer and said first magnetic pole layer are substantially equal to each other.

4. The composite thin-film magnetic head as claimed in claim 1, wherein said head further comprises a heater formed between said additional shield layer and said first magnetic pole layer.

5. The composite thin-film magnetic head as claimed in claim 1, wherein said head further comprises a nonmagnetic conductive layer electrically conducted with said lower shield layer and opposed to said substrate in order to increase substantially countered area between said lower shield layer and said substrate.

6. The composite thin-film magnetic head as claimed in claim 5, wherein said nonmagnetic conductive layer is laminated on a substrate-side surface of said lower shield layer.

7. The composite thin-film magnetic head as claimed in claim 5, wherein said nonmagnetic conductive layer is laminated on a surface of said lower shield layer, said surface being opposite to a substrate-side surface of said lower shield layer.

8. The composite thin-film magnetic head as claimed in claim 1, wherein said head further comprises a nonmagnetic conductive layer electrically conducted with said upper shield layer and opposed to said additional shield layer in order to increase substantially countered area between said upper shield layer and said additional shield layer.

9. The composite thin-film magnetic head as claimed in claim 8, wherein said nonmagnetic conductive layer is laminated on an additional shield layer-side surface of said upper shield layer.

10. The composite thin-film magnetic head as claimed in claim 8, wherein said nonmagnetic conductive layer is laminated on a surface of said upper shield layer, said surface being opposite to an additional shield layer-side surface of said upper shield layer.

11. The composite thin-film magnetic head as claimed in claim 1, wherein said head further comprises a nonmagnetic conductive layer electrically conducted with said additional shield layer and opposed to said upper shield layer in order to increase substantially countered area between said upper shield layer and said additional shield layer.

12. The composite thin-film magnetic head as claimed in claim 11, wherein said nonmagnetic conductive layer is laminated on an upper shield layer-side surface of said additional shield layer.

13. The composite thin-film magnetic head as claimed in claim 11, wherein said nonmagnetic conductive layer is laminated on a surface of said additional shield layer, said surface being opposite to an upper shield layer-side surface of said additional shield layer.

14. The composite thin-film magnetic head as claimed in claim 1, wherein said magnetoresistive effect read head element is a giant magnetoresistive effect read head element.

15. The composite thin-film magnetic head as claimed in claim 1, wherein said magnetoresistive effect read head element is a tunnel magnetoresistive effect read head element.

16. The composite thin-film magnetic head as claimed in claim 1, wherein said inductive write head element is a horizontal magnetic recording structure write head element.

17. The composite thin-film magnetic head as claimed in claim 1, wherein said inductive write head element is a perpendicular magnetic recording structure write head element.

18. A magnetic head assembly including a composite thin-film magnetic head and a support member for supporting said composite thin-film magnetic head, said composite thin-film magnetic head comprising:
a substrate;
an under layer formed on said substrate;
a magnetoresistive effect read head element formed on said under layer and provided with a lower shield layer, an upper shield layer and a magnetoresistive effect layer in which a sense current flows in a direction perpendicular to a surface of said magnetoresistive effect layer through said upper shield layer and said lower shield layer, said lower shield layer being electrically insulated from said substrate to induce a first parasitic capacitance between said substrate and said lower shield layer;
an inter-shield insulation layer laminated on said magnetoresistive effect read head element;
an inductive write head element formed on said inter-shield insulation layer and provided with a first magnetic pole layer, a nonmagnetic layer, a second magnetic pole layer whose end portion is opposed to an end portion of said first magnetic pole layer through said nonmagnetic layer, and a write coil; and
an additional shield layer formed between said upper shield layer and said first magnetic pole layer so that said additional shield layer is electrically connected with said first magnetic pole layer but electrically insulated from said upper shield layer to induce a second parasitic capacitance between said additional shield layer and said upper shield layer, the first parasitic capacitance being substantially the same as the second parasitic capacitance, and an electrical resistance between said substrate and said additional shield layer being 100 Ω or less.

19. The magnetic head assembly as claimed in claim 18, wherein said additional shield layer of said composite thin-film magnetic head is made of a magnetic metal material.

20. The magnetic head assembly as claimed in claim 18, wherein lengths along a direction perpendicular to the air bearing surface of said lower shield layer, said upper shield layer, said additional shield layer and said first magnetic pole layer of said composite thin-film magnetic head are substantially equal to each other.

21. The magnetic head assembly as claimed in claim 18, wherein said composite thin-film magnetic head further comprises a heater formed between said additional shield layer and said first magnetic pole layer.

22. The magnetic head assembly as claimed in claim 18, wherein said composite thin-film magnetic head further comprises a nonmagnetic conductive layer electrically conducted with said lower shield layer and opposed to said substrate in order to increase substantially countered area between said lower shield layer and said substrate.

23. The magnetic head assembly as claimed in claim 22, wherein said nonmagnetic conductive layer is laminated on a substrate-side surface of said lower shield layer.

24. The magnetic head assembly as claimed in claim 22, wherein said nonmagnetic conductive layer is laminated on a surface of said lower shield layer, said surface being opposite to a substrate-side surface of said lower shield layer.

25. The magnetic head assembly as claimed in claim 18, wherein said composite thin-film magnetic head further comprises a nonmagnetic conductive layer electrically conducted with said upper shield layer and opposed to said additional shield layer in order to increase substantially countered area between said upper shield layer and said additional shield layer.

26. The magnetic head assembly as claimed in claim 25, wherein said nonmagnetic conductive layer is laminated on an additional shield layer-side surface of said upper shield layer.

27. The magnetic head assembly as claimed in claim 25, wherein said nonmagnetic conductive layer is laminated on a surface of said upper shield layer, said surface being opposite to an additional shield layer-side surface of said upper shield layer.

28. The magnetic head assembly as claimed in claim 18, wherein said composite thin-film magnetic head further comprises a nonmagnetic conductive layer electrically conducted with said additional shield layer and opposed to said upper shield layer in order to increase substantially countered area between said upper shield layer and said additional shield layer.

29. The magnetic head assembly as claimed in claim 28, wherein said nonmagnetic conductive layer is laminated on an upper shield layer-side surface of said additional shield layer.

30. The magnetic head assembly as claimed in claim 28, wherein said nonmagnetic conductive layer is laminated on a surface of said additional shield layer, said surface being opposite to an upper shield layer-side surface of said additional shield layer.

31. The magnetic head assembly as claimed in claim 18, wherein said magnetoresistive effect read head element is a giant magnetoresistive effect read head element.

32. The magnetic head assembly as claimed in claim 18, wherein said magnetoresistive effect read head element is a tunnel magnetoresistive effect read head element.

33. The magnetic head assembly as claimed in claim 18, wherein said inductive write head element is a horizontal magnetic recording structure write head element.

34. The magnetic head assembly as claimed in claim 18, wherein said inductive write head element is a perpendicular magnetic recording structure write head element.

35. A magnetic disk drive apparatus including at least one magnetic disk, at least one composite thin-film magnetic head and at least one support member for supporting said at least one composite thin-film magnetic head, each composite thin-film magnetic head comprising:
   a substrate;
   an under layer formed on said substrate;
   a magnetoresistive effect read head element formed on said under layer and provided with a lower shield layer, an upper shield layer and a magnetoresistive effect layer in which a sense current flows in a direction perpendicular to a surface of said magnetoresistive effect layer through said upper shield layer and said lower shield layer, said lower shield layer being electrically insulated from said substrate to induce a first parasitic capacitance between said substrate and said lower shield layer;
   an inter-shield insulation layer laminated on said magnetoresistive effect read head element;
   an inductive write head element formed on said inter-shield insulation layer and provided with a first magnetic pole layer, a nonmagnetic layer, a second magnetic pole layer whose end portion is opposed to an end portion of said first magnetic pole layer through said nonmagnetic layer, and a write coil;
   an additional shield layer formed between said upper shield layer and said first magnetic pole layer so that said additional shield layer is electrically connected with said first magnetic pole layer but electrically insulated from said upper shield layer to induce a second parasitic capacitance between said additional shield layer and said upper shield layer, the first parasitic capacitance being substantially the same as the second parasitic capacitance, and an electrical resistance between said substrate and said additional shield layer being 100 Ω or less.

36. The magnetic disk drive apparatus as claimed in claim 35, wherein said additional shield layer of said composite thin-film magnetic head is made of a magnetic metal material.

37. The magnetic disk drive apparatus as claimed in claim 35, wherein lengths along a direction perpendicular to the air bearing surface of said lower shield layer, said upper shield layer, said additional shield layer and said first magnetic pole layer of said composite thin-film magnetic head are substantially equal to each other.

38. The magnetic disk drive apparatus as claimed in claim 35, wherein said composite thin-film magnetic head further comprises a heater formed between said additional shield layer and said first magnetic pole layer.

39. The magnetic disk drive apparatus as claimed in claim 35, wherein said composite thin-film magnetic head further comprises a nonmagnetic conductive layer electrically conducted with said lower shield layer and opposed to said substrate in order to increase substantially countered area between said lower shield layer and said substrate.

40. The magnetic disk drive apparatus as claimed in claim 39, wherein said nonmagnetic conductive layer is laminated on a substrate-side surface of said lower shield layer.

41. The magnetic disk drive apparatus as claimed in claim 39, wherein said nonmagnetic conductive layer is laminated on a surface of said lower shield layer, said surface being opposite to a substrate-side surface of said lower shield layer.

42. The magnetic disk drive apparatus as claimed in claim 35, wherein said composite thin-film magnetic head further comprises a nonmagnetic conductive layer electrically conducted with said upper shield layer and opposed to said additional shield layer in order to increase substantially countered area between said upper shield layer and said additional shield layer.

43. The magnetic disk drive apparatus as claimed in claim 42, wherein said nonmagnetic conductive layer is laminated on an additional shield layer-side surface of said upper shield layer.

44. The magnetic disk drive apparatus as claimed in claim 42, wherein said nonmagnetic conductive layer is laminated on a surface of said upper shield layer, said surface being opposite to an additional shield layer-side surface of said upper shield layer.

45. The magnetic disk drive apparatus as claimed in claim 35, wherein said composite thin-film magnetic head further comprises a nonmagnetic conductive layer electrically conducted with said additional shield layer and opposed to said upper shield layer in order to increase substantially countered area between said upper shield layer and said additional shield layer.

46. The magnetic disk drive apparatus as claimed in claim 45, wherein said nonmagnetic conductive layer is laminated on an upper shield layer-side surface of said additional shield layer.

47. The magnetic disk drive apparatus as claimed in claim 45, wherein said nonmagnetic conductive layer is laminated on a surface of said additional shield layer, said surface being opposite to an upper shield layer-side surface of said additional shield layer.

48. The magnetic disk drive apparatus as claimed in claim 35, wherein said magnetoresistive effect read head element is a giant magnetoresistive effect read head element.

49. The magnetic disk drive apparatus as claimed in claim 35, wherein said magnetoresistive effect read head element is a tunnel magnetoresistive effect read head element.

50. The magnetic disk drive apparatus as claimed in claim 35, wherein said inductive write head element is a horizontal magnetic recording structure write head element.

51. The magnetic disk drive apparatus as claimed in claim 35, wherein said inductive write head element is a perpendicular magnetic recording structure write head element.

* * * * *